US00RE46808E

(19) United States
(12) Reissued Patent
Tsukahara

(10) Patent Number: US RE46,808 E
(45) Date of Reissued Patent: *Apr. 24, 2018

(54) GAMING MACHINE ALLOWING SELECTION OF STOPPING ORDER OF REELS FOR SUSTAINING PLAYER'S ANTICIPATION, AND CONTROL METHOD THEREOF

(71) Applicant: UNIVERSAL ENTERTAINMENT CORPORATION, Koto-Ku, Tokyo (JP)

(72) Inventor: Nakayasu Tsukahara, Tokyo (JP)

(73) Assignee: Universal Entertainment Corporation, Tokyo (JP)

( * ) Notice: This patent is subject to a terminal disclaimer.

(21) Appl. No.: 14/573,477

(22) Filed: Dec. 17, 2014

Related U.S. Patent Documents

Reissue of:
(64) Patent No.: 8,342,934
Issued: Jan. 1, 2013
Appl. No.: 12/469,464
Filed: May 20, 2009

U.S. Applications:
(60) Provisional application No. 61/055,329, filed on May 22, 2008, provisional application No. 61/076,325, filed on Jun. 27, 2008.

(51) Int. Cl.
*A63F 9/24* (2006.01)
*G07F 17/34* (2006.01)

(52) U.S. Cl.
CPC ..... *G07F 17/34* (2013.01)

(58) Field of Classification Search
CPC ..... G07F 17/34
USPC ..... 463/16–22
See application file for complete search history.

(56) References Cited

U.S. PATENT DOCUMENTS 4,712,799 A 12/1987 Fraley
6,497,617 B1 * 12/2002 Yoshida ..... G07F 17/32 273/138.1
6,612,927 B1 * 9/2003 Slomiany ..... G07F 17/3244 463/13
7,273,415 B2 * 9/2007 Cregan et al. ..... 463/25
2004/0259627 A1 * 12/2004 Walker ..... G07F 17/3211 463/20
2005/0049033 A1 * 3/2005 Kojima ..... 463/20
2005/0130737 A1 * 6/2005 Englman et al. ..... 463/25
2007/0060245 A1 * 3/2007 Veenker ..... G07F 17/32 463/16
2007/0207851 A1 * 9/2007 Yoshizawa ..... G07F 17/32 463/22
2007/0238510 A1 * 10/2007 Halprin ..... 463/20
2008/0032791 A1 * 2/2008 Hosokawa ..... G07F 17/3262 463/31
2008/0045302 A1 * 2/2008 Low ..... 463/20

(Continued)

*Primary Examiner* — John M Hotaling
(74) *Attorney, Agent, or Firm* — Simpson & Simpson, PLLC; S. Peter Konzel

(57) ABSTRACT

A gaming machine, at the beginning of a game, determines static symbols for each of the video reels and executes variable display. Then, in a case where the static symbols do not form a winning combination and where the static symbols include symbols constituting a winning combination, video reels displaying symbols not constituting the winning combination are statically displayed after other video reels.

16 Claims, 32 Drawing Sheets

(56) References Cited

U.S. PATENT DOCUMENTS

| | | | | |
|---|---|---|---|---|
| 2008/0220839 | A1* | 9/2008 | DeBrabander ..... G07F 17/34 | 463/16 |
| 2008/0234033 | A1* | 9/2008 | Berman et al. ..... | 463/20 |
| 2009/0075717 | A1* | 3/2009 | Jaffe ..... | 463/20 |
| 2009/0082083 | A1* | 3/2009 | Wilson ..... G07F 17/3211 | 463/20 |
| 2009/0291739 | A1 | 5/2009 | Tsukahara | |
| 2009/0233671 | A1 | 9/2009 | Tsukahara | |
| 2009/0239613 | A1 | 9/2009 | Tsukahara | |
| 2009/0280890 | A1* | 11/2009 | Jaffe ..... | 463/20 |
| 2009/0312089 | A1 | 12/2009 | Tsukahara | |

* cited by examiner

FIG. 7

SYMBOL LAYOUT TABLE

| SYMBOL POSITION | SYMBOLS | | | | |
|---|---|---|---|---|---|
| | 1ST REEL | 2ND REEL | 3RD REEL | 4TH REEL | 5TH REEL |
| 20 | BONUS | BONUS | BONUS | BONUS | BONUS |
| 19 | A | MASK | Q | A | 10 |
| 18 | HOLY CUP | K | K | TREASURE | SNAKE |
| 17 | TREASURE | COMPASS | 10 | Q | HOLY CUP |
| 16 | Q | MASK | K | K | J |
| 15 | 10 | Q | TREASURE | MASK | TREASURE |
| 14 | HOLY CUP | HOLY CUP | HOLY CUP | BONUS | WILD |
| 13 | MASK | J | J | Q | Q |
| 12 | 10 | BONUS | BONUS | SNAKE | HOLY CUP |
| 11 | TREASURE | HOLY CUP | TREASURE | 10 | A |
| 10 | WILD | A | WILD | WILD | WILD |
| 9 | BONUS | Q | COMPASS | 10 | A |
| 8 | MASK | WILD | A | BONUS | BONUS |
| 7 | J | A | 10 | Q | TREASURE |
| 6 | HOLY CUP | J | J | COMPASS | MASK |
| 5 | TREASURE | K | HOLY CUP | Q | 10 |
| 4 | A | TREASURE | TREASURE | K | TREASURE |
| 3 | Q | A | WILD | Q | K |
| 2 | COMPASS | HOLY CUP | TREASURE | HOLY CUP | COMPASS |
| 1 | 10 | TREASURE | K | A | TREASURE |
| 0 | K | Q | TREASURE | Q | MASK |

FIG. 7A

SYMBOL LAYOUT TABLE

| SYMBOL POSITION | SYMBOLS | | |
|---|---|---|---|
| | 1ST REEL | 2ND REEL | 3RD REEL |
| 20 | BONUS | BONUS | BONUS |
| 19 | A | MASK | Q |
| 18 | HOLY CUP | K | K |
| 17 | TREASURE | COMPASS | 10 |
| 16 | Q | MASK | K |
| 15 | 10 | Q | TREASURE |
| 14 | HOLY CUP | HOLY CUP | HOLY CUP |
| 13 | MASK | J | J |
| 12 | 10 | BONUS | BONUS |
| 11 | TREASURE | HOLY CUP | TREASURE |
| 10 | WILD | A | WILD |
| 9 | BONUS | Q | COMPASS |
| 8 | MASK | WILD | A |
| 7 | J | A | 10 |
| 6 | HOLY CUP | J | J |
| 5 | TREASURE | K | HOLY CUP |
| 4 | A | TREASURE | TREASURE |
| 3 | Q | A | WILD |
| 2 | COMPASS | HOLY CUP | TREASURE |
| 1 | 10 | TREASURE | K |
| 0 | K | Q | TREASURE |

FIG. 8

COMBINATION TABLE FOR A BASIC GAME

| FOR 1ST VIDEO REEL | FOR 2ND VIDEO REEL | FOR 3RD VIDEO REEL | FOR 4TH VIDEO REEL | FOR 5TH VIDEO REEL | COIN NUMBER |
|---|---|---|---|---|---|
| BONUS | BONUS | BONUS | BONUS | BONUS | 100 |
| WILD | WILD | WILD | WILD | WILD | 60 |
| TREASURE | TREASURE | TREASURE | TREASURE | TREASURE | 50 |
| GOLDEN | GOLDEN | GOLDEN | GOLDEN | GOLDEN | 40 |
| HOLY CUP | HOLY CUP | HOLY CUP | HOLY CUP | HOLY CUP | 30 |
| COMPASS | COMPASS | COMPASS | COMPASS | COMPASS | 20 |
| A | A | A | A | A | 15 |
| K | K | K | K | K | 13 |
| Q | Q | Q | Q | Q | 12 |
| J | J | J | J | J | 11 |
| 10 | 10 | 10 | 10 | 10 | 10 |

FIG. 8A

COMBINATION TABLE FOR A BASIC GAME

| FOR 1ST VIDEO REEL | FOR 2ND VIDEO REEL | FOR 3RD VIDEO REEL | COIN NUMBER |
|---|---|---|---|
| BONUS | BONUS | BONUS | 100 |
| WILD | WILD | WILD | 60 |
| TREASURE | TREASURE | TREASURE | 50 |
| GOLDEN | GOLDEN | GOLDEN | 40 |
| HOLY CUP | HOLY CUP | HOLY CUP | 30 |
| COMPASS | COMPASS | COMPASS | 20 |
| A | A | A | 15 |
| K | K | K | 13 |
| Q | Q | Q | 12 |
| J | J | J | 11 |
| 10 | 10 | 10 | 10 |

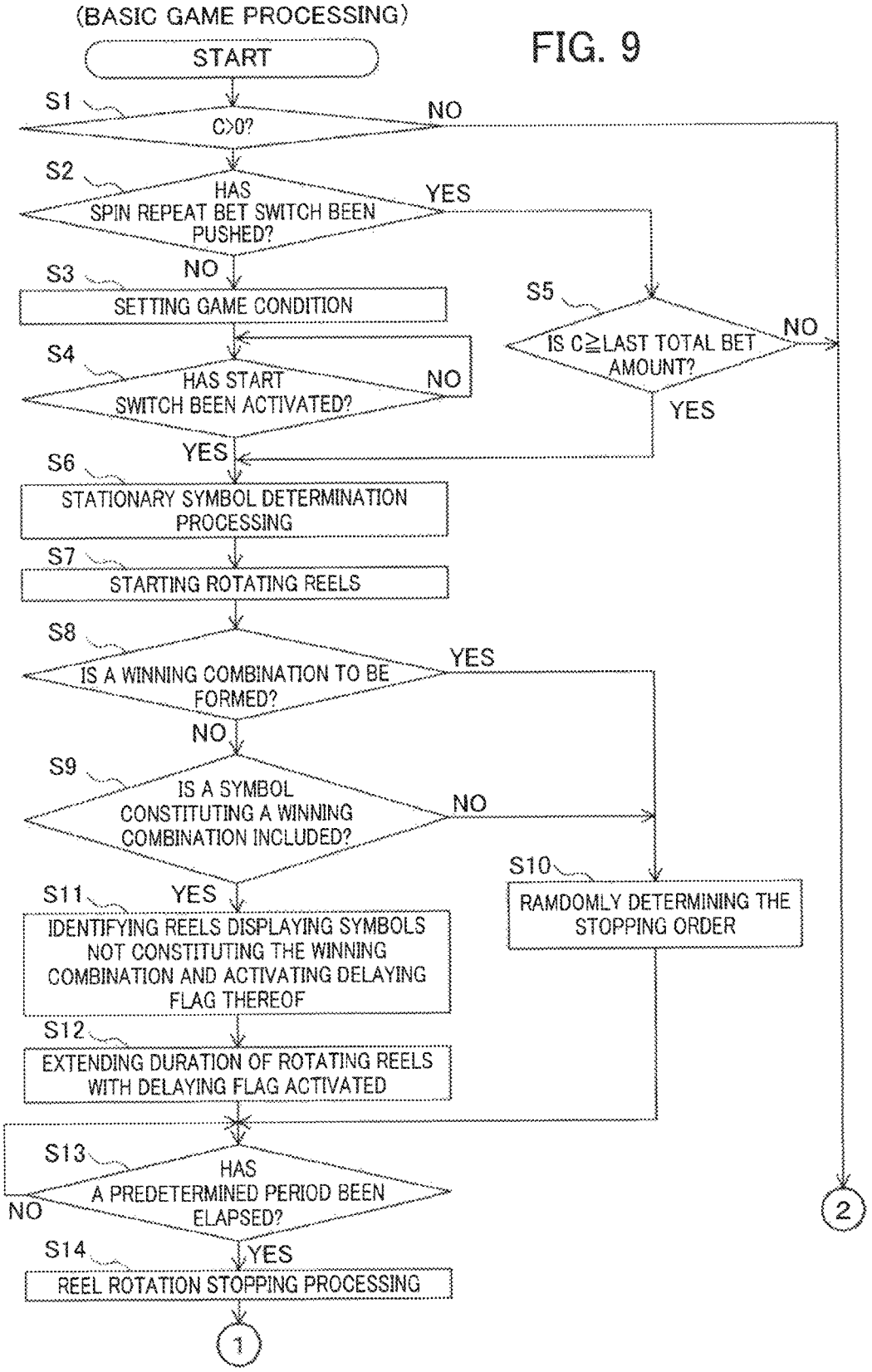
(BASIC GAME PROCESSING)
FIG. 9
START
S1
C>0?
NO
S2
HAS SPIN REPEAT BET SWITCH BEEN PUSHED?
YES
NO
S3
SETTING GAME CONDITION
S5
IS C≧LAST TOTAL BET AMOUNT?
NO
YES
S4
HAS START SWITCH BEEN ACTIVATED?
NO
YES
S6
STATIONARY SYMBOL DETERMINATION PROCESSING
S7
STARTING ROTATING REELS
S8
IS A WINNING COMBINATION TO BE FORMED?
YES
NO
S9
IS A SYMBOL CONSTITUTING A WINNING COMBINATION INCLUDED?
NO
YES
S10
RAMDOMLY DETERMINING THE STOPPING ORDER
S11
IDENTIFYING REELS DISPLAYING SYMBOLS NOT CONSTITUTING THE WINNING COMBINATION AND ACTIVATING DELAYING FLAG THEREOF
S12
EXTENDING DURATION OF ROTATING REELS WITH DELAYING FLAG ACTIVATED
S13
HAS A PREDETERMINED PERIOD BEEN ELAPSED?
NO
YES
S14
REEL ROTATION STOPPING PROCESSING
1
2

LOTTERY TABLE FOR CHANGING THE STOPPING ORDER (RANDOM NUMBER VALUE: 0 – 255)

| OPTIONS | NUMERICAL RANGE | |
|---|---|---|
| | UPPER LIMIT | LOWER LIMIT |
| CHANGE | 0 | 127 |
| NOT CHANGE | 128 | 255 |

(STOPPING ORDER CHANGING PROCESSING)

FIG. 14A (1)

LOSE PATTERN DATA TABLE: FIRST VIDEO REEL
(RANDOM NUMBER VALUE: 0 - 255)

| PATTERN NUMBER | VALUE TO BE SUBTRACTED | REEL NAME | | |
|---|---|---|---|---|
| | | A | B | C |
| 1－1 | 127 | 3 | 1 | 2 |
| 1－2 | 128 | 3 | 2 | 1 |

(2)

LOSE PATTERN DATA TABLE: SECOND VIDEO REEL
(RANDOM NUMBER VALUE: 0 - 255)

| PATTERN NUMBER | VALUE TO BE SUBTRACTED | REEL NAME | | |
|---|---|---|---|---|
| | | A | B | C |
| 2－1 | 127 | 1 | 3 | 2 |
| 2－2 | 128 | 2 | 3 | 1 |

(3)

LOSE PATTERN DATA TABLE: THIRD VIDEO REEL
(RANDOM NUMBER VALUE: 0 - 255)

| PATTERN NUMBER | VALUE TO BE SUBTRACTED | REEL NAME | | |
|---|---|---|---|---|
| | | A | B | C |
| 3－1 | 127 | 2 | 1 | 3 |
| 3－2 | 128 | 1 | 2 | 3 |

(4)

WIN PATTERN DATA TABLE
(RANDOM NUMBER VALUE: 0 - 255)

| PATTERN NUMBER | VALUE TO BE SUBTRACTED | REEL NAME | | |
|---|---|---|---|---|
| | | A | B | C |
| win1 | 42 | 1 | 2 | 3 |
| win2 | 42 | 1 | 3 | 2 |
| win3 | 43 | 3 | 1 | 2 |
| win4 | 43 | 2 | 1 | 3 |
| win5 | 43 | 2 | 3 | 1 |
| win6 | 43 | 3 | 2 | 1 |

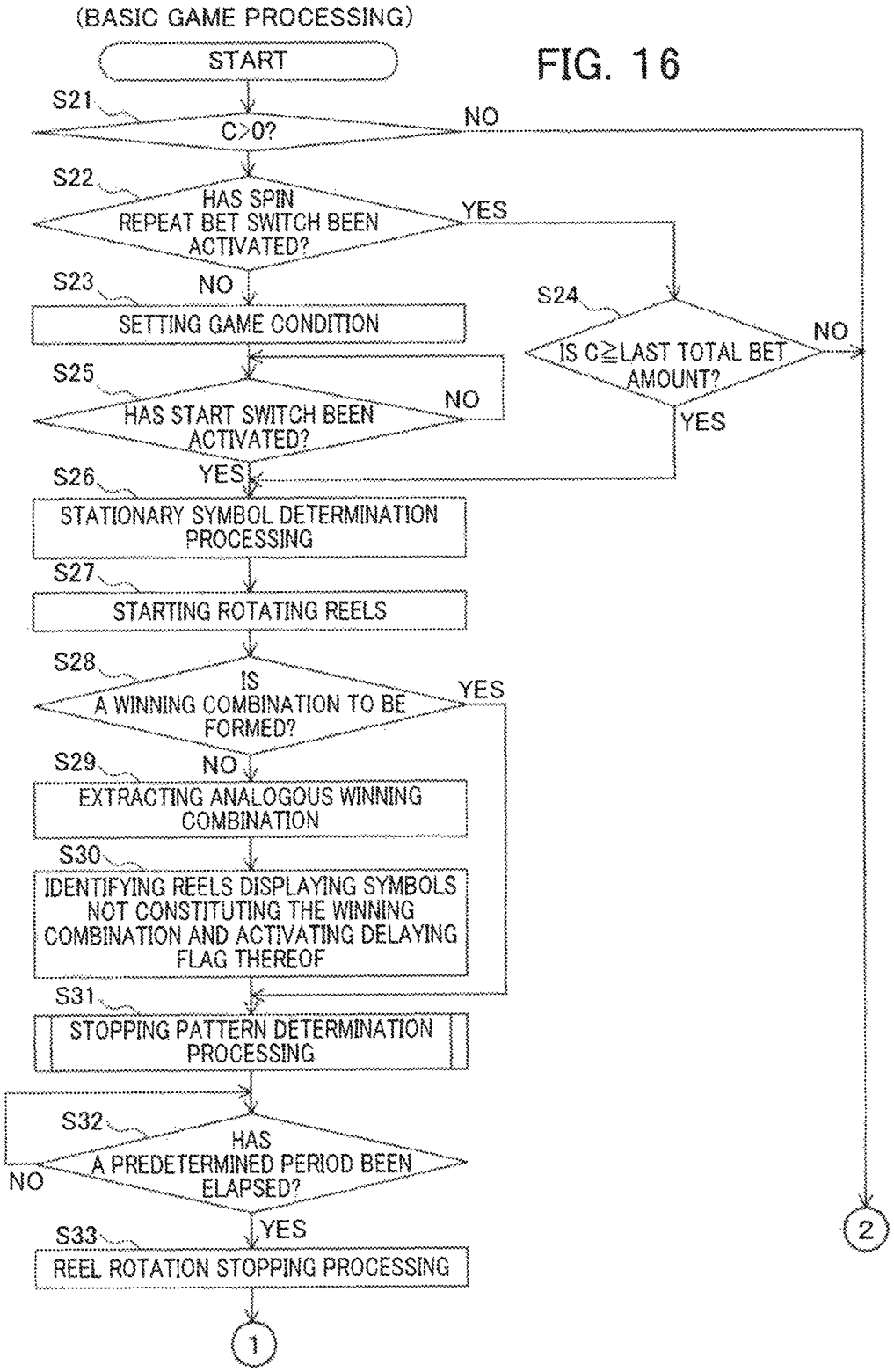
(BASIC GAME PROCESSING)
START
FIG. 16
S21
C>0?
NO
S22
HAS SPIN REPEAT BET SWITCH BEEN ACTIVATED?
YES
S23
NO
SETTING GAME CONDITION
S24
IS C≧LAST TOTAL BET AMOUNT?
NO
YES
S25
HAS START SWITCH BEEN ACTIVATED?
NO
YES
S26
STATIONARY SYMBOL DETERMINATION PROCESSING
S27
STARTING ROTATING REELS
S28
IS A WINNING COMBINATION TO BE FORMED?
YES
NO
S29
EXTRACTING ANALOGOUS WINNING COMBINATION
S30
IDENTIFYING REELS DISPLAYING SYMBOLS NOT CONSTITUTING THE WINNING COMBINATION AND ACTIVATING DELAYING FLAG THEREOF
S31
STOPPING PATTERN DETERMINATION PROCESSING
S32
HAS A PREDETERMINED PERIOD BEEN ELAPSED?
NO
YES
S33
REEL ROTATION STOPPING PROCESSING
1
2

(STOPPING PATTERN DETERMINATION PROCESING)

FIG. 18

REFERENCE TABLE GROUP DETERMINATION TABLE

| NUMBER OF DIFFERENT SYMBOLS | TABLE GROUP NAME |
|---|---|
| 0 | win |
| 1 | lose1 |
| 2 | lose2 |
| 3 | lose3 |
| 4 | lose4 |
| 5 | lose5 |

FIG. 19

LOSE1 TABLE GROUP:

PATTERN DATA TABLE DETERMINATION TABLE

| REEL NAME | TABLE NAME |
|---|---|
| 3A | lose1_3A |
| 3B | lose1_3B |
| 3C | lose1_3C |
| 3D | lose1_3D |
| 3E | lose1_3E |

FIG. 20

LOSE1 TABLE GROUP: LOSE1_3A PATTERN DATA TABLE

| PATTERN NUMBER | VALUE TO BE SUBTRACTED | REEL NAME | | | | |
|---|---|---|---|---|---|---|
| | | A | B | C | D | E |
| 3A_1 | 250 | 5 | 1 | 2 | 3 | 4 |
| 3A_2 | 250 | 5 | 1 | 2 | 4 | 3 |
| 3A_3 | 250 | 5 | 1 | 3 | 2 | 4 |
| 3A_4 | 250 | 5 | 1 | 3 | 4 | 2 |
| 3A_5 | 250 | 5 | 1 | 4 | 2 | 3 |
| 3A_6 | 250 | 5 | 1 | 4 | 3 | 2 |
| 3A_7 | 250 | 5 | 2 | 1 | 3 | 4 |
| ⋮ | ⋮ | ⋮ | ⋮ | ⋮ | ⋮ | ⋮ |

GAMING MACHINE ALLOWING SELECTION OF STOPPING ORDER OF REELS FOR SUSTAINING PLAYER'S ANTICIPATION, AND CONTROL METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*MULTIPLE REISSUE APPLICATIONS*

*More than one reissue application has been filed relative to U.S. Pat. No. 8,342,934. In addition to the instant reissue application, identified as U.S. patent application Ser. No. 14/573,477, which was filed on Dec. 17, 2014, a "sibling" reissue application of U.S. Pat. No. 8,342,934, and identified as U.S. patent application Ser. No. 14/516,999, was filed on Oct. 17, 2014.*

CROSS REFERENCE TO RELATED APPLICATIONS

[This application claims benefit of U.S. Provisional Application Nos. 61/055,329 and 61/076,325, respectively filed May 22, 2008 and Jun. 27, 2008, the entire contents of which are incorporated herein by reference.] *This application is a reissue application of U.S. Pat. No. 8,342,934, which issued from U.S. patent application Ser. No. 12/469,464 on Jan. 1, 2013, which application claims priority to U.S. Provisional App. No. 61/076,325, filed Jun. 27, 2008 and U.S. Provisional App. No. 61/055,329, filed May 22, 2008. Each of the above-identified applications is incorporated herein by reference.*

*This application is the second reissue application filed relative to U.S. Pat. No. 8,342,934. A first reissue application relative to U.S. Pat. No. 8,342,934 was filed on Oct. 17, 2014 and assigned application Ser. No. 14/516,999. Each of the instant reissue application and the first reissue application filed Oct. 17, 2014 are separate reissue applications of U.S. Pat. No. 8,342,934.*

BACKGROUND OF THE INVENTION

1. Field of the Invention

The present invention relates to a gaming machine executing a slot game, and more specifically to a gaming machine allowing selection of a stopping order of reels for sustaining a player's anticipation, and a control method thereof.

2. Related Art

In a gaming machine executing a slot game, only a part of the plurality of symbol groups is displayed on a display unit. Upon acceptance of credits inserted, execution of the game is started and the plurality of symbol groups displayed in the display unit is variably displayed. In a case where mechanical reels are used, the reels rotate and a group of symbols on the peripheral surface of each reel is variably displayed.

After a predetermined period of time, the variable display on the display unit or the rotation of the reels is stopped, and it is determined whether the static symbols form a winning combination or not. In this case, the symbol groups are statically displayed in a predetermined order, as disclosed in U.S. Pat. No. 4,712,799. Generally, for example, the leftmost symbol group is first statically displayed.

In this case, if a symbol not included in any winning combination is displayed first, the player may be disappointed to know that he missed an award, and may not be interested in other symbols. Then, the player may be bored and uncomfortable until all the symbol groups are statically displayed.

Since a lot of games are usually executed repeatedly in a slot game, such a disappointment may gradually discourage and deter the players.

Accordingly, an objective of the present invention is to provide a gaming machine that can control an order in which symbols are statically displayed in symbol display regions in response to a predetermined condition, and a control method thereof.

SUMMARY OF THE INVENTION

In an aspect of the present invention, a gaming machine comprising: a display including a plurality of display regions for displaying a plurality of kinds of symbols; memory for storing a stopping order control program for controlling a stopping order for each of the plurality of display regions, in which the plurality of kinds of symbols stop varying and are statically displayed; an input device for accepting external input; and a controller for executing processing of: (a) in response to an input signal from the input device, randomly determining a symbol to be statically displayed in each of the plurality of symbol display regions after the variable display; (b) determining whether, after the processing (a), a combination of symbols to be rearranged in the plurality of display regions along a pay line after the variable display corresponds to a winning combination; and (c) in the processing (b), statically displaying symbols, different from those constituting the winning combination, in the plurality of display regions delayed from statically displaying symbols in other display regions by means of the stopping order control program.

In another aspect of the present invention, a gaming machine includes: a display including a plurality of display regions for displaying a plurality of kinds of symbols; memory for storing a stopping order control program for controlling a stopping order for each of the plurality of display regions, in which the plurality of kinds of symbols stops varying and is statically displayed; an input device for accepting external input; and a controller for executing processing of: (a) starting a game in response to an input signal from the input device; (b) randomly determining a symbol to be rearranged in each of the plurality of display regions in the display, from the plurality of kinds of symbols; (c) performing a variable display for changing symbols displayed in the plurality of display regions in the display to other kinds of symbols; (d) determining whether a combination of symbols to be rearranged in the plurality of display regions along an active pay line after the variable display, after the processing (b), corresponds to a winning combination; (e) in a case where, in the processing (d), the combination of symbols to be rearranged in the plurality of display regions along an active pay line is determined not to correspond to a winning combination, statically displaying symbols, not included in the winning combination, in the plurality of display regions delayed from statically displaying symbols in other display regions by means of the stopping order control program; (f) in a case where, in the processing (d), the combination of symbols to be rearranged in the plurality of display regions along the active pay line is determined to correspond to a winning combination, displaying the symbols determined to be rearranged in the processing (b) by stopping the variable display and statically displaying the symbols; and (g) after the processing (f), providing an award corresponding to the winning combination displayed.

In still another aspect of the present invention, the gaming machine according to the first aspect is provided, in which, to execute the processing (f), the controller statically displays symbols, in display regions randomly selected from the plurality of display regions, delayed from statically displaying symbols in other display regions by means of the stopping order control program.

In yet another aspect of the present invention, a gaming machine includes: a display forming a plurality of display regions for displaying a plurality of kinds of symbols; memory for storing a stopping order control program for controlling a stopping order for each of the plurality of display regions, in which the plurality of kinds of symbols stops varying and is statically displayed, following patterns including a normal stopping order, of which a number is at least the number of the display regions; an input device for accepting external input; and a controller for executing processing of: (a) starting a game in response to an input signal from the input device; (b) randomly determining a symbol to be rearranged in each of the plurality of display regions in the display, from the plurality of kinds of symbols; (c) performing a variable display for changing symbols displayed in the plurality of display regions in the display to other kinds of symbols; (d) determining whether a combination of symbols to be rearranged in the plurality of display regions along the active pay line after the variable display, after the processing (b), corresponds to a winning combination; (e) in a case where, in the processing (d), the combination of symbols to be rearranged in the plurality of display regions along the active pay line is determined not to correspond to a winning combination and in a case where the symbol not included in the winning combination is a symbol displayed in one of the display regions, changing the stopping order of the plurality of display regions from the normal stopping order, so that the symbol not included in the winning combination stops varying and is statically displayed to be last, by means of the stopping order control program; (f) in a case where, in the processing (d), the combination of symbols to be rearranged in the plurality of display regions along the active pay line is determined to correspond to a winning combination, displaying the symbols determined to be rearranged in the processing (b), in the plurality of display regions; and (g) after the processing (f), providing an award corresponding to the winning combination displayed.

In yet another aspect of the present invention, the gaming machine according to the aspect is provided, in which to execute the processing (f), the controller lastly statically displays symbols in display regions randomly selected from the plurality of display regions by means of the stopping order control program.

In yet another aspect of the present invention, a gaming machine is provided including: a display including a plurality of display regions for displaying a plurality of kinds of symbols; memory for storing a plurality of kinds of pattern data indicating a stopping pattern of the plurality of symbols, from a status of varying to a status of being statically displayed; an input device for accepting an input to the gaming machine; and a controller for executing processing of: (a) starting a game in response to an input signal accepted by the input device; (b) determining static symbols to be rearranged in the plurality of display regions, from the plurality of kinds of symbols; (c) performing a variable display for changing the display in the plurality of display regions; (d) determining whether a combination of the static symbols rearranged along an activated pay line, among a plurality of pay lines for determination of a winning combination, corresponds to the winning combination; (e) in a case where, in the processing (d), the combination of the static symbols rearranged along the pay line is determined not to correspond to the winning combination, extracting an analogous winning combination, that is analogous to the combination of the static symbols rearranged along the pay line with least difference, from the winning combinations; (f) determining display regions for the static symbols, which display symbols not included in the analogous winning combination extracted in the processing (e); (g) selecting a stopping pattern from the plurality of kinds of pattern data stored in the memory, in which the symbols not included in the analogous winning combination stops after other symbols stop; and (h) displaying the static symbols by stopping the variable display in the plurality of display regions based upon the stopping pattern selected in the processing (g).

In yet another aspect of the present invention, the gaming machine according to the aspect is provided, in which the controller, in a case where the combination of symbols to be rearranged along the active pay line is determined to correspond to the winning combination in the processing (d), executes processing of randomly selecting a stopping pattern, for statically displaying the plurality of symbols, from the plurality of kinds of pattern data.

In yet another aspect of the present invention, a control method is provided for a gaming machine including: a display including a plurality of display regions for displaying a plurality of symbols; memory for storing a plurality of kinds of pattern data indicating a stopping pattern of the plurality of symbols, from a status of varying to a status of being statically displayed; an input device for accepting an input to the gaming machine; and a controller for executing the control method, the method including steps of: (a) starting a game in response to an input signal accepted by the input device; (b) determining static symbols to be rearranged in the plurality of display regions; (c) performing variable display for changing the display in the plurality of display regions; (d) determining whether a combination of the static symbols rearranged along an activated pay line, among a plurality of pay lines for determination of a winning combination, corresponds to the winning combination; (e) in a case where, in the processing (d), the combination of the static symbols rearranged along the pay line is determined not to correspond to a winning combination, extracting an analogous winning combination, that is analogous to the combination of the static symbols rearranged along the pay line with least difference, from the winning combination; (f) determining display regions for the static symbols, which display symbols not included in the analogous winning combination extracted in the processing (e); (g) selecting a stopping pattern from the plurality of kinds of pattern data stored in the memory, in which the symbols not included in the analogous winning combination stop after other symbols stop; and (h) displaying the static symbols by stopping the variable display in the plurality of display regions based upon the stopping pattern selected in the processing (g).

In yet another aspect of the present invention, the gaming machine according to the seventh aspect is provided, the method including steps of: the controller, in a case where the combination of symbols to be rearranged along the active pay line is determined to correspond to the winning combination in the processing (d), randomly selects a stopping pattern, for statically displaying the plurality of symbols, from the plurality of kinds of pattern data.

In yet another aspect of the present invention, a gaming machine includes: a display including a plurality of display regions for displaying a predetermined symbol from among a plurality of kinds of symbols; memory for storing a stopping order control program for controlling a stopping order for each of the plurality of display regions, in which the plurality of kinds of symbols stops varying and is statically displayed; an input device for accepting external input; and a controller for executing processing of: (a) starting a game in response to an input signal from the input device; (b) randomly determining a symbol to be rearranged in each of the plurality of display regions, from the plurality of kinds of symbols; (c) performing a variable display for changing symbols displayed in the plurality of display regions to other kinds of symbols; (d) after the processing (b), determining whether a symbol qualified for an award is included among the symbols to be rearranged in the plurality of display regions after the variable display; and (e) in a case where, in the processing (d), the symbol qualified for an award is determined to be included among the symbols to be rearranged in the plurality of display regions, statically displaying a symbol, which is not the symbol qualified for an award, in the display region, delayed from statically displaying symbols in other display regions by means of the stopping order control program.

In yet another aspect of the present invention, a gaming machine is provided including: a display having a plurality of symbol display regions for displaying symbols capable of switching between variable display and static display; an input device for accepting external input; and a controller for executing processing of: (a) in response to an input signal from the input device, determining by a lottery a symbol to be statically displayed in each of the plurality of symbol display regions after the variable display; (b) after the processing (a), comparing a combination of symbols to be statically displayed after the variable display, along an activated pay line, among pay lines defined across the plurality of symbol display regions, with a combination qualified for an award, and determining whether a quantity of a different symbol is no greater than a first value; (c) after the processing (b), in a case where the quantity of the different symbol is no greater than the first value, determining whether or not to change a stopping order for statically displaying each of the plurality of symbol display regions after the variable display; (d) after the processing (c), in a case where the stopping order is determined to be changed and where the combination of symbols to be statically displayed along the activated pay line includes the different symbol, changing the stopping order so that the symbol display region displaying the different symbol is statically displayed after the symbol display region displaying the symbol constituting the combination qualified for an award; and (e) regarding each of the plurality of symbol display regions, switching from the variable display to the static display according to the stopping order changed in the processing (d).

According to the aspect of the present invention, even in a case where the combination of symbols to be statically displayed along the activated pay line is not a winning combination, the symbol display region displaying the symbol not constituting a combination qualified for an award can be statically displayed delayed from the symbol display region displaying the symbol constituting the combination.

In yet another aspect of the present invention, a gaming machine is provided including: a display having a plurality of symbol display regions for displaying symbols capable of switching between variable display and static display; an input device for accepting external input; and a controller for executing processing of: (a) in response to an input signal from the input device, determining by a lottery a symbol to be statically displayed in each of the plurality of symbol display regions after the variable display; (b) after the processing (a), comparing a combination of symbols to be statically displayed after the variable display, along an activated pay line, among pay lines defined across the plurality of symbol display regions, with a combination qualified for an award, and determining whether a quantity of a different symbol is no greater than a first value; (c) after the processing (b), in a case where the quantity of the different symbol is no greater than the first value, determining whether or not to change a stopping order for statically displaying each of the plurality of symbol display regions after the variable display; (d) after the processing (c), in a case where the stopping order is determined to be changed and where the combination of symbols to be statically displayed along the activated pay line does not include the different symbol, changing the stopping order so that the plurality of symbol display regions are statically displayed in a random order; (e) after the processing (c), in a case where the stopping order is determined to be changed and where the combination of symbols to be statically displayed along the activated pay line includes the different symbol, changing the stopping order so that the symbol display region displaying the different symbol is statically displayed after the symbol display region displaying the symbol constituting the combination qualified for an award, and that the symbol display regions displaying the symbol constituting the combination qualified for an award are statically displayed in a random order; and (f) regarding each of the plurality of symbol display regions, switching from a variable display to a static display according to the stopping order changed in any one of the processing (d) and the processing (e).

According to the aspect of the present invention, even in a case where the combination of symbols to be statically displayed along the activated pay line is not a combination qualified for an award, the symbol display region displaying the symbol not constituting a combination qualified for an award can be statically displayed delayed from the symbol display region displaying the symbol constituting the combination. In addition, in a case where the combination of symbols to be statically displayed along the activated pay line corresponds to a combination qualified for an award, the stopping order of the plurality of symbol display regions is randomly changed.

In yet another aspect of the present invention, a gaming machine is provided including: a display having a plurality of symbol display regions for displaying symbols capable of switching between variable display and static display; an input device for accepting external input; and a controller for executing processing of: (a) in response to an input signal from the input device, determining by a lottery a symbol to be statically displayed in each of the plurality of symbol display regions after the variable display; (b) after the processing (a), comparing a combination of symbols to be statically displayed after the variable display, along an activated pay line, among pay lines defined across the plurality of symbol display regions, with a combination qualified for an award, and determining whether a quantity of a different symbol is no greater than a first value; (c) after the processing (b), in a case where the quantity of the different symbol is no greater than the first value, determining whether or not to change a stopping order for statically displaying each of the plurality of symbol display regions after the variable display; (d) after the processing (c), in a case where the stopping order is determined to be changed and where the combination of symbols to be statically displayed along the activated pay line does not include the different symbol, changing the stopping order so that the plurality of symbol display regions are statically displayed according to a stopping pattern selected from the plurality of stopping patterns defining stopping order; (e) after the processing (c), in a case where the stopping order is determined to be changed and where the combination of symbols to be statically displayed along the activated pay line includes the different symbol, changing the stopping order so that the symbol display region displaying the different symbol is statically displayed delayed from the symbol display region displaying the symbol constituting the combination qualified for an award, and that the symbol display regions displaying the symbol constituting the combination qualified for an award are statically displayed according to a stopping pattern selected from the plurality of stopping patterns defining stopping order; and (f) regarding each of the plurality of symbol display regions, switching from the variable display to the static display according to the stopping order changed in any one of the processing (d) and the processing (e).

According to the aspect of the present invention, even in a case where the combination of symbols to be statically displayed along the activated pay line is not a combination qualified for an award, the symbol display region displaying the symbol not constituting a combination qualified for an award can be statically displayed delayed from the symbol display region displaying the symbol constituting the combination. In addition, in a case where the combination of symbols to be statically displayed along the activated pay line corresponds to a combination qualified for an award, the plurality of symbol display regions can be statically displayed in a stopping pattern defining the stopping order thereof, selected from a plurality of stopping patterns.

In yet another aspect of the present invention, a control method is provided for a gaming machine including: a display having a plurality of symbol display regions for displaying symbols capable of switching between variable display and static display; an input device for accepting external input; and a controller for executing the method, the method including steps of: (a) in response to an input signal from the input device, determining by a lottery a symbol to be statically displayed in each of the plurality of symbol display regions after the variable display; (b) after the processing (a), comparing a combination of symbols to be statically displayed after the variable display, along an activated pay line, among pay lines defined across the plurality of symbol display regions and along which the symbols are statically displayed, with a combination qualified for an award, and determining whether a quantity of a different symbol is no greater than a first value; (c) after the processing (b), in a case where the quantity of the different symbol is no greater than the first value, determining whether or not to change a stopping order for statically displaying each of the plurality of symbol display regions after the variable display; (d) after the processing (c), in a case where the stopping order is determined to be changed and where the combination of symbols to be statically displayed along the activated pay line includes the different symbol, changing the stopping order so that the symbol display region displaying the different symbol is statically displayed delayed from the symbol display region displaying the symbol constituting the combination qualified for an award; and (e) regarding each of the plurality of symbol display regions, switching from the variable display to the static display in the stopping order changed in the processing (d).

BRIEF DESCRIPTION OF THE DRAWINGS

FIG. 7 is a diagram showing a symbol layout table of FIG. 6;

FIG. 8 is a diagram showing a combination table for a basic game of the gaming machine according to the embodiment;

FIGS. 9 and 10 are flow charts of basic game processing executed in the gaming machine according to the embodiment;

FIG. 16 is a flowchart of basic game processing executed in the gaming machine according to a second embodiment of the present invention;

FIG. 18 is a diagram showing a reference table group determination table according to the second embodiment;

FIG. 19 is a diagram showing an example of a pattern data table determination table according to the second embodiment; and FIG. 20 is a diagram showing an example of a pattern data table according to the second embodiment.

FIG. 7A is a diagram showing a symbol layout table of FIG. 6A;

FIG. 8A is a diagram showing a combination table for a basic game of the gaming machine according to the embodiment;

FIG. 14A is a diagram showing an example of a pattern table according to the embodiment;

DETAILED DESCRIPTION OF THE INVENTION

First Embodiment

A first embodiment of the present invention is hereinafter described with reference to the accompanying drawings.

Figure 1:
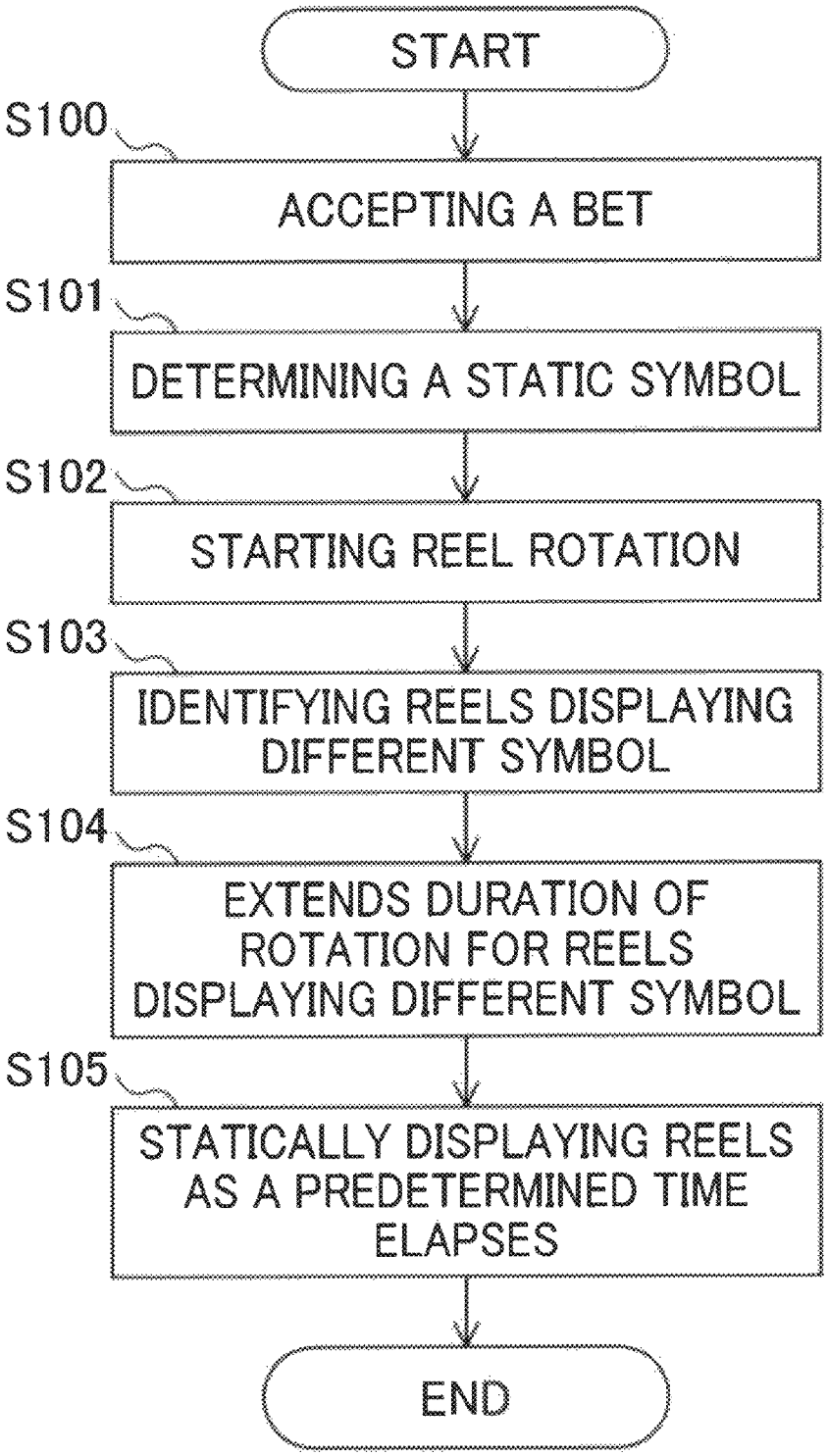
FIG. 1 is an outline of a flow chart of processing executed in a gaming machine according to an embodiment of the present invention.

As shown in FIG. 1, before starting a game, a CPU 106 accepts a bet (Step S100), and determines static symbols (Step S101). Details thereof are described later. Next, the CPU 106 starts variable display, in which video reels 3A to 3E displayed on a liquid crystal display 30 are rotating (Step S102). Subsequently, the CPU 106 determines a video reel displaying a static symbol not included in a winning combination along a pay line (Step S103). The CPU 106 extends duration of rotation (variable display) for the video reel displaying a static symbol not included in a winning combination, so that the video reel is statically displayed after other video reels (Step S104). Afterwards, the CPU 106 statically displays video reels as a predetermined period of time for variably displaying each reel has elapsed (Step S105).

Figure 2:
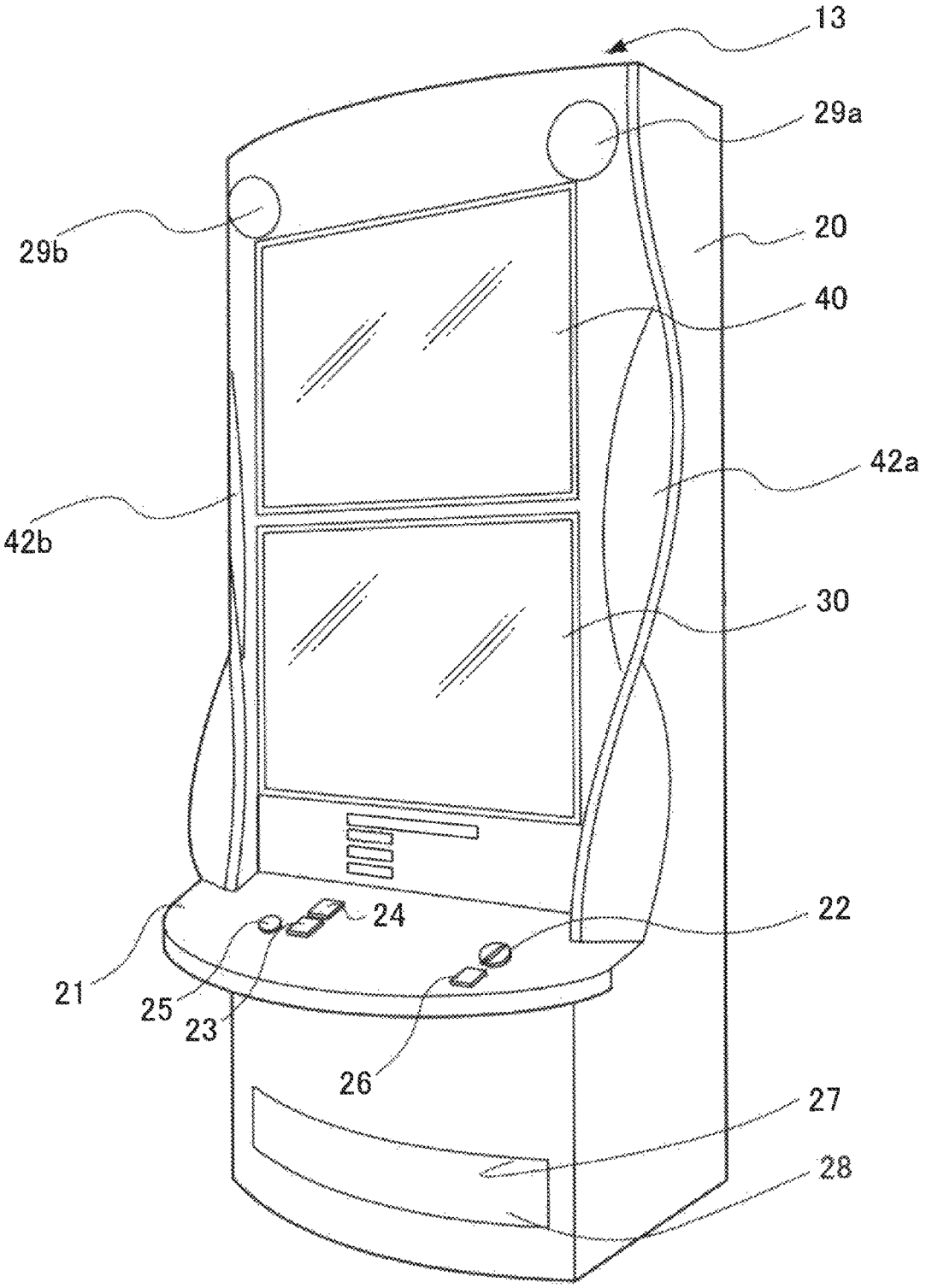
FIG. 2 is a perspective view showing the appearance of the gaming machine according to the embodiment.

FIG. 2 is a perspective view showing the gaming machine 13 according to an embodiment of the present invention. The gaming machine 13 includes a cabinet 20. The cabinet 20 has a surface opening toward a player. The cabinet 20 contains various components including a game controller 100 (refer to FIG. 4) for electrically controlling the gaming machine 13, and a hopper 44 (refer to FIG. 4) for controlling the insertion, storage, and payout of coins as a game medium, and the like. The game medium is not limited to coins, and it may be, for example, medals, tokens, electronic money, or electronic valuable information (credits) equivalent thereto.

A liquid crystal display 30 is disposed at substantially the center of the front face of the cabinet 20, and a liquid crystal display 40 is disposed above the display 30.

The liquid crystal display 30 realizes a display device for displaying a variety of images related to the game, including effect images and the like. The player advances the game while observing the variety of images displayed on the liquid crystal display 30. In such a game, the liquid crystal display 30 displays a slot game (described later).

The gaming machine 13 is configured with a video reel, which displays five virtual reels on the liquid crystal display 30. Furthermore, it should be noted that the term "video reel" as used here represents a mechanism for displaying a reel on the liquid crystal display 30 in the form of an image, instead of a mechanical reel. As a plurality of types of necessary symbols for the game, the following symbols of "BONUS", "WILD", "TREASURE BOX", "GOLDEN MASK", "HOLY CUP", "COMPASS&MAP", "SNAKE", "A", "K", "Q", "J", and "10" are displayed together with images which appear spinning.

The other liquid crystal display 40 disposed above the liquid crystal display 30 is a sub display for displaying the rules of the game, demonstration movies, and the like.

In addition, sound transmission openings 29a and 29b are provided on both the left and right sides above the liquid crystal display 40, which allow the sound effects generated by a speaker 41 (see FIG. 4) stored within the cabinet 20 to propagate outside the cabinet 20. The sound effects in accordance with the progress of the game or the like can be output through the sound permeable openings 29a and 29b. Decorative lamps 42a and 42b are disposed on the right and left sides of liquid crystal displays 30 and 40 of the gaming machine 13. The decorative lamps 42a and 42b emit light in accordance with the progress of the game.

An operation unit 21, which is substantially horizontal to the ground, is provided below the liquid crystal display 30. Disposed on the right side of the operation unit 21 is a coin slot 22 through which coins are inserted into the gaming machine 13. A bet switch 23 is provided on the left side of the operation unit 21. The bet switch 23 is used for determining the number of coins, as a game medium, to bet. In accordance with the number of coins bet by the bet switch 23, a line for determining whether an award is to be provided (hereinafter referred to as "pay line") is activated among nine lines L1, L2, L3, L4, L5, L6, L7, L8, and L9 (see FIG. 3) for providing an award.

In addition, a spin repeat bet switch 24 is provided between the liquid crystal display 30 and the bet switch 23. The spin repeat bet switch 24 allows the player to play the game again without changing the number of coins bet on the pay line in the previous game. The number of coins to be bet on the abovementioned pay line can be decided by pressing the bet switch 23 or the spin repeat bet switch 24.

In the operating part 21, a start switch 25 for accepting a starting operation of each game by a player is disposed on the left side of the bet switch 23. Pressing either the start switch 25 or the spin repeat bet switch 24 triggers the start of the game, and then displays an image in which the aforementioned five image reels 3A to 3E start to spin.

On the other hand, a cash out switch 26 is provided near the coin insertion opening 22 in the aforementioned operation unit 21. When the player presses the cash out switch 26, the inserted coins are discharged from a coin discharge slot 27 opening into a lower part of the front face of the cabinet 20. The discharged coins can be gathered on a coin tray 28.

Figure 3:
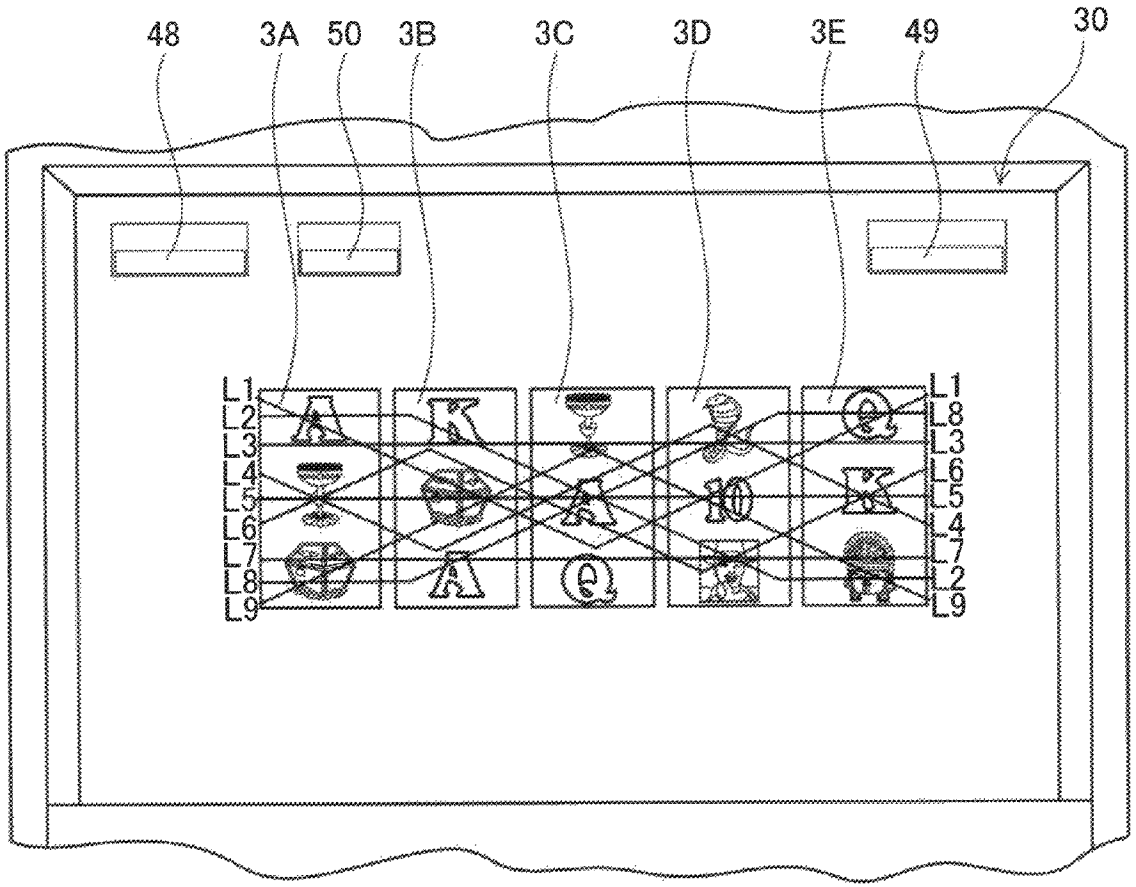
FIG. 3 is an enlarged front view showing a display region of the gaming machine according to the embodiment.

FIG. 3 is an enlarged view which shows the display region of the gaming machine 13. The display region of the gaming machine 13 is a region displayed on the liquid crystal display 30 for displaying mainly images relating to the game. In the present embodiment, the display region displays five video reels 3A to 3E. Each of the video reels 3A to 3E displayed on each display region displays three symbols in a direction vertical to the longitudinal direction of the liquid crystal display 30. As described later, the three symbols displayed on the video reels 3A to 3E are selected from a plurality of kinds of symbols determined in advance for each of the video reels 3A to 3E.

In addition, nine lines L1 to L9 for providing an award are provided across the video reels 3A to 3E (FIG. 3). The lines L1 to L9, for providing an award, extend so as to pass through a symbol displayed on each of the image reels 3A to 3E, when all of the spinning five video reels 3A to 3E come to a stop.

Pressing the bet switch 23 once will activate, for example, the line L3 for providing a third award, the line L5 for providing a fifth award, and the line L7 for providing a seventh award, and also will consume a coin as a credit medal.

Pressing the bet switch 23 twice will activate, for example, the line L1 for awarding a first winning, the line L4 for awarding a fourth winning, and the line L8 for awarding an eighth winning, in addition to the abovementioned three lines, and also will consume two coins as credit medals.

Pressing the bet switch 23 three times will activate, for example, the line L2 for awarding a second winning, the line L6 for awarding a sixth winning, and the line L9 for awarding a ninth winning, in addition to the abovementioned six lines, and also will consume three coins as credit medals.

The game executable in the basic game of the present embodiment is a game in which a predetermined set of symbols are made along the pay lines.

Furthermore, the liquid crystal display 30 displays, on the upper portion of the reels 3A to 3E, in order from the left, a payout display portion 48, a bet amount display portion 50, and a credit amount display portion 49. The payout amount display portion 48 displays the payout amount of coins when a combination for providing an award is achieved along the pay lines. The credit amount display portion 49 displays the credit amount of coins stored in the gaming machine 13. The bet amount display portion 50 displays the bet amount that is the number of coins bet on the aforementioned pay lines.

Figure 4:
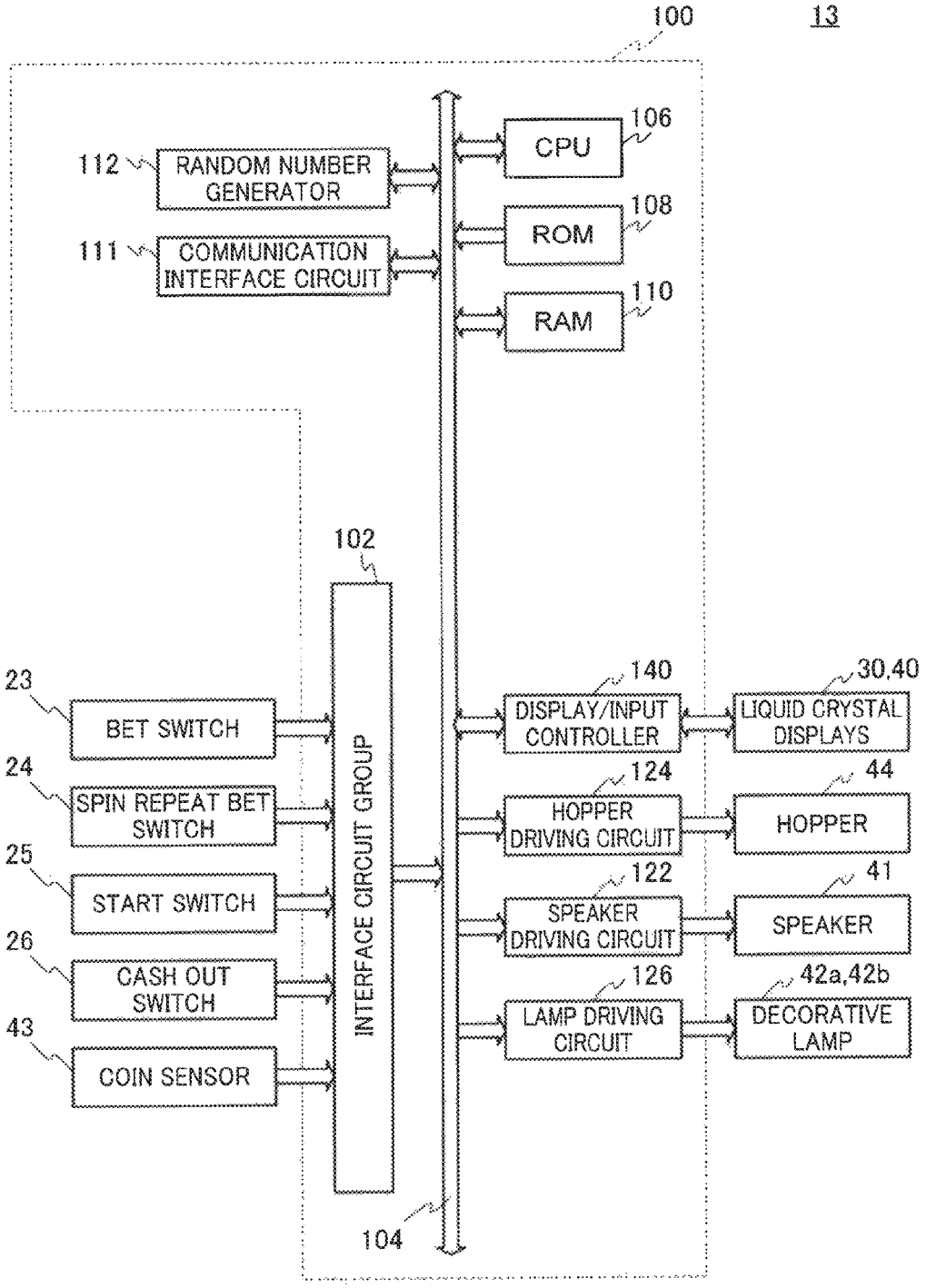
FIG. 4 is a block diagram of a controller of the gaming machine according to the embodiment.

FIG. 4 is a block diagram showing the electrical configuration of the game controller 100 of the gaming machine 13. Referring to FIG. 4, the game controller 100 of the gaming machine 13 is a microcomputer and is provided with an interface circuit group 102, an input-output bus 104, a CPU 106, ROM 108, RAM 110, an interface circuit 111 for communication, a random number generator 112, a speaker drive circuit 122, a hopper drive circuit 124, a lamp drive circuit 126, and a display/input controller 140.

The interface circuit group 102 is connected with the input/output bus 104, which inputs and outputs data signals and address signals to a CPU 106.

The start switch 25 is connected with the interface circuit group 102. A start signal output from the start switch 25 is converted to a predetermined signal by the interface circuit group 102, and then supplied to the input/output bus 104.

The bet switch 23, the spin repeat bet switch 24, and the cash out switch 26 are also connected to the interface circuit group 102. Switching signals output from the switches are also supplied to the interface circuit group 102 and converted to predetermined signals, and then supplied to the input-output bus 104 by the interface circuit group 102.

A coin sensor 43 is also connected to the interface circuit group 102. The coin sensor 43 is a sensor for detecting coins inserted into the coin slot 22, and provided in association with the coin slot 22. A sensing signal, which is output from the coin sensor 43, is also supplied to the interface circuit group 102, converted into a predetermined signal by the interface circuit group 102, and then supplied to the input/output bus 104.

ROM 108 and RAM 110 are connected to the input/output bus 104.

Upon acceptance of the start operation of a game through the start switch 25, the CPU 106 reads a game program to execute the game. The game program is programmed so as to: start displaying the scrolling of the symbols on the five video reels 3A to 3E on the liquid crystal display 30 via the display/input controller 140 and then statically display the five video reels 3A to 3E, to rearrange the five video reels. In a case where a combination of the stationary symbols is displayed along the pay lines and the combination corresponds to a specific combination for providing an award (hereinafter referred to as a "winning combination"), the game program pays out an amount of coins corresponding to the specific combination.

Furthermore, a program for determining an order of stopping the video reels 3A to 3E, in a case where the combination of the symbols statically displayed along the pay lines does not correspond to a winning combination, is stored in the ROM 108. Details thereof are described later. The program is executed only in a case where symbols included in a winning combination are included in the plurality of symbols statically displayed along the pay line. The program is programmed so as to statically display symbols not included in the winning combination on the video reels 3A to 3E, after statically displaying other symbols on the video reels 3A to 3E.

The ROM 108 stores a control program for governing and controlling the gaming machine 13, a program for executing the routines shown in FIGS. 9 and 10 (hereinafter referred to as a "routine execution program"), and initial data for executing the control program, and various data tables used in determination processing. The routine execution program includes the abovementioned game program. Examples of the data tables include a table shown in FIG. 7. The RAM 110 temporarily stores flags, variables, a side bet amount and the like used for the abovementioned control program.

A communication interface circuit 111 is also connected to the input/output bus 104. The communication interface circuit 111 is a circuit for communicating with, for example, external communication devices such as a server, via the network which may include various kinds of networks such as a LAN.

Moreover, the random number generator 112 for generating a random number is connected to the input/output bus 104. The random number generator 112 generates random numbers in a predetermined range of numeric values, for example, 0 to 65535 ($2^{16}-1$). Alternatively, the random numbers may be generated by the arithmetic processing of the CPU 106.

A speaker driving circuit 122 for driving a speaker 41 is also connected to the input/output bus 104. The CPU 106 reads sound data stored in the ROM 108, and transmits the sound data to the speaker driving circuit 122 via the input/output bus 104. Thus, predetermined sound effects are output from the speaker 41.

A hopper driving circuit 124 for driving the hopper 44 is also connected to the input/output bus 104. Upon receipt of a cash out signal input from the cash out switch 26, the CPU 106 transmits a driving signal to the hopper driving circuit 124 via the input/output bus 104. This enables the hopper 44 to pay out a number of coins corresponding to the remaining credits at that point, which is stored in a predetermined memory area in the RAM 110.

Alternatively, the payout of the coins may be performed in a mode of storing credit data in a data card or the like, instead of using physical coins. That is to say, with such an arrangement, the player may have his/her own card, which serves as a storage medium. Upon the player inserting this card into the gaming machine 13, the data relating to the credit is stored in the card.

The lamp driving circuit 126 for driving the decorative lamps 42a and 42b is also connected to the input-output bus 104. The CPU 106 sends a signal for driving the lamps to the lamp driving circuit 126 under a predetermined condition, based on the program stored in the ROM 108. This causes the decorative lamps 42a and 42b to blink and the like.

The display/input controller 140 is also connected to the input/output bus 104. The CPU 106 generates an image display instruction in accordance with the game state and the game result, and outputs the generated image display instructions to the display/input controller 140 via the input-output bus 104. Upon receiving the image display instruction from the CPU 106, the display/input controller 140 generates a drive signal for driving the liquid crystal displays 30 and 40 based on the image display instruction thus received, and outputs the generated drive signal to the liquid crystal displays 30 and 40. As a result, a predetermined image is displayed on the liquid crystal displays 30 and 40. The display/input controller 140 also includes a touch panel 32 on the liquid crystal display 30 (see FIG. 5). The display/input controller 140 transmits the signal input through the touch panel 32 to the CPU 106 via the input/output bus 104, in the form of an input signal. It should be noted that the image display instructions include instructions relating to the payout amount display portion 48, the credit amount display portion 49, and the bet amount display portion 50.

Figure 5:
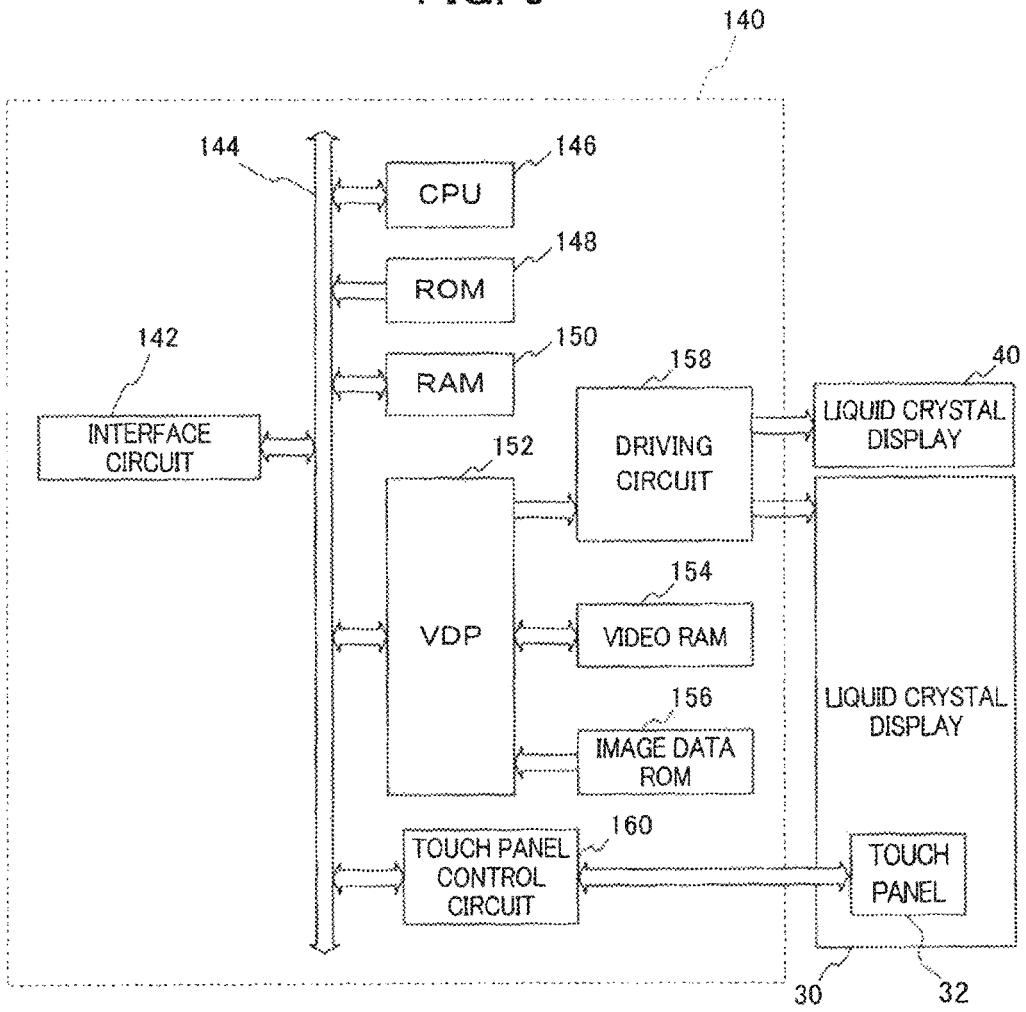
FIG. 5 is a block diagram of a display/input controller of the gaming machine according to the embodiment.

FIG. 5 is a block diagram showing the electrical configuration of the display/input controller 140 of the gaming machine 13. The display/input controller 140 of the gaming machine 13 is a sub-microcomputer for performing image display processing and input control for the touch panel 32. The display/input controller 140 includes an interface circuit 142, an input/output bus 144, a CPU 146, ROM 148, RAM 150, a VDP 152, video RAM 154, image data ROM 156, a driving circuit 158, and a touch panel control circuit 160.

The interface circuit 142 is connected to the input/output bus 144. An image display command output from the CPU 106 of the aforementioned game controller 100 is supplied to the input/output bus 144 via the interface circuit 142. The input/output bus 144 performs input/output of data signals or address signals to and from the CPU 146.

ROM 148 and RAM 150 are connected to the input/output bus 144. The ROM 148 stores a display control program for generating a driving signal, which is to be supplied to the liquid crystal displays 30 and 40, according to an image display command received from the CPU 106 of the aforementioned game controller 100. On the other hand, the RAM 150 stores flags and values of variables used in the display control program.

The VDP 152 is also connected to the input/output bus 144. The VDP 152 is a processing device including a so-called sprite circuit, a screen circuit, a palette circuit and the like, and is capable of performing a variety of processing for displaying an image on the liquid crystal displays 30 and 40. The video RAM 154 and the image data ROM 156 are connected to the VDP 152. The video RAM 154 stores image data based on the image display instructions from the CPU 106 on the game controller 100. The image data ROM 156 stores various kinds of image data containing the abovementioned effect image data. Furthermore, the driving circuit 158 for outputting a driving signal for driving the liquid crystal displays 30 and 40 is connected to the VDP 152.

By reading and executing the display control program stored in the ROM 148, the CPU 146 instructs the video RAM 154 to store image data to be displayed on the liquid crystal displays 30 and 40 in response to the image display instructions from the CPU 106 on the game controller 100. The image display instruction includes various types of image display instructions, such as the abovementioned display instruction of a rendered image.

The image data ROM 156 stores various kinds of image data including the rendered image data.

The touch panel control circuit 160 transmits to the CPU 106 the signals input via the touch panel 32, provided on the liquid crystal display 30, via the input/output bus 144, in the form of an input signal.

Figure 6:
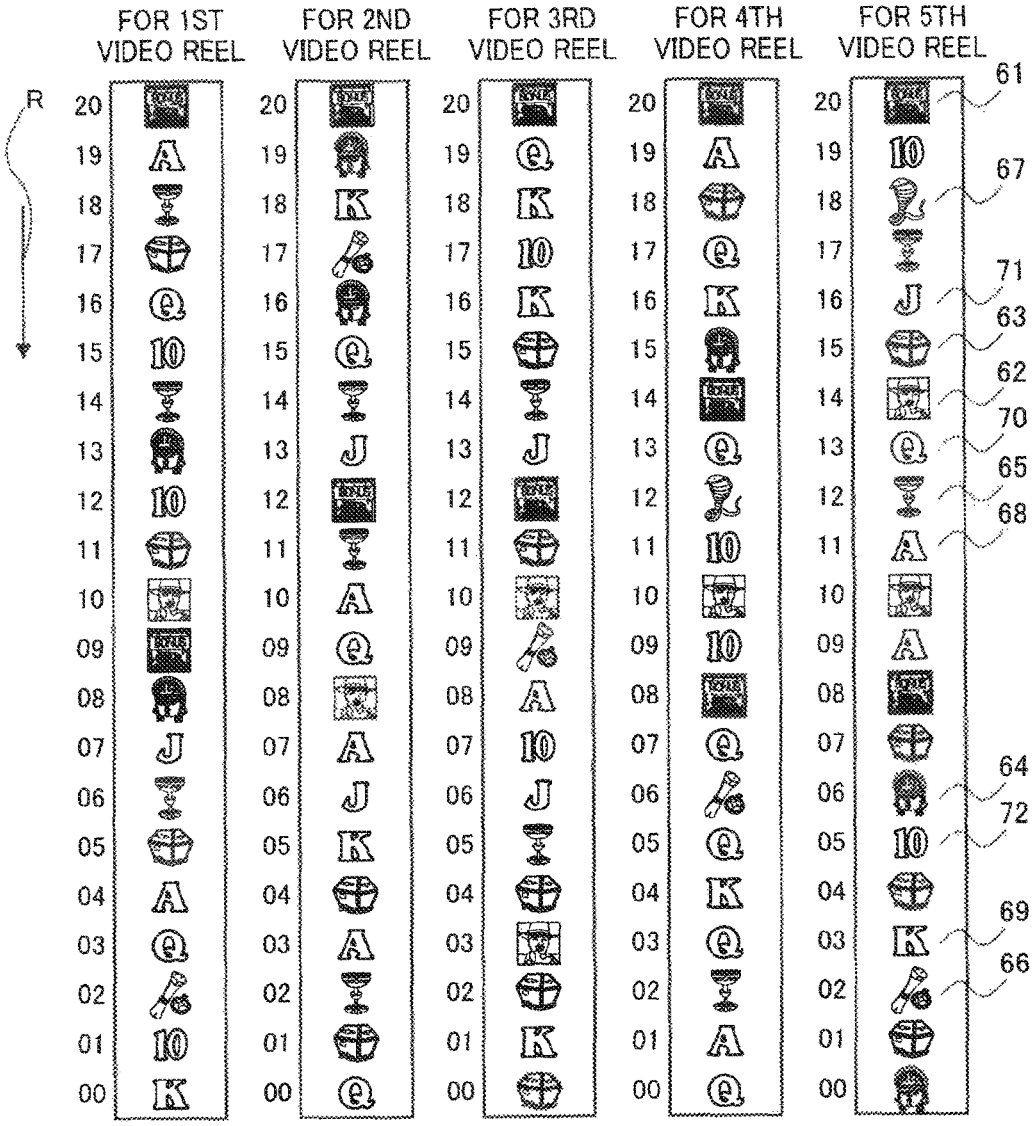
FIG. 6 is a diagram showing symbol groups displayed on the video reels of the gaming machine according to the embodiment.

FIG. 6 shows columns of symbols, where 21 symbols are represented and arranged on image reels 3A to 3E, respectively. It should be noted that the symbol sequence for the first video reel corresponds to the video reel 3A, the symbol sequence for the second video reel corresponds to the video reel 3B, the symbol sequence for the third video reel corresponds to the video reel 3C, the symbol sequence for the fourth video reel corresponds to the video reel 3D, and the symbol sequence for the fifth video reel corresponds to the video reel 3E. A plurality of symbols is arranged in each symbol column and constitutes a symbol group.

As shown in FIG. 6, the code numbers "00" through "20" are assigned to the respective symbols of the symbol sequences for the video reels 3A through 3E. The code numbers are stored (recorded) in the aforementioned ROM 108 (FIG. 4) in the form of a data table.

A symbol sequence is depicted on each of the video reels 3A through 3E. Each symbol sequence includes: a "BONUS" symbol (symbol 61) (hereinafter simply referred to as "BONUS"); a "WILD" symbol (symbol 62) (hereinafter simply referred to as "WILD"); a "TREASURE BOX" symbol (symbol 63) (hereinafter simply referred to as "TREASURE BOX"); a "GOLDEN MASK" symbol (symbol 64) (hereinafter simply referred to as "GOLDEN MASK"); a "HOLY CUP" symbol (symbol 65) (hereinafter simply referred to as "HOLY CUP"); a "COMPASS & MAP" symbol (symbol 66) (hereinafter simply referred to as "COMPASS & MAP"); a "SNAKE" symbol (symbol 67) (hereinafter simply referred to as "SNAKE"); an "A" symbol (symbol 68) (hereinafter simply referred to as "A"); a "K" symbol (symbol 69) (hereinafter simply referred to as "K"); a "Q" symbol (symbol 70) (hereinafter simply referred to as "Q"); a "J" symbol (symbol 71) (hereinafter simply referred to as "J"); and a "10" symbol (symbol 72) (hereinafter simply referred to as "10"). Each of the symbol sequences on the video reels 3A through 3E is moved by displaying a video image in which the corresponding video reels 3A through 3E are rotated in the forward direction (a direction indicated by an arrow R).

In the present embodiment, "BONUS", "WILD", "SNAKE", "TREASURE BOX", "GOLDEN MASK", "HOLY CUP", "COMPASS & MAP", "A", "K", "Q", "J", and "10" are provided as the winning combinations for providing a predetermined award. Basically, the combination (combination data) is control information which associates advantages given to a player (the numbers of payout coins) to winning symbol combinations, and which is used for the stopping control of the image reels 3A to 3E, the switching (conversion) of the state of the game, and the supply of coins.

FIG. 7 shows a symbol layout table. In the symbol layout table, the individual symbols on the image reels 3A to 3E are registered in association with the code numbers designating the positions of the symbols in the aforesaid columns of symbols, respectively. It should be noted that the first through fifth video reels correspond to the video reels 3A through 3E, respectively. In other words, the symbol layout table provides the symbol information with respect to the symbol positions (code numbers) on the video reels 3A to 3E.

In FIG. 7, the aforementioned award types "TREASURE BOX", "GOLDEN MASK", and "COMPASS & MAP" are abbreviated as "TREASURE", "MASK", and "COMPASS", respectively.

FIG. 8 shows a basic game combination table, used in the basic game described later in FIGS. 9 and 10.

In the basic game combination table, names of winning combinations in the basic game, names of symbols displayed on each of the video reels 3A to 3E, and a number of coins are associated to each other. For example, in a case where symbols displayed on the video reels 3A to 3E along the pay line are all "K", a winning combination "K" is achieved.

The "number of coins" is the number of coins to be paid out for each credit amount bet in a game, in a case where a winning combination is achieved. For example, in a case where a winning combination "K" is achieved, the coin number is "13" according to the basic game combination table. Thirteen coins are thus paid out as an award. Although the coins are paid out in the present embodiment, the credit amount corresponding to the coin number can be added to a credit amount stored in a predetermined memory region in the RAM 110.

Figure 9A:
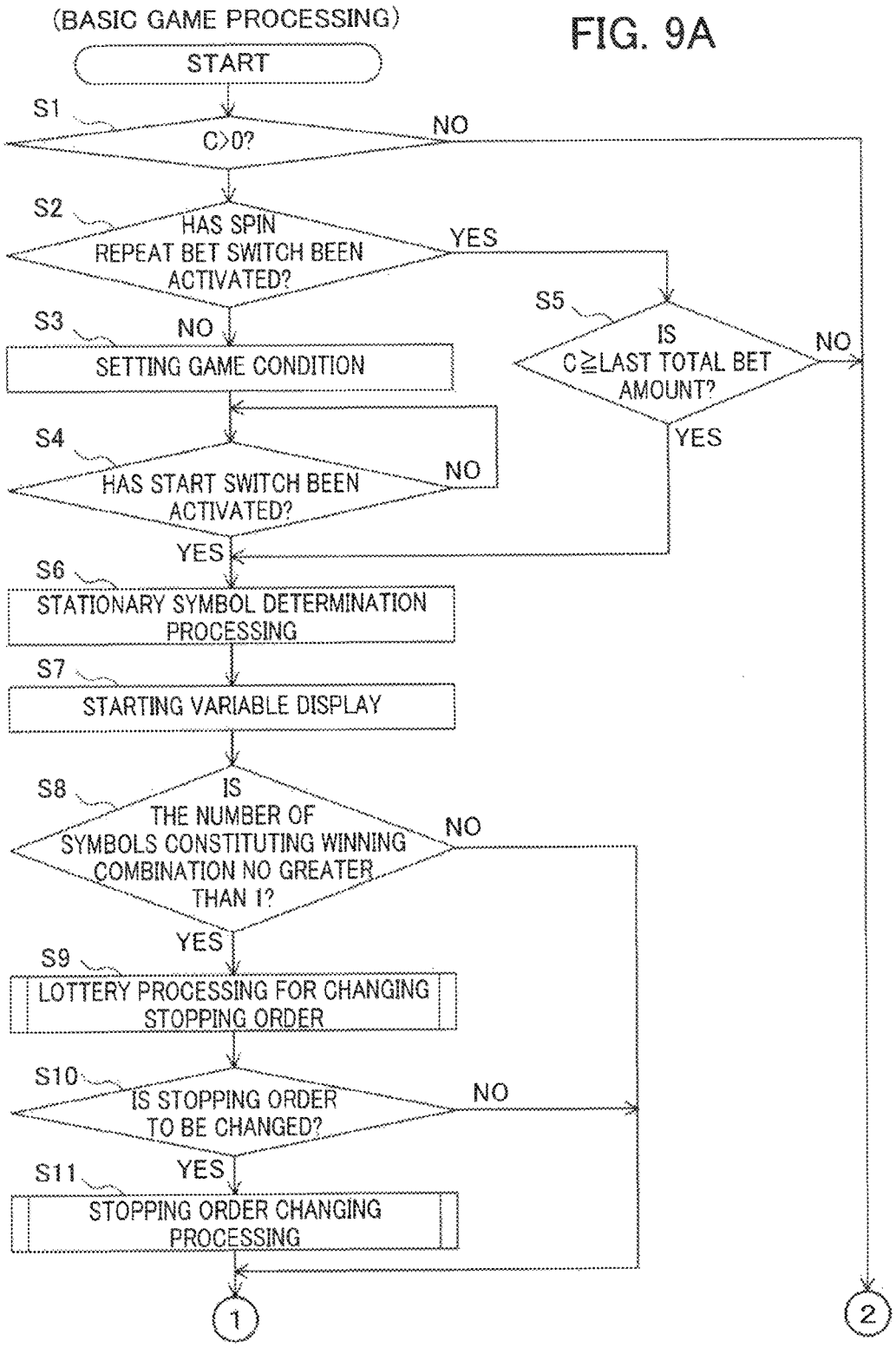
FIGS. 9A and 10A are flow charts of basic game processing executed in the gaming machine according to the embodiment.
Figure 10:
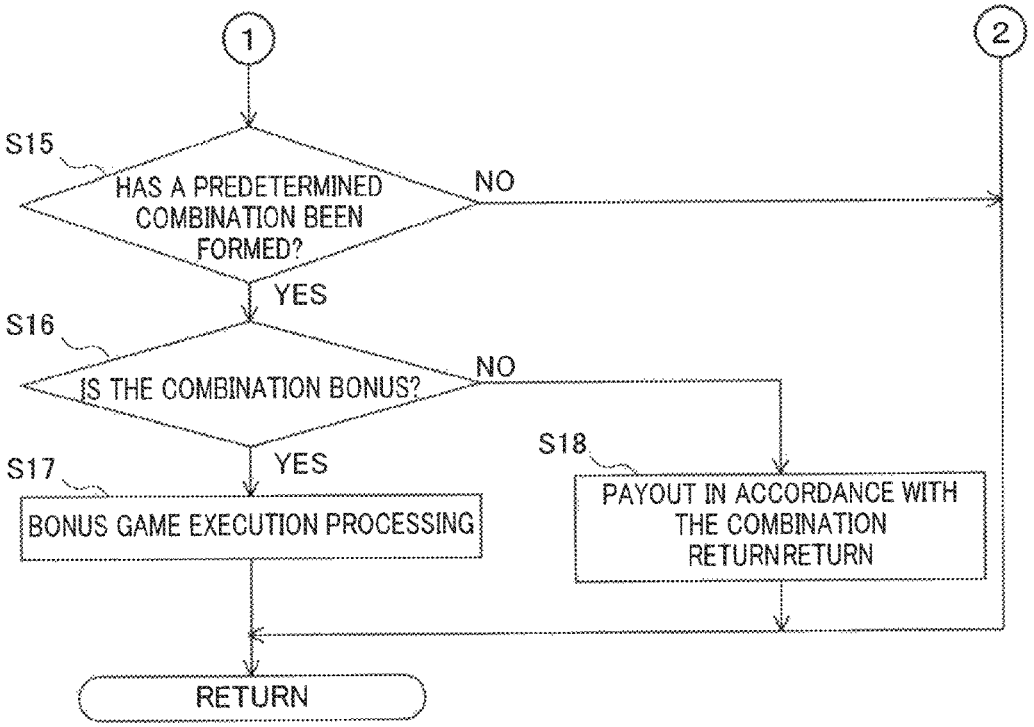

FIGS. 9 and 10 show the flow charts showing the processing of the basic game of the gaming machine 13, executed by the game controller 100 of the gaming machine 13. The one routine shown in FIGS. 9 and 10 corresponds to one execution of a unit game.

It is supposed that the gaming machine 13 is activated in advance and the variables used in the CPU 106 on the game controller 100 are initialized to predetermined values, thereby providing a steady action of the gaming machine 13.

First, the CPU 106 included in the aforementioned game controller 100 determines whether any credits, in other words the coins inserted by the player, remain or not (Step S1). More specifically, the CPU 106 reads the credit amount C stored in the RAM 110, and performs the processing based upon the credit amount C thus read. In a case where the credit amount C is "0" (in the case of a NO determination in Step S1), the CPU 106 is not permitted to start the game. Accordingly, in this case, the CPU 106 ends this routine without performing any processing. On the other hand, in a case where the credit amount C is at least 1 (in the case of a YES determination in Step S1), the CPU 106 determines that there is remaining credit, and accordingly, advances to Step S2.

In Step S2, the CPU 106 determines whether a pushing operation has been performed or not on the spin repeat bet switch 24. In a case where the spin repeat bet switch 24 has been pushed, and accordingly, in a case of reception of an operation signal via the spin repeat bet switch 24 (in the case of a YES determination in Step S2), the CPU 106 advances to Step S5. On the other hand, in a case of reception of no operation signal via the spin repeat bet switch 24 during a predetermined period of time (in the case of a NO determination in Step S2), the CPU 106 determines that the spin repeat bet switch 24 has not been pushed, and accordingly, advances to Step S3.

In Step S3, the CPU 106 sets the game condition. More specifically, the CPU 106 determines the number of coins to be bet on the pay lines set in the current game according to the user's operation via the bet switch 23. In this step, the CPU 106 receives an operation signal generated by the user's operation performed via the bet switch 23. The CPU 106 determines the bet amount for each pay line based upon the number of instances of reception of the bet switch operation signal, and stores the bet amount thus determined in a predetermined memory region in the RAM 110. The CPU 106 reads out the credit amount C written in a predetermined memory region in the RAM 110. Then, the CPU 106 subtracts the total bet amount, which is the sum total of the bet amounts, from the credit amount C thus read out, and stores the value thus subtracted in a predetermined memory region in the RAM 110. The CPU 106 then advances to Step S4.

In Step S4, the CPU 106 waits for operation of the start switch 25 by determining whether the start switch 25 is ON or not. In a case where the start switch 25 is operated and an operation signal is received via the start switch 25 (in the case of a YES determination in Step S4), the CPU 106 determines that the start switch 25 has been operated, and advances to Step S6.

On the other hand, in a case where the flow has proceeded from Step S2 to Step S5, the CPU 106 determines whether or not the credit amount C is at least the total bet amount bet on the previous game. In other words, the CPU 106 determines whether or not the player can start the game by pushing the spin repeat bet switch 24. More specifically, in a case where the spin repeat bet switch 24 has been pushed, and accordingly, in a case where the operation signal has been input from the aforementioned switch 24, the CPU 106 reads out the credit amount C and the bet amount bet on each of the pay lines L1 to L9 in the previous game stored in the predetermined memory region in the RAM 110. Then, the CPU 106 determines whether or not the aforementioned credit amount C is at least the total bet amount bet in the previous game based upon the relation between the credit amount C and the bet amounts thus read out. The CPU 106 performs processing based upon the determination results. In a case where the aforementioned credit amount C is determined to be less than the total bet amount bet on the previous game (in the case of a NO determination in Step S5), the CPU 106 cannot start the game, and accordingly, terminates the present routine without performing any processing. On the other hand, in a case where determination has been made that the aforementioned credit amount C is at least the total bet amount bet in the previous game (in the case of a YES determination in Step S5), the CPU 106 subtracts the total bet amount bet in the previous game from the aforementioned credit amount C, and stores the subtracted value in a predetermined area of the RAM 110. The CPU 106 then advances to Step S6.

In Step S6, the CPU 106 performs static symbol determination processing. More specifically, the static symbol determination processing is executed as follows.

The CPU 106 first acquires five random numbers in the range of 0 to 255, generated by a random number generator 112, which correspond to the five reels 3A to 3E. The CPU 106 then references symbol weighted data corresponding to the payout ratio setting data, and determines code numbers for the reels 3A to 3E on the basis of the five random numbers selected (see FIG. 7). The code numbers for the reels 3A to 3E thus determined correspond to code numbers for symbols rearranged along the pay line L5. For example, in a case where the code numbers of the reels 3A to 3E are determined to be "20", "20", "20", "20" and "20", the symbols displayed on the video reels 3A to 3E are all "BONUS".

In the following Step S7, the CPU 106 displays an image of the five video reels 3A to 3E rotating. In the present embodiment, an image is displayed, which shows that the symbols displayed in the display region displaying the five video reels 3A to 3E are changing. More specifically, in the present embodiment, the CPU 106 displays an image of the video reels 3A to 3E starting to rotate in a predetermined order or at the same time according to the symbol layout table stored in the RAM 110. It should be noted that, any image can be displayed, which shows that the display is changing in each region showing the video reels 3A to 3E.

In Step S8, the CPU 106 determines whether a predetermined symbol combination has been formed or not along the activated pay line being set in accordance with the bet amount, based upon the static symbol determined in Step S6. More specifically, the CPU 106 determines whether a combination of static symbols displayed along an activated pay line is a winning combination or not, after statically displaying symbols along the pay line 5L based upon the code number thereof determined in Step S6. In a case where the combination of the static symbols displayed along the activated pay line is a winning combination (in the case of a YES determination in Step S8), the CPU 106 activates a flag indicating that the player has won the award and indicating the type of winning combination, in order to provide an award with respect to the pay line corresponding to the determined winning combination. Then, the CPU 106 advances to Step S10. The CPU 106 stores the activated flag, indicating that the player has won an award, in a predetermined area in the RAM 110.

On the other hand, in a case where the combination of the static symbols with respect to the activated pay line matches any one of the other combinations, in other words the losing combinations, the CPU 106 does not activate the flag indicating that the player has won an award and advances to Step S9.

In Step S9, the CPU 106 determines whether or not symbols constituting a winning combination are included among the plurality of symbols statically displayed along the activated pay line. More specifically, the CPU 106 refers to a combination table (not shown) storing symbols constituting each winning combination, and compares the plurality of static symbols displayed along the activated pay line with the symbols constituting winning combinations. In a case where symbols constituting a winning combination are included among the plurality of symbols statically displayed along the activated pay line (in the case of a YES determination in Step S9), the CPU 106 advances to Step S11. In a case where symbols constituting a winning combination are not included in the plurality of symbols statically displayed along the pay line (in the case of a NO determination in Step S9), the CPU 106 advances to Step S10.

In Step S10, the CPU 106 randomly determines an order in which the video reels 3A to 3E are statically displayed, and then advances to Step S13. In this processing, in response to a determination in Step S8 that the combination of static symbols is a winning combination, or in response to a determination in Step S9 that the combination does not include symbols constituting a winning combination, the CPU 106 determines the order of stopping the video reels 3A to 3E.

As described later, in a case where the static symbols do not form a winning combination and where the static symbols include symbols constituting a winning combination, video reels displaying symbols not constituting the winning combination are statically displayed after other video reels. Therefore, if the video reels are statically displayed, for example, from 3A to 3E in a case where a winning combination is formed or where symbols constituting a winning combination are not displayed, a player can easily guess the game result from the behavior of video reels. This may deter the players. For this reason, in order to prevent the player from easily guessing the game result from the behavior of video reels, the order of stopping the video reels 3A to 3E is randomly determined, even in a case where a winning combination is formed or where symbols constituting a winning combination are not displayed.

In Step S11, the CPU 106 determines video reels from the reels 3A to 3E, displaying a static symbol not constituting a winning combination. More specifically, the CPU 106 first identifies video reels from the reels 3A to 3E, which are regions where static symbols not constituting a winning combination, which are determined to be statically displayed along the pay line in Step S6, are displayed. Thereafter, the CPU 106 activates a delaying flag for the video reels where the symbols not constituting a winning combination are statically displayed and stores the delaying flag in a predetermined storage region in the RAM 110. After this processing, the CPU 106 advances to Step S12.

In Step S12, the CPU 106 extends a duration of variably displaying the video reels with the delaying flag activated. More specifically, the CPU 106 refers to the delaying flag stored in the RAM 110 and extends duration of continuing variable display of the video reels with the delaying flag activated. Then, the CPU 106 stores the extended duration in the RAM 110, as a predetermined period of time for variably displaying the video reels with the delaying flag activated. After this processing, the CPU 206 advances to Step S13.

In Step S13, the CPU 106 stands by with respect to the video reels 3A to 3E, until the predetermined period of time elapses. After the predetermined period of time has elapsed (in the case of a YES determination in Step S13), the CPU 106 stops rotating the video reels 3A to 3E in accordance with the predetermined period of time for each thereof (Step S14). More specifically, the CPU 106 stops rotating the video reels 3A to 3E as the predetermined period of time for each thereof elapses, so as to statically display the symbols with the code numbers determined in Step S6 along the pay line 5L. The CPU 106 then advances to Step S15 of FIG. 10.

In the following Step S15, the CPU 106 determines whether a winning combination has been formed or not. More specifically, the CPU 106 references the RAM 110 and determines whether a flag indicating an award is activated or not in Step S8. In a case where the flag is activated (in the case of a YES determination in Step S15), the CPU 106 advances to Step S16. On the other hand, in a case where the flag indicating an award has not been activated, in other words, in a case where the symbol combination matches any one of the "other" combinations (in the case of a NO determination in Step S15), the CPU 106 terminates the present routine.

In Step S16, the CPU 106 determines whether the winning combination having been formed is "BONUS" or not. More specifically, in a case where the winning combination is "BONUS" (in the case of a YES determination in Step S16), the CPU 106 advances to Step S17. On the other hand, in a case where the winning combination is not "BONUS" (in a case of a NO determination in Step S16), the CPU 106 advances to Step S18.

In Step S12, the CPU 106 performs bonus game processing. More specifically, the CPU 106 executes the bonus game, and then terminates the present routine.

In Step S18, the CPU 106 pays out coins, the number of which corresponds to the winning combination formed along the pay line. More specifically, the CPU 106 references a combination table for a basic game (FIG. 8), and calculates a payout number of coins corresponding to the winning combination. The CPU 106 reads the credit number stored in the predetermined memory area of the RAM 110, and adds the calculated payout number to the read credit number, and then stores the resulting value in a predetermined memory area in the RAM 110. The CPU 106 displays the aforementioned value thus stored on the credit amount display portion 49. The CPU 106 then terminates the present routine.

A stopping mode of the video reels 3A to 3E, in a case where the video reel 3B has the delaying flag activated, is described hereinafter with reference to FIGS. 11 to 15. More specifically, the stopping mode, in a case of a determination in Step S8 that the combination of static symbols is a winning combination, and a determination in Step S9 that the combination does not include symbols constituting a winning combination, is described. Subsequently, in Step S11, the CPU 106 determines that a symbol not included in a winning combination is statically displayed on the video reel 3B, and the delaying flag for the video reel 3B is activated. Thereafter, the time of variably displaying the video reel 3B has been extended in Step S12. It should be noted that, in the examples shown in FIGS. 11 to 15, only one pay line L5 is specified, and static symbols determined to be displayed along the pay line are "BONUS" or "J".

Figure 11:
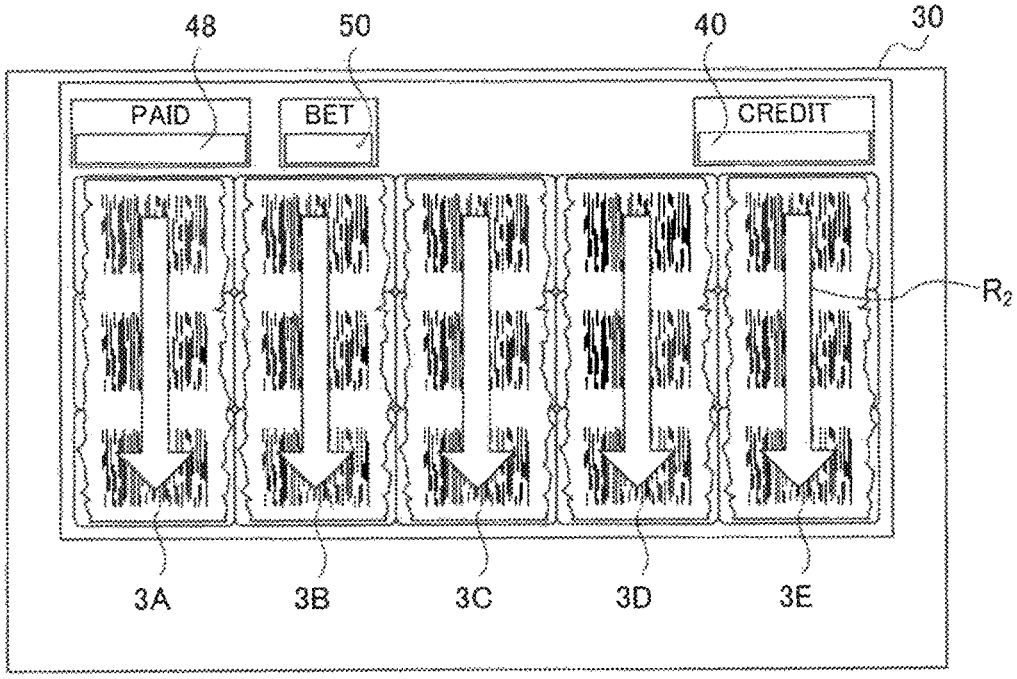
FIG. 11 is a diagram showing a display example of the gaming machine according to the embodiment.

FIG. 11 is a diagram showing the variable display, in which video reels 3A to 3E are rotating in Step S7. In FIG. 11, the video reels 3A to 3E are rotating in a direction indicated by an arrow R2.

Figure 12:
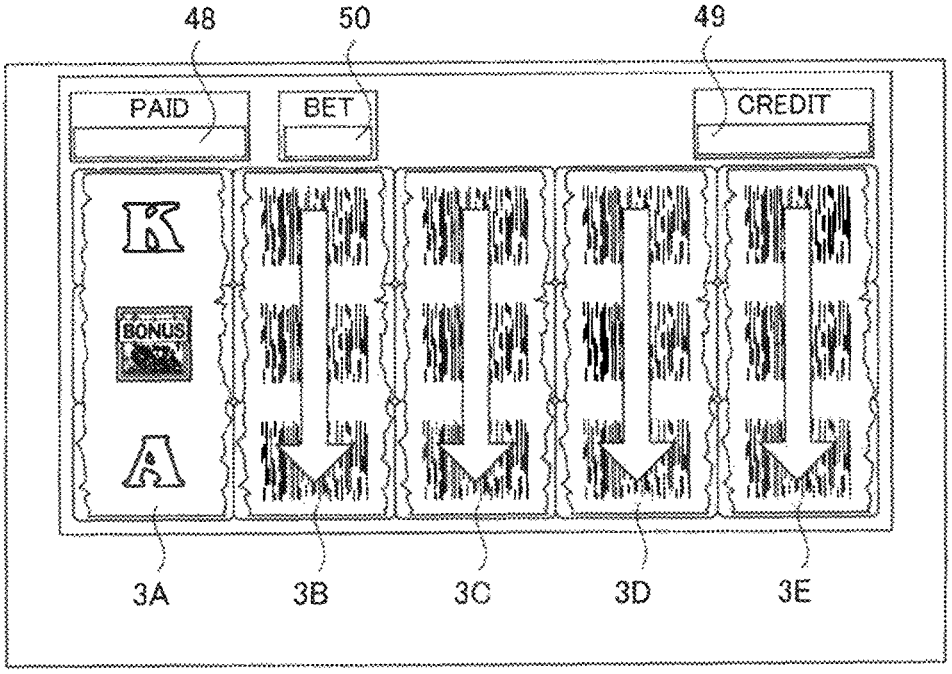
FIG. 12 is a diagram showing a display example of the gaming machine according to the embodiment.

FIG. 12 shows that only the video reel 3A stops rotating and is statically displayed. In other words, in a region showing the video reel 3A, a static symbol "BONUS" determined in Step S6 is displayed.

Figure 13:
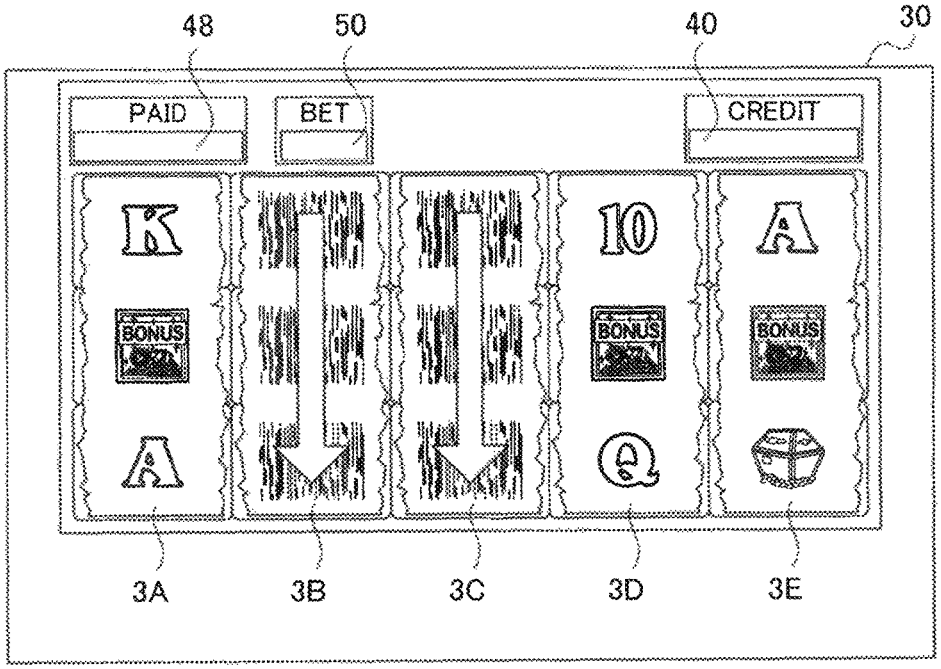
FIG. 13 is a diagram showing a display example of the gaming machine according to the embodiment.

In FIG. 13, the video reels 3D and 3E also stop rotating and are statically displayed. In addition, the video reels 3B and 3C are still variably displayed.

Figure 14:
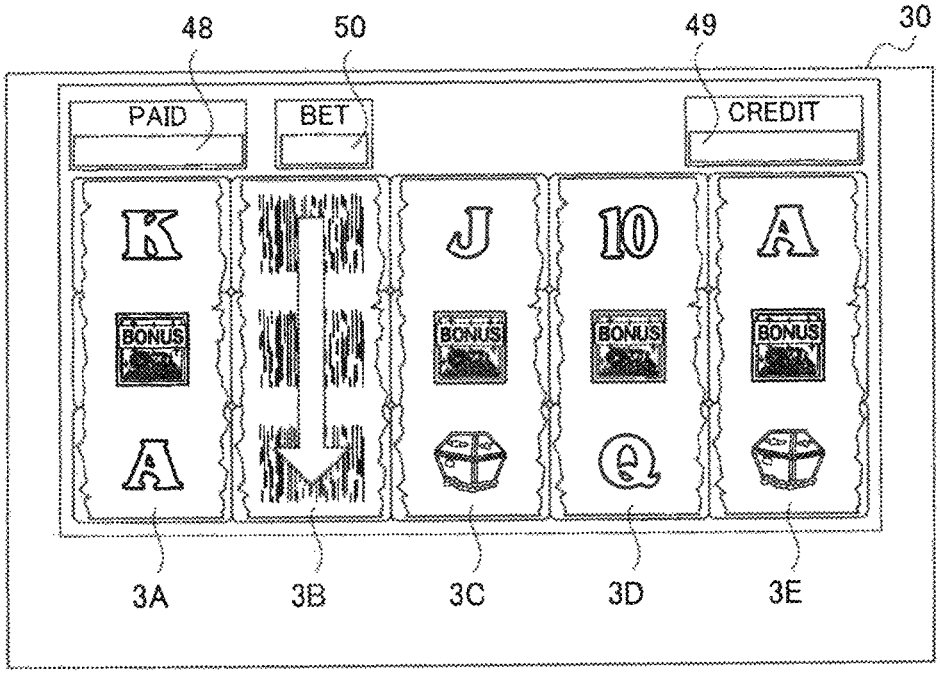
FIG. 14 is a diagram showing a display example of the gaming machine according to the embodiment.

In FIG. 14, the video reel 3C also stops rotating and is statically displayed. In addition, the video reel 3B is still variably displayed.

Figure 15:
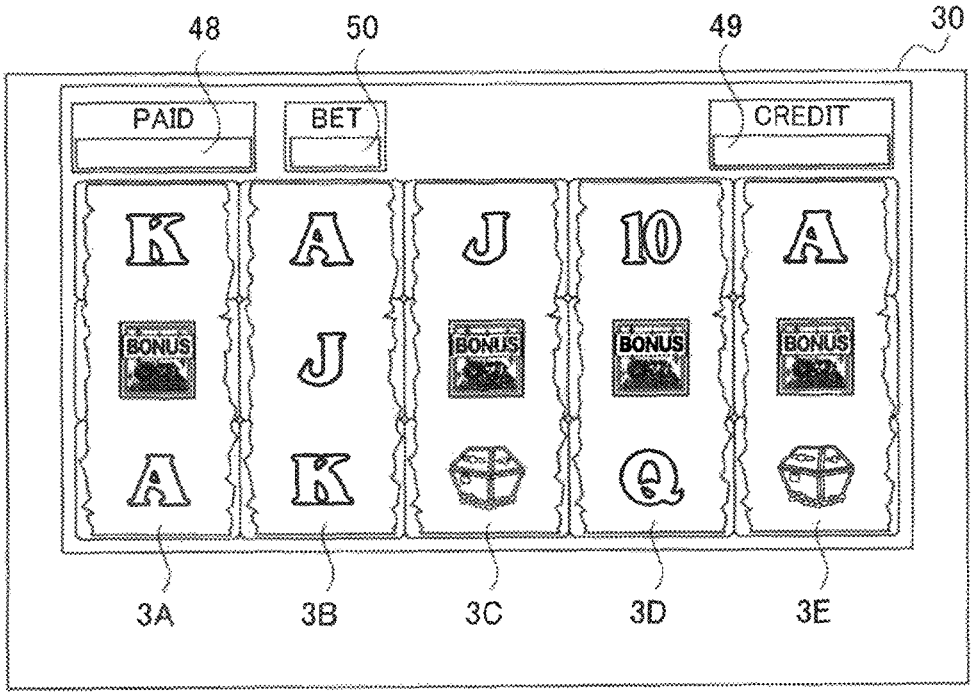
FIG. 15 is a diagram showing a display example of the gaming machine according to the embodiment.

FIG. 15 shows that all the video reels 3A to 3E stop rotating and are statically displayed. In other words, the video reel 3B has stopped rotating last. Furthermore, the only static symbol displayed on the video reel 3B is a symbol J, not constituting a winning combination. The stopping order is thus changed so that the video reel 3B, displaying the symbol "J" not constituting the winning combination "BONUS" along the pay line, stops rotating after other video reels, 3A, 3C, 3D, and 3E.

This processing is beneficial in such a case where a winning combination is nearly achieved. In other words, the present invention can raise the anticipation of a player, by stopping rotating video reels statically displaying symbols not constituting an winning combination after other video reels.

Second Embodiment

A second embodiment of the present invention is hereinafter described with reference to FIGS. 16 to 20. In the second embodiment, different processing is executed for determining the order of stopping the variable display of the video reels 3A to 3E. More specifically, the second embodiment is different from the first embodiment in that a CPU selects a stopping pattern by referencing a pattern data table storing stopping patterns of the video reels 3A to 3E. Differences from the first embodiment are mainly described and descriptions for configurations and operations that are similar to the first embodiment are omitted. Configurations and operations that are similar to that of the first embodiment are referred to with the same reference numbers.

FIG. 16 is a flowchart showing basic game processing of the second embodiment.

The processing denoted by Step S21 to Step S27 is the same as in the first embodiment, and description thereof is thus omitted.

In Step S28, as in Step S8 of the first embodiment, the CPU 106 determines whether a predetermined symbol combination has been formed or not along the activated pay line being set in accordance with the bet amount, based upon the static symbol determined in Step S26. Detailed processing for the determination in Step S28 is the same as in Step S8, and a description thereof is thus omitted. In a case where static symbols displayed along an activated pay line are determined to form a winning combination (in the case of a YES determination in Step S28), the CPU 106 advances to Step S31. In a case where the static symbols are determined not to form a winning combination (in the case of a NO determination in Step S28), the CPU 106 advances to Step S29.

In Step S29, the CPU 106 extracts an analogous winning combination. More specifically, regarding each of the video reels 3A to 3E, a static symbol determined to be displayed thereon is compared to symbols constituting each of the winning combinations. Subsequently, in a case where the static symbol does not constitute a winning combination, the CPU 106 counts the number of static symbols not constituting each winning combination. Thereafter, the CPU 106 stores an analogous winning combination in the RAM 110, which is a winning combination having the greatest number of symbols in common with the combination of the static symbols.

In Step S30, the CPU 106 determines display regions (video reels 3A to 3E), displaying a static symbol not constituting the analogous winning combination. More specifically, the CPU 106 compares the symbols constituting the analogous winning combination extracted in Step S29 with each of the static symbols displayed on the video reels 3A to 3E. Thereafter, the CPU 106 activates a delaying flag for the video reels where the symbols not constituting the analogous winning combination are statically displayed. In a case where the delaying flag is activated, the CPU 106 stores the activated delaying flag in the RAM 110.

In Step S31, the CPU 106 performs stopping pattern determination processing. Details thereof are described later. After this processing, the CPU 106 advances to Step S32.

In Step S32, CPU 106 determines whether a predetermined period of time has elapsed. In a case where the predetermined period of time has elapsed (in the case of a YES determination in Step S32), the CPU 106 advances to Step S33. On the other hand, in a case where the predetermined period of time has not elapsed (in the case of a NO determination in Step S32), the CPU 106 stands by until the predetermined period of time has elapsed.

In Step S33, the CPU 106 performs reel rotation stopping processing. More specifically, the CPU 106 sequentially stops the reels 3A to 3E based upon the stopping pattern determined by the pattern data table (described later).

The following processing is similar to the first embodiment (Step S16 and thereafter of FIG. 10), and therefore the description thereof is not repeated.

Stopping pattern determination processing is described hereinafter with reference to FIGS. 17 to 20.

Figure 17:
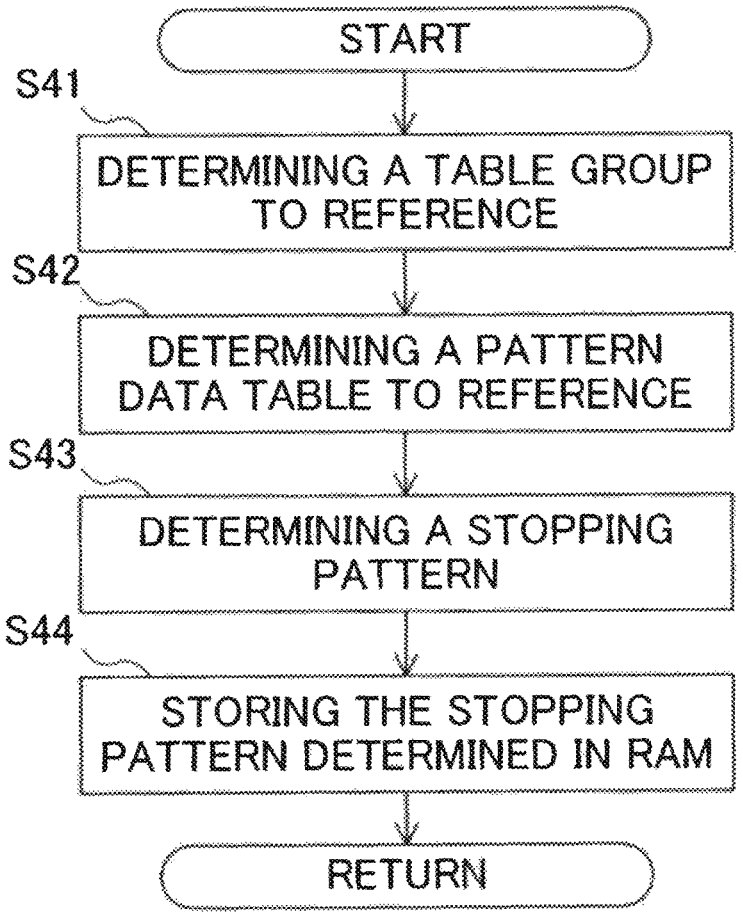
FIG. 17 is a flowchart of stopping pattern determination processing executed in the gaming machine according to a second embodiment of the present invention.

FIG. 17 is a flowchart showing the stopping pattern determination processing. FIG. 18 is a diagram showing a reference table group determination table, which is referenced in Step S41. FIG. 19 is a diagram showing a pattern data table determination table, which is referenced in Step S42. FIG. 20 is a diagram showing a pattern data table, which is referenced in Step S43. A detailed description is provided hereinafter with reference to the drawings.

First, in Step S41, the CPU 106 determines a table group to reference, in accordance with the number of symbols not constituting the analogous winning combination. More specifically, the CPU 106 determines a table group to reference, by referencing the reference table group determination table of FIG. 18.

In the reference table group determination table (FIG. 18), the number of video reels displaying a static symbol not constituting the analogous winning combination is associated with names of table groups to reference. For example, the number "0" stored in a column "number of different symbols" indicates that a winning combination is achieved. The number "1" indicates that there is one symbol not constituting an analogous winning combination. In a case where the number is "0", the name of a table group to reference is "win" table group. In a case where the number is "1", the name of a table group to reference is lose1 table group. After determining a table group to reference in accordance with the number of different symbols, the CPU 106 advances to Step S42.

In Step S42, the CPU 106 determines a pattern data table to reference. More specifically, the CPU 106 first references the pattern data table determination table (FIG. 19) for the table group determined in Step S41. Thereafter, the CPU 106 further determines the pattern data table (FIG. 20) to reference, based upon the video reels where the symbols not constituting the analogous winning combination are statically displayed (with the delaying flag activated in Step S30 of FIG. 16).

FIG. 19 is a pattern data table determination table for the lose1 table group. A similar pattern data table determination table is provided for each of the other table groups. In the pattern data table determination table, video reel names are associated with table names. The video reel names are names given to each of the video reels 3A to 3E. The table names are names given to each of the pattern data table referenced in the following processing.

The CPU 106 references, in the pattern data table determination table for each table group, rows for the video reels where the symbols not constituting the analogous winning combination are statically displayed (with the delaying flag activated in Step S30 of FIG. 16). The CPU 106 then determines a pattern data table, of which the name is associated with the corresponding video reel number, to be the pattern data table to reference. After this processing, the CPU 106 advances to Step S43.

In Step S43, the CPU 106 determines pattern data. The pattern data determined in this processing is data used for determining the order of stopping the variable display of the video reels 3A to 3E. The CPU 106 references the pattern data table (FIG. 20) and determines the pattern data.

In FIG. 20, the pattern data table lose1_3A of the lose1 table group is shown as an example. A pattern data table is provided to each table group, and provided in association with each of the video reels 3A to 3E as shown in FIG. 19.

In the pattern data table, pattern numbers, values to be subtracted, and video reel names are associated with each pattern data. The pattern number is a number for pattern data. The value to be subtracted is a value used for selecting the pattern number. The video reel names are names given to each of the video reels 3A to 3E. The number stored in a column for each video reel name represents the stopping order. In other words, pattern data of a specific pattern number includes the stopping order of each of the video reels 3A to 3E. For example, the pattern data with a pattern number 3A_1 indicates the stopping order 3B-3C-3D-3E-3A.

In addition, a method of selecting a pattern number in the pattern data table is explained hereinafter. The CPU 106 uses a random number generated by a random number generator 112 and the value stored in the "values to be subtracted" column. First, the CPU 106 generates a random number by the random number generator 112 and stores the random number in the RAM 110. Thereafter, the CPU 106 sequentially subtracts the values, stored in the column "value to be subtracted" in the pattern data table, from the random number thus generated. In a case where the result thereof is smaller than 0, the pattern data associated to the value last subtracted is determined to be the pattern data determined in Step S43.

For example, a case is described with a random number of 550 generated by the random number generator 112. The CPU 106 subtracts a value to be subtracted of 250, which is associated with the first pattern number (for example, 3A_1), from the random number of 550. The result will be 300, which is a positive number. Subsequently, the random number of 250, which is associated with the subsequent pattern number (3A_2) is subtracted from 300. The result will be 50, which is a positive number. Furthermore, the value to be subtracted, associated with the subsequent pattern number (3A_3), is subtracted from 50. The result thereof will be −200, which is a negative number. As a result, the CPU 106 determines the pattern data 3A_3 to be the pattern data determined in Step S43. After this processing, the CPU 106 advances to Step S44.

The pattern data is thus determined based upon the number of video reels displaying symbols not constituting the analogous winning combination (the reference table group determination table of FIG. 18) and the position thereof (the pattern data determination table of FIG. 19). In the pattern data stored in each pattern data table, the stopping order is defined so that the video reels displaying symbols included in the analogous winning combination are preferentially statically displayed. Therefore, the pattern data table is developed so that the video reels displaying different symbols stop rotating after other reels.

For example, in the pattern data table of FIG. 20, the video reel displaying a symbol different from the symbols constituting the analogous winning combination is the video reel 3A. Therefore, the stopping order thereof is the fifth place (the last).

In the pattern data table determination table, in a case where the number of different symbols is greater than 1, the first video reel to the left displaying the different symbol is selected. For example, a case is described where the number of different symbols is 3 (a case where a table number name lose3 is selected in the reference table group determination table). In a case where the different symbols are displayed on the video reels 3B, 3D, and 3E, the video reel selected in the pattern data table determination table is the video reel 3B.

The reference table group determination table, the pattern data table determination table, and the pattern data table are stored in a predetermined storage region in the ROM 108 and appropriately read by the CPU 106, as necessary.

In Step S44, the CPU 106 stores the pattern data determined in Step S43 and terminates the present routine.

While embodiments of the gaming machine according to the present invention has been described, it is to be understood that the above description is intended to be illustrative, and not restrictive, and any changes in design may be made to specific configurations such as various means. Additions, omissions, substitutions, and other modifications can be made thereto without departing from the spirit or scope of the present invention.

In the first embodiment, the CPU 106 extends a predetermined duration of variably displaying the video reels with the delaying flag activated in Step S12; however, the present invention is not limited thereto. For example, any one of the video reels 3A to 3E, with the delaying flag activated, can be configured to be statically displayed last. More specifically, the CPU 106 changes the stopping order from a standard stopping order, so that any one of the video reels 3A to 3E, with the delaying flag activated, is statically displayed last. The standard stopping order is used in a case where the delaying flag is not activated for all the video reels 3A to 3E, and starts from the video reel 3A to the video reel 3E. The video reels with the delaying flag not activated can be configured to be stopped in the standard stopping order or randomly stopped in an order determined by the CPU 106.

In the second embodiment, to determine the pattern data in Step S43, the CPU 106 references a value to be subtracted in the pattern data table and subtracts the value to be subtracted sequentially from the first data in the pattern data table; however, the present embodiment is not limited thereto. For example, the CPU 106 can reference the pattern data from the row below the row referenced in the previous Step S43. In a case where the subtraction is done to the last pattern data in the table, the subtraction can be resumed from the first row in the table or the first row can be referenced from the last row.

The value to be subtracted is the same for all the rows in the pattern data table; however, the present invention is not limited thereto and the value to be stored in each row can be arbitrarily selected. In such a case, some of the numbers can be the same value, and alternatively, all the numbers can be different. Different numbers can make the probability of selection different for each pattern number.

Furthermore, in the abovementioned first and the second embodiment, the gaming machine 13 executes a slot game using the video reels 3A to 3E; however, the present invention is not limited thereto. For example, the gaming machine 13 can execute a slot game using mechanical reels or a so-called all scatter type slot game.

In the all scatter type slot game, the liquid crystal display 30 of the gaming machine 13 displays, for example, 15 symbols in 3 rows by 5 columns. Each of the symbol display regions for displaying the 15 symbols displays a symbol from a plurality of symbols assigned to the symbol display regions. The CPU 106 variably displays each of the symbols in each symbol display region, and finally statically displays one of the symbols. In other words, each of the symbol display regions is a so-called video reel.

In the all scatter type slot game, the pay lines L1 to L9 are not defined and an award is provided based upon the arrangement of symbols displayed after a rearrangement. More specifically, an award is provided based upon the number of symbols, of which type is determined in advance, included among a plurality of symbols displayed after rearrangement. An award is provided in the form of additional credit, a predetermined bonus, or an execution of a second game. In this case, after starting the game, the CPU 106 determines whether a so-called qualifying symbol is to be statically displayed or not after rearrangement (corresponding to Step S8 of FIG. 9). In a case where the qualifying symbol is not to be statically displayed, the CPU 106 randomly determines a stopping order of symbols in each symbol display region (corresponding to Step S10 of FIG. 9). On the other hand, in a case where the qualifying symbol is to be statically displayed, the CPU 106 determines the stopping order so that the symbol display regions displaying non-qualifying symbols stops rotating after the qualifying symbols, and controls the symbol display regions according to the stopping order.

In this case, in a case where more than a predetermined number of the qualifying symbols is to be displayed, all the other symbols may not be necessarily displayed after the qualifying symbols. For example, the qualifying symbols can be statically displayed at a predetermined interval, while symbols are stopping rotating in the 15 symbol display regions. For example, in a case where five qualifying symbols are to be displayed after a rearrangement, each of the qualifying symbols can be statically displayed in the third, sixth, ninth, twelfth, and fifteenth. It should be noted that the intervals are not necessary even; for example, all the qualifying symbols can be statically displayed, evenly or consecutively, after the seventh or before the eighth. That is, the stopping order can be configured so that the qualifying symbols can be statically displayed in the first half or in the latter half of a period of time for statically displaying all the symbol display regions. In other words, the stopping order can be configured so that the non-qualifying symbols can be statically displayed in the first half or in the latter half of a period of time for statically displaying all the symbol display regions.

An embodiment of the present invention will be described below with reference to the accompanying drawings.

Figure 1A:
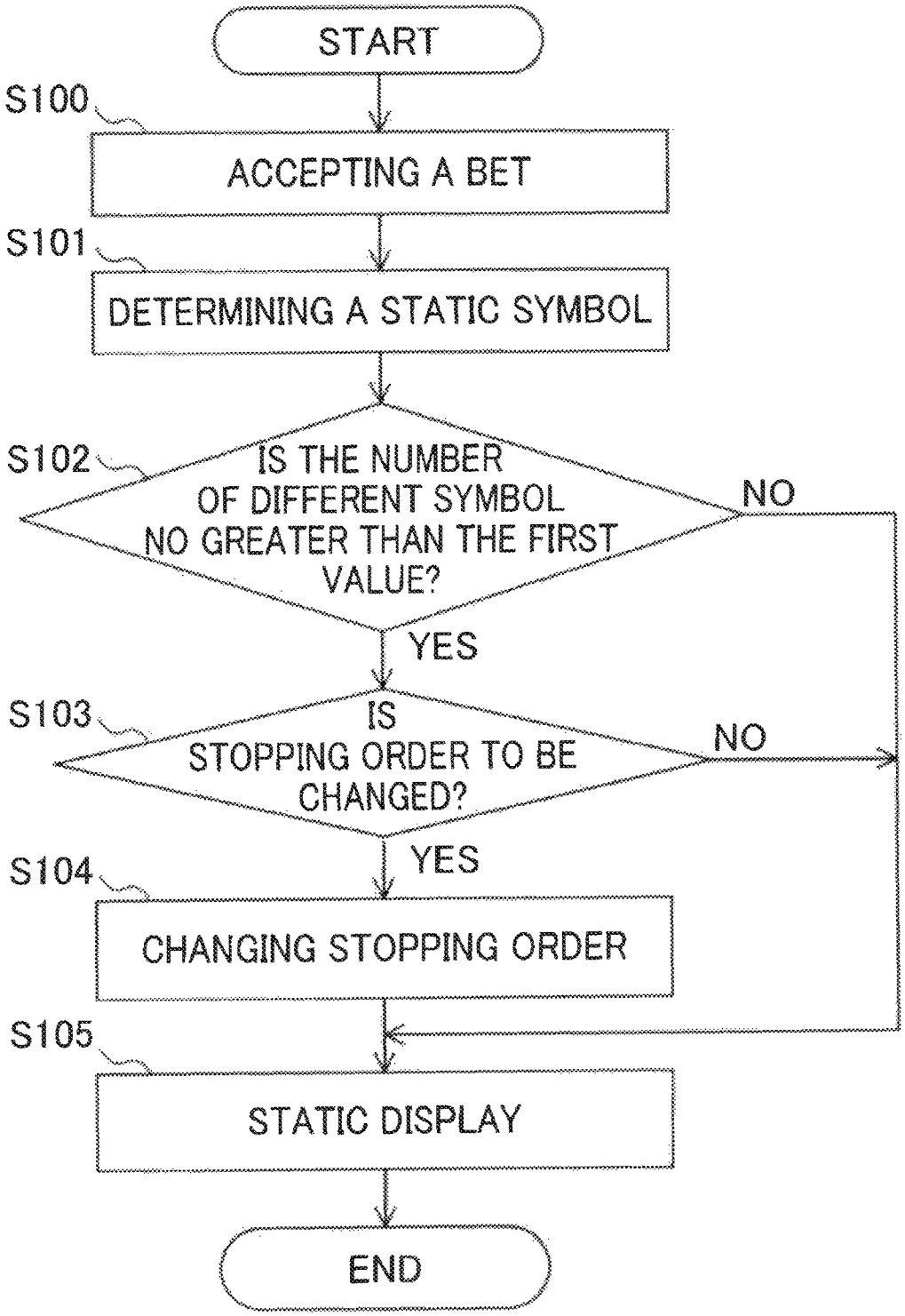
FIG. 1A is an outline of a flow chart of processing executed in a gaming machine according to an embodiment of the present invention.

A processing outline of the gaming machine according to the present invention is described hereinafter with reference to FIG. 1A.

Before starting a game, a gaming machine 1 of the present embodiment accepts a bet (Step S100), and determines static symbols (Step S101). Details are described later. Thereafter, the gaming machine 1 compares symbols to be statically displayed along an activated pay line after the variable display with symbols constituting a combination qualified for an award, and determines whether a quantity of different symbols is no greater than a first value (Step S102). In a case where the quantity is smaller than the first value (in the case of a YES determination in Step S102), the gaming machine 1 further determines whether to change a stopping order or not (Step S103). On the other hand, in a case where the quantity is greater than the first value (in the case of a NO determination in Step S102), the gaming machine 1 statically displays the symbols in a standard stopping order (Step S105). In a case where the stopping order is determined to be changed in Step S103 (in the case of a YES determination in Step S103), the gaming machine 1 newly determines a stopping order (Step S104) and statically displays the symbols in the newly determined stopping order (Step S105). On the other hand, in a case where the stopping order is determined not to be changed in Step S103 (in the case of a NO determination in Step S103), the gaming machine 1 statically displays the symbols in a standard stopping order (Step S105).

The gaming machine 1 according to an embodiment of the present invention is hereinafter described.

Figure 2A:
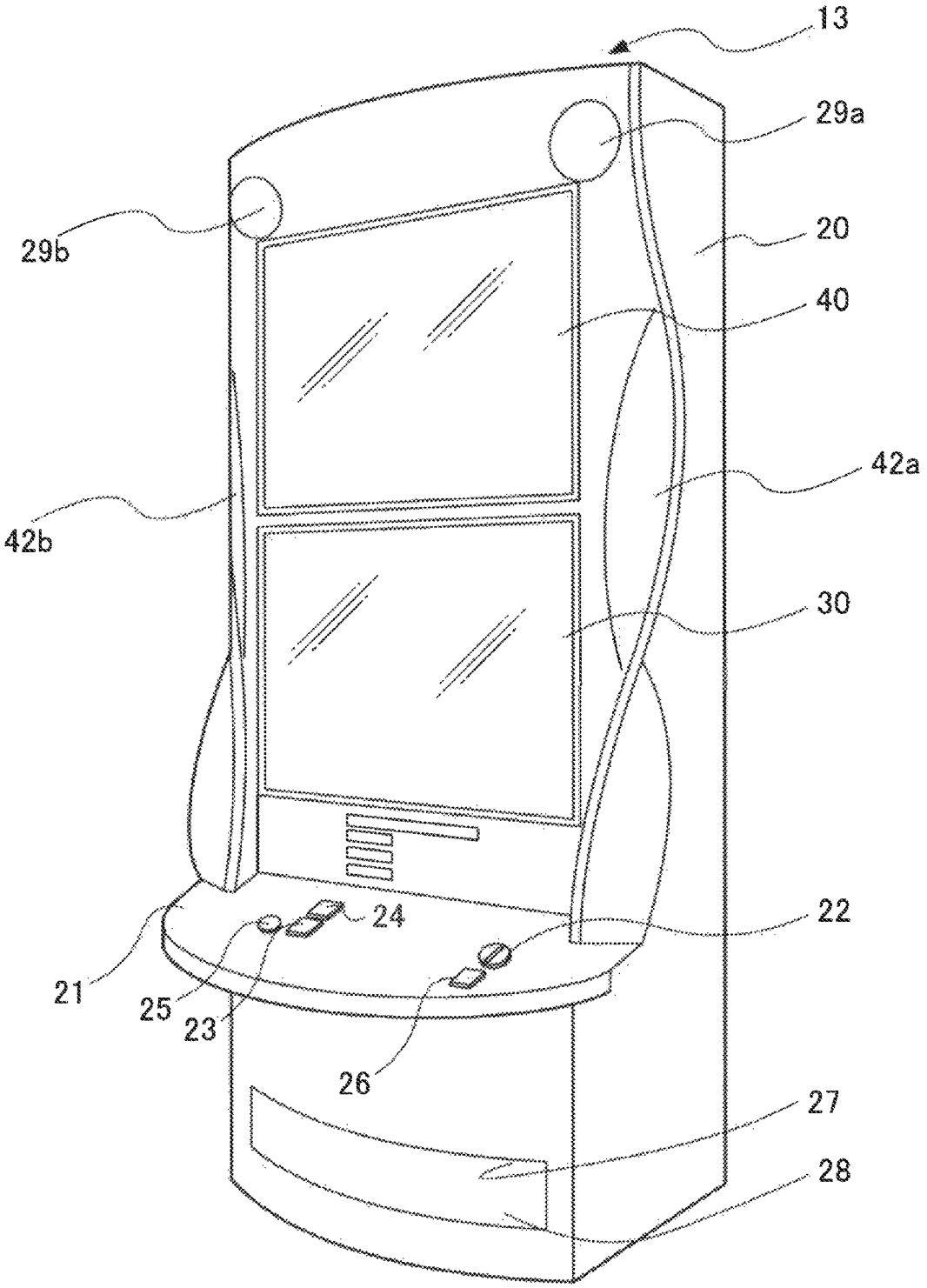
FIG. 2A is a perspective view showing the appearance of the gaming machine according to the embodiment.

FIG. 2A is a perspective view of the gaming machine 13 according to an embodiment of the present invention.

The gaming machine 13 includes a cabinet 20. The cabinet 20 contains various components including a game controller 100 (refer to FIG. 4A) for electrically controlling the gaming machine 13, and a hopper 44 (refer to FIG. 4A) for controlling the insertion, storage, and payout of coins as a game medium, and the like. The game medium is not limited to coins, and it may be, for example, medals, tokens, electronic money, or electronic valuable information (credits) equivalent thereto.

A liquid crystal display 30 is disposed at substantially the center of the front face of the cabinet 20, and a liquid crystal display 40 is disposed above the display 30.

The liquid crystal display 30 realizes a display device for displaying a variety of images related to the game, including effect images and the like. The player advances the game while observing the variety of images displayed on the liquid crystal display 30. In such a game, the liquid crystal display 30 displays a slot game (described later).

The gaming machine 13 is configured with video reels and displays three virtual reels on a liquid crystal display 30. Furthermore, it should be noted that the term "video reel" as used here represents a mechanism for displaying a reel on the liquid crystal display 30 in the form of an image, instead of a mechanical reel. As a plurality of types of necessary symbols for the game, the following symbols of "BONUS", "WILD", "TREASURE BOX", "GOLDEN MASK", "HOLY CUP", "COMPASS&MAP", "SNAKE", "A", "K", "Q", "J", and "10" are displayed together with images which appear spinning.

The other liquid crystal display 40 disposed above the liquid crystal display 30 is a sub display for displaying the rules of the game, demonstration movies, and the like. In addition, sound transmission openings 29a and 29b are provided on both the left and right sides above the liquid crystal display 40, which allow the sound effects generated by a speaker 41 (see FIG. 4A) stored within the cabinet 20 to propagate outside the cabinet 20. The sound effects in accordance with the progress of the game or the like can be output through the sound permeable openings 29a and 29b. Decorative lamps 42a and 42b are disposed on the right and left sides of liquid crystal displays 30 and 40 of the gaming machine 13. The decorative lamps 42a and 42b emit light in accordance with the progress of the game.

An operation unit 21, which is substantially horizontal to the ground, is provided below the liquid crystal display 30. Disposed on the right side of the operation unit 21 is a coin slot 22 through which coins are inserted into the gaming machine 13. A bet switch 23 is provided on the left side of the operation unit 21.

The bet switch 23 is used for determining the number of coins, as a game medium, to bet.

In accordance with the number of coins bet by the bet switch 23, a line for determining whether an award is to be provided (hereinafter referred to as "pay line") is activated among five lines L1, L2, L3, L4, and L5 (see FIG. 3A) for providing an award.

In addition, a spin repeat bet switch 24 is provided between the liquid crystal display 30 and the bet switch 23. The spin repeat bet switch 24 allows the player to play the game again without changing the number of coins bet on the pay line in the previous game. The number of coins to be bet on the abovementioned pay line can be decided by pressing the bet switch 23 or the spin repeat bet switch 24.

In the operating part 21, a start switch 25 for accepting a starting operation of each game by a player is disposed on the left side of the bet switch 23. Pressing either the start switch 25 or the spin repeat bet switch 24 triggers the start of the game and then displays an image in which the aforementioned five image reels 3A to 3C start to spin.

On the other hand, a cash out switch 26 is provided near the coin insertion opening 22 in the aforementioned operation unit 21. When the player presses the cash out switch 26, the inserted coins are discharged from a coin discharge slot 27 opening into a lower part of the front face of the cabinet 20. The discharged coins can be gathered on a coin tray 28.

Figure 3A:
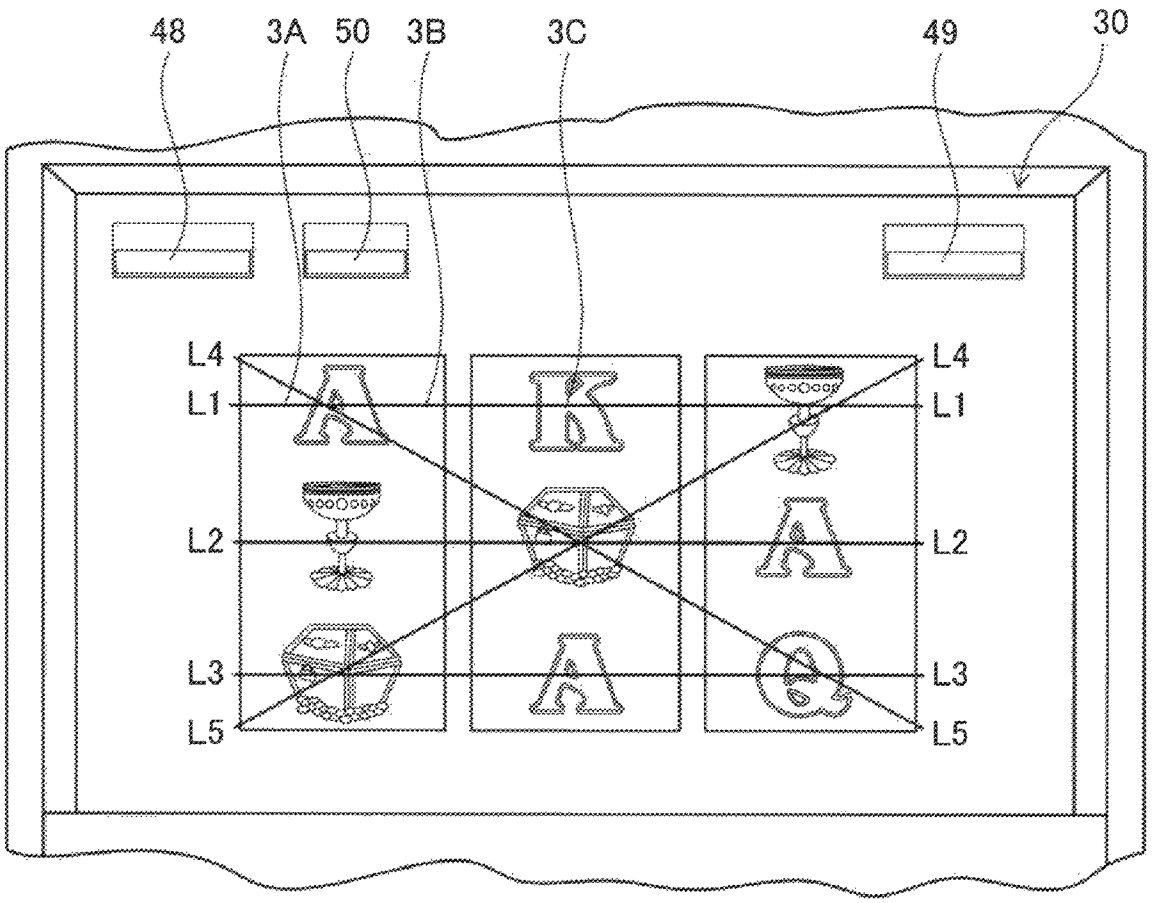
FIG. 3A is an enlarged front view showing a display region of the gaming machine according to the embodiment.

FIG. 3A is an enlarged view which shows the display region of the gaming machine 13. The display region of the gaming machine 13 is a region displayed on the liquid crystal display 30 for displaying mainly images relating to the game. In the present embodiment, the display region includes symbol display regions displaying the three video reels 3A to 3C. Each of the video reels 3A to 3C displayed on each display region displays three symbols in a direction vertical to the longitudinal direction of the liquid crystal display 30. As described later, the three symbols displayed on the video reels 3A to 3C are selected from a plurality of kinds of symbols determined in advance for each of the video reels 3A to 3C.

In addition, five lines L1 to L5 for providing an award are provided across the video reels 3A to 3C (FIG. 3A). The lines L1 to L5, for providing an award, extend so as to pass through a symbol displayed on each of the image reels 3A to 3C, when all of the spinning five video reels 3A to 3C come to a stop.

Pressing the bet switch 23 once will activate, for example, the line L1 for providing a first award and also will consume a coin as a credit medal.

Pressing the bet switch 23 twice will activate, for example, the line L2 for providing a second award and the line L3 for providing a third award, in addition to the abovementioned line, and also will consume two coins as credit medals.

Pressing the bet switch 23 three times will activate, for example, the line L4 for providing a fourth award and the line L5 for providing a fifth award, in addition to the abovementioned three lines, and also will consume three coins as credit medals.

The game executable in the basic game of the present embodiment is a game in which a predetermined set of symbols are made along the pay lines.

Furthermore, the liquid crystal display 30 displays, on the upper portion of the reels 3A to 3C, in order from the left, a payout display unit 48, a bet amount display unit 50, and a credit amount display unit 49. The payout amount display unit 48 displays the payout amount of coins in a case where a combination qualified for an award is formed by symbols displayed along the pay lines. The credit amount display unit 49 displays the credit amount of coins stored in the gaming machine 13. The bet amount display unit 50 displays the bet amount that is the number of coins bet on the aforementioned pay lines.

Figure 4A:
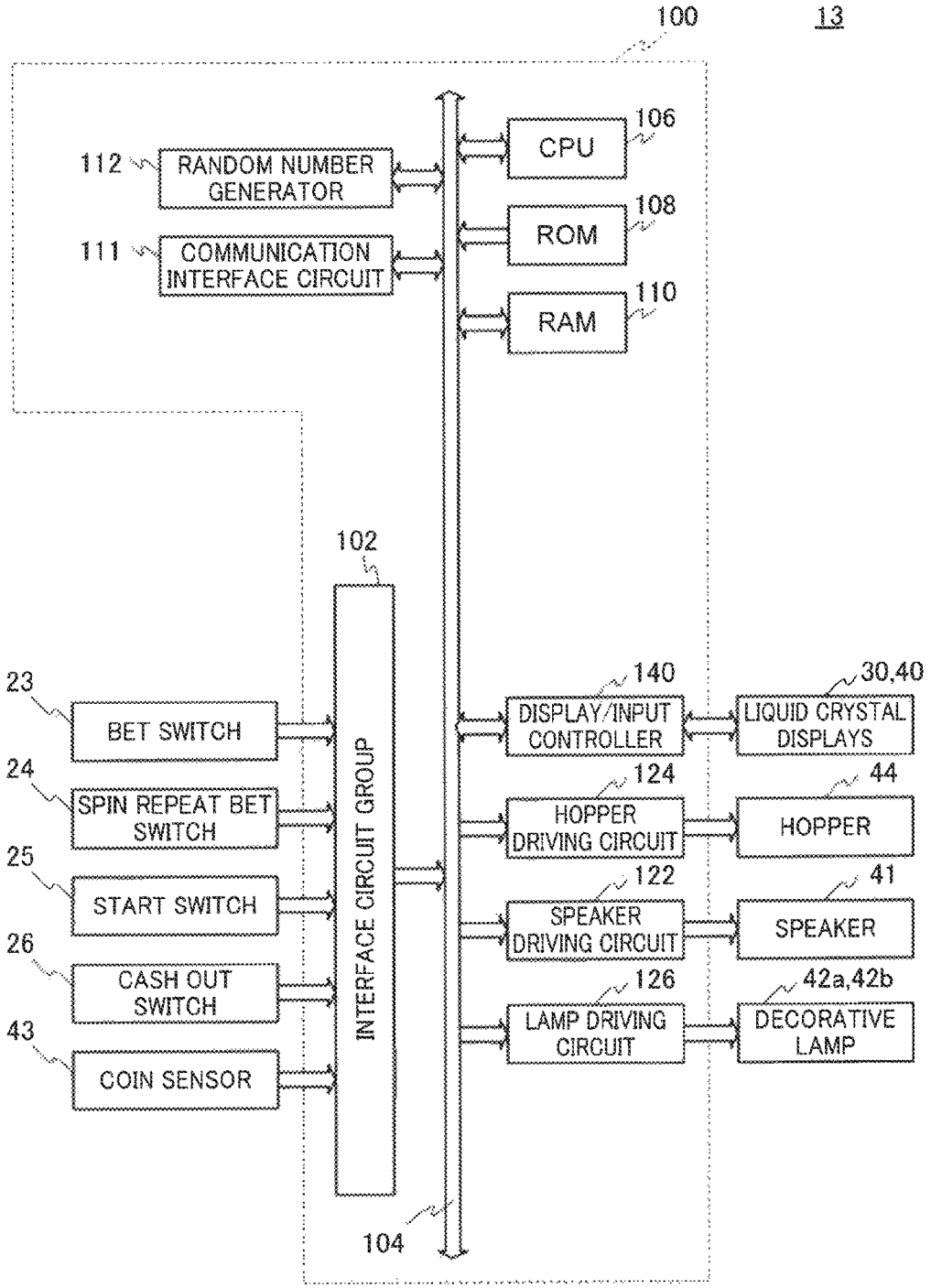
FIG. 4A is a block diagram of a controller of the gaming machine according to the embodiment.

FIG. 4A is a block diagram showing the electrical configuration of the game controller 100 of the gaming machine 13. Referring to FIG. 4A, the game controller 100 of the gaming machine 13 is a microcomputer and is provided with an interface circuit group 102, an input-output bus 104, a CPU 106, ROM 108, RAM 110, an interface circuit 111 for communication, a random number generator 112, a speaker drive circuit 122, a hopper drive circuit 124, a lamp drive circuit 126, and a display/input controller 140.

The interface circuit group 102 is connected with the input/output bus 104, which inputs and outputs data signals and address signals to a CPU 106.

The start switch 25 is connected with the interface circuit group 102. A start signal output from the start switch 25 is converted to a predetermined signal by the interface circuit group 102 and then supplied to the input/output bus 104.

The bet switch 23, the spin repeat bet switch 24, and the cash out switch 26 are also connected to the interface circuit group 102. Switching signals output from the switches are also supplied to the interface circuit group 102 and converted to predetermined signals, and then supplied to the input-output bus 104 by the interface circuit group 102.

A coin sensor 43 is also connected to the interface circuit group 102. The coin sensor 43 is a sensor for detecting coins inserted into the coin slot 22, and provided in association with the coin slot 22. A sensing signal, which is output from the coin sensor 43, is also supplied to the interface circuit group 102, converted into a predetermined signal by the interface circuit group 102, and then supplied to the input/output bus 104.

ROM 108 and RAM 110 are connected to the input/output bus 104.

Upon acceptance of the start operation of a game through the start switch 25, the CPU 106 reads a game program to execute the game. The game program is programmed so as to: start variably displaying the symbols on the three video reels 3A to 3C on the liquid crystal display 30 via the display/input controller 140 and then statically display the three video reels 3A to 3C, to statically display symbols in the three video reels 3A to 3C. In a case where a combination of the stationary symbols is displayed along the pay lines and the combination corresponds to a specific combination for providing an award (hereinafter referred to as a "winning combination"), the game program pays out an amount of coins corresponding to the specific combination.

Furthermore, a program for determining an order of stopping the video reels 3A to 3C, in a case where the combination of the symbols statically displayed along the pay lines does not correspond to a winning combination, is stored in the ROM 108. Details thereof are described later. The program is executed only in a case where symbols included in a winning combination are included in the plurality of symbols statically displayed along the pay line. The program is programmed so as to statically display symbols not included in the winning combination on the video reels 3A to 3C, after statically displaying other symbols on the video reels 3A to 3C.

The ROM 108 stores a control program for comprehensively controlling the present gaming machine 13, a program for executing the routines shown in FIGS. 9A and 10A (hereinafter referred to as a "routine execution program"), and an initial data for executing the control program, and various data tables used in decision processes. The routine execution program includes the abovementioned game program. Example of the data tables includes tables such as those shown in FIGS. 7A, 8A and 14. The RAM 110 temporarily stores flags, variables, a side bet amount and the like used for the above-mentioned control program.

Furthermore, a communication interface circuit 111 is connected to the input/output bus 104. The communication interface circuit 111 is a circuit for communicating with, for example, external communication devices such as a server, via the network which may include various kinds of networks such as a LAN.

Moreover, the random number generator 112 for generating a random number is connected to the input/output bus 104. The random number generator 112 generates random numbers in a predetermined range of numeric values, for example, 0 to 65535 ($2^{16}-1$). Alternatively, the random numbers may be generated by the arithmetic processing of the CPU 106.

A speaker driving circuit 122 for driving a speaker 41 is also connected to the input/output bus 104. The CPU 106 reads sound data stored in the ROM 108, and transmits the sound data to the speaker driving circuit 122 via the input/output bus 104. Thus, predetermined sound effects are output from the speaker 41.

A hopper driving circuit 124 for driving the hopper 44 is also connected to the input/output bus 104. Upon receipt of a cash out signal input from the cash out switch 26, the CPU 106 transmits a driving signal to the hopper driving circuit 124 via the input/output bus 104. This enables the hopper 44 to pay out a number of coins corresponding to the remaining credit at that point, which is stored in a predetermined memory area in the RAM 110.

Alternatively, the payout of the coins may be performed in a mode of storing credit data in a data card or the like, instead of using physical coins. That is to say, with such an arrangement, the player may have his/her own card, which serves as a storage medium. Upon the player inserting this card into the gaming machine 13, the data relating to the credit is stored in the card.

The lamp driving circuit 126 for driving the decorative lamps 42a and 42b is also connected to the input-output bus 104. The CPU 106 sends a signal for driving the lamps to the lamp driving circuit 126 under a predetermined condition, based on the program stored in the ROM 108. This causes the decorative lamps 42a and 42b to blink and the like.

The display/input controller 140 is also connected to the input/output bus 104. The CPU 106 generates an image display instruction in accordance with the game state and the game result, and outputs the generated image display instructions to the display/input controller 140 via the input-output bus 104. Upon receiving the image display instruction from the CPU 106, the display/input controller 140 generates a drive signal for driving the liquid crystal displays 30 and 40 based on the image display instruction thus received, and outputs the generated drive signal to the liquid crystal displays 30 and 40. As a result, a predetermined image is displayed on the liquid crystal displays 30 and 40. The display/input controller 140 also includes a touch panel 32 on the liquid crystal display 30 (see FIG. 5A). The display/input controller 140 transmits the signal input through the touch panel 32 to the CPU 106 via the input/output bus 104, in the form of an input signal. It should be noted that the image display instructions include instructions relating to the payout amount display unit 48, the credit amount display unit 49, and the bet amount display unit 50.

Figure 5A:
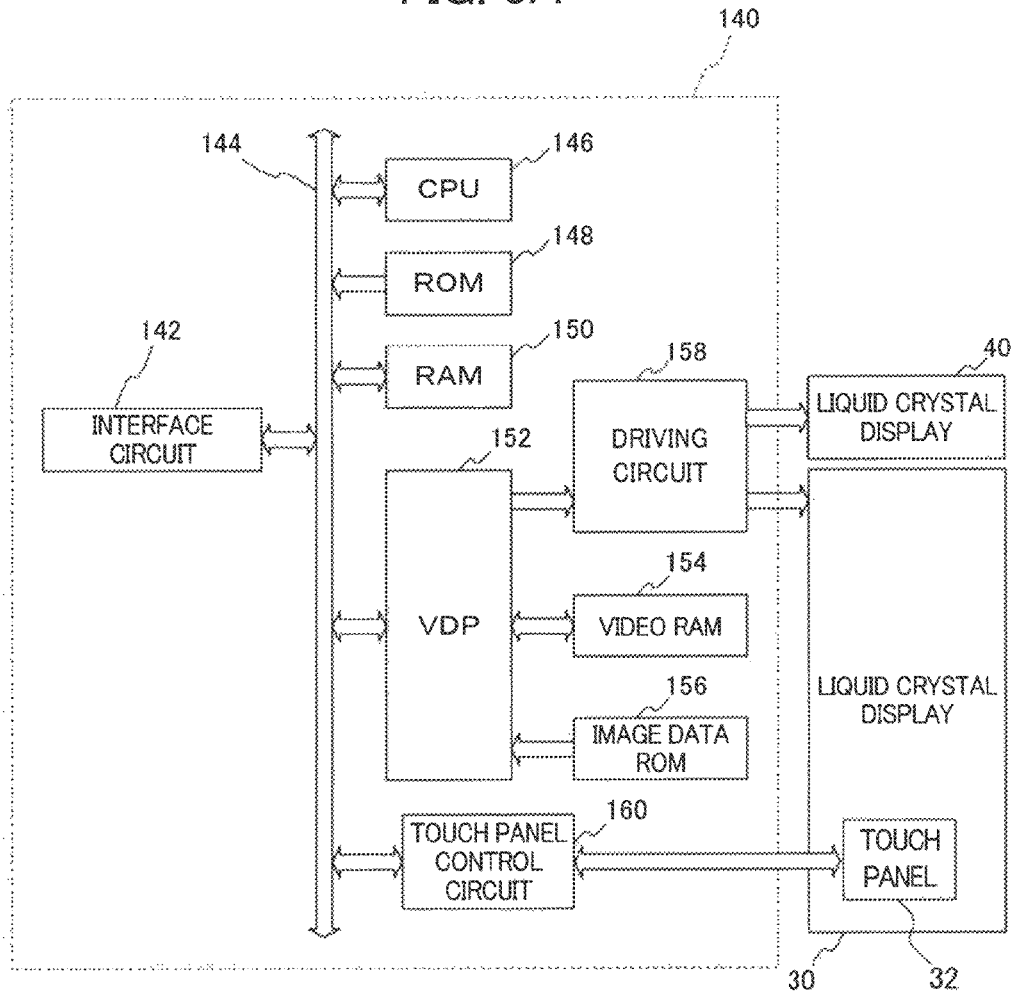
FIG. 5A is a block diagram of a display/input controller of the gaming machine according to the embodiment.

FIG. 5A is a block diagram showing the electrical configuration of the display/input controller 140 of the gaming machine 13. The display/input controller 140 of the gaming machine 13 is a sub-microcomputer for performing image display processing and input control for the touch panel 32. The display/input controller 140 includes an interface circuit 142, an input/output bus 144, a CPU 146, ROM 148, RAM 150, a VDP 152, video RAM 154, image data ROM 156, a driving circuit 158, and a touch panel control circuit 160.

The interface circuit 142 is connected to the input/output bus 144. An image display command output from the CPU 106 of the aforementioned game controller 100 is supplied to the input/output bus 144 via the interface circuit 142. The input/output bus 144 performs input/output of data signals or address signals to and from the CPU 146.

ROM 148 and RAM 150 are connected to the input/output bus 144. The ROM 148 stores a display control program for generating a driving signal, which is to be supplied to the liquid crystal displays 30 and 40, according to an image display command received from the CPU 106 of the aforementioned game controller 100. On the other hand, the RAM 150 stores flags and values of variables used in the display control program.

The VDP 152 is also connected to the input/output bus 144. The VDP 152 is a processing device including a so-called sprite circuit, a screen circuit, a palette circuit and the like, and is capable of performing a variety of processing for displaying an image on the liquid crystal displays 30 and 40. The video RAM 154 and the image data ROM 156 are connected to the VDP 152. The video RAM 154 stores image data based on the image display instructions from the CPU 106 on the game controller 100. The image data ROM 156 stores various kinds of image data containing the abovementioned effect image data. Furthermore, the driving circuit 158 for outputting a driving signal for driving the liquid crystal displays 30 and 40 is connected to the VDP 152.

By reading and executing the display control program stored in the ROM 148, the CPU 146 instructs the video RAM 154 to store image data to be displayed on the liquid crystal displays 30 and 40 in response to the image display instructions from the CPU 106 on the game controller 100. The image display instruction includes various types of image display instructions, such as the abovementioned display instruction of a rendered image.

The image data ROM 156 stores various kinds of image data including the rendered image data.

The touch panel control circuit 160 transmits to the CPU 106 the signals input via the touch panel 32, provided on the liquid crystal display 30, via the input/output bus 144, in the form of an input signal.

Figure 6A:
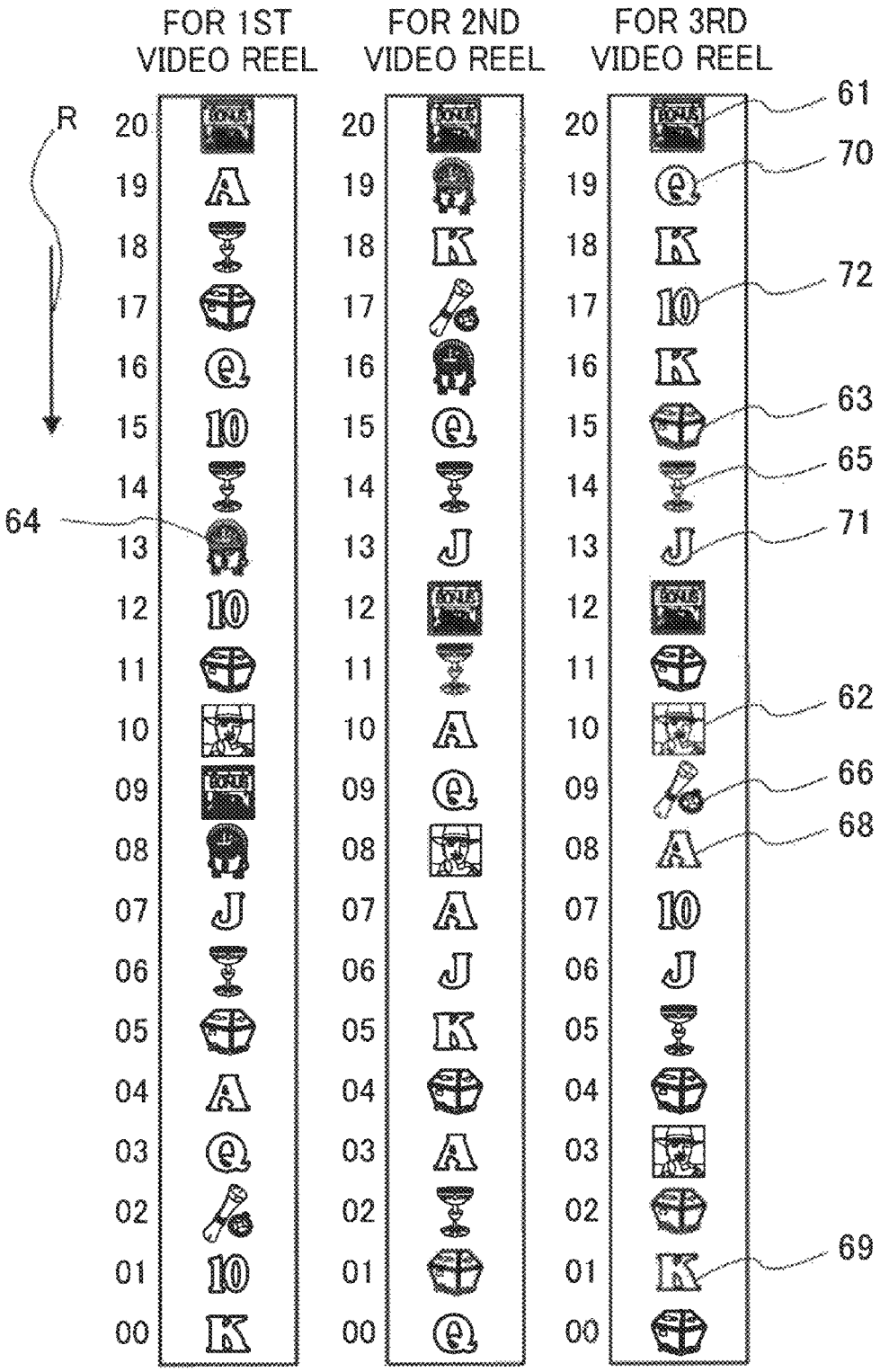
FIG. 6A is a diagram showing symbol groups displayed on the video reels of the gaming machine according to the embodiment.

FIG. 6A shows columns of symbols where 21 symbols are represented and arranged on image reels 3A to 3C, respectively. It should be noted that the symbol sequence for the first video reel corresponds to the video reel 3A, the symbol sequence for the second video reel corresponds to the video reel 3B, and the symbol sequence for the third video reel corresponds to the video reel 3C. A plurality of symbols is arranged in each symbol column and constitutes a symbol group.

As shown in FIG. 6A, code numbers "00" to "20" are assigned to each symbol for the video reels 3A to 3C. The code numbers are stored (recorded) in the aforementioned ROM 108 (FIG. 4A) in the form of a data table.

A symbol sequence is depicted on each of the video reels 3A to 3E. Each symbol sequence includes: a "BONUS" symbol (symbol 61) (hereinafter simply referred to as "BONUS" hereafter); a "WILD" symbol (symbol 62) (hereinafter simply referred to as "WILD" hereafter); a "TREASURE BOX" symbol (symbol 63) (hereinafter simply referred to as "TREASURE BOX" hereafter); a "GOLDEN MASK" symbol (symbol 64) (hereinafter simply referred to as "GOLDEN MASK" hereafter); a "HOLY CUP" symbol (symbol 65) (hereinafter simply referred to as "HOLY CUP" hereafter); a "COMPASS & MAP" symbol (symbol 66) (hereinafter simply referred to as "COMPASS & MAP" hereafter); an "A" symbol (symbol 68) (hereinafter simply referred to as "A" hereafter); a "K" symbol (symbol 69) (hereinafter simply referred to as "K" hereafter); a "Q" symbol (symbol 70) (hereinafter simply referred to as "Q" hereafter); a "J" symbol (symbol 71) (hereinafter simply referred to as "J" hereafter); and a "10" symbol (symbol 72) (hereinafter simply referred to as "10" hereafter). Each of the symbol sequences on the video reels 3A to 3C is moved by displaying a video image in which the corresponding video reels 3A to 3C are rotated in the forward direction (a direction indicated by an arrow R).

In the present embodiment, "BONUS", "WILD", "TREASURE BOX", "GOLDEN MASK", "HOLY CUP", "COMPASS & MAP", "A", "K", "Q", "J", and "10" are provided as the winning combinations for providing a predetermined award. Basically, the combination (combination data) is control information which associates advantages given to a player (the numbers of payout coins) to winning symbol combinations, and which is used for the stopping control of the image reels 3A to 3C, the switching (conversion) of the state of the game, and the supply of coins.

FIG. 7A shows a symbol layout table. In the symbol layout table, the individual symbols on the video reels 3A to 3C are registered in association with the code numbers designating the positions of the symbols in the aforesaid columns of symbols, respectively. It should be noted that the first to third video reels correspond to the video reels 3A to 3C, respectively. In other words, the symbol layout table provides the symbol information with respect to the symbol positions (code numbers) on the video reels 3A to 3C.

In FIG. 7A, the aforementioned award types "TREASURE BOX", "GOLDEN MASK", and "COMPASS&MAP" are abbreviated as "TREASURE", "MASK", and "COMPASS", respectively.

FIG. 8A shows a basic game combination table, used in the basic game described later in FIGS. 9A and 10A.

In the basic game combination table, names of winning combinations in the basic game, names of symbols displayed on each of the video reels 3A to 3C, and a number of coins are associated to each other. For example, in a case where symbols displayed on the video reels 3A to 3C along the pay line are all "K", a winning combination "K" is achieved.

The "number of coins" is the number of coins to be paid out for each credit amount bet in a game, in a case where a winning combination is achieved. For example, in a case where a winning combination "K" is achieved, the coin number is "13" according to the basic game combination table. Thirteen coins are thus paid out as an award. Although the coins are paid out in the present embodiment, the credit amount corresponding to the coin number can be added to a credit amount stored in a predetermined memory region in the RAM 110.

Figure 10A:
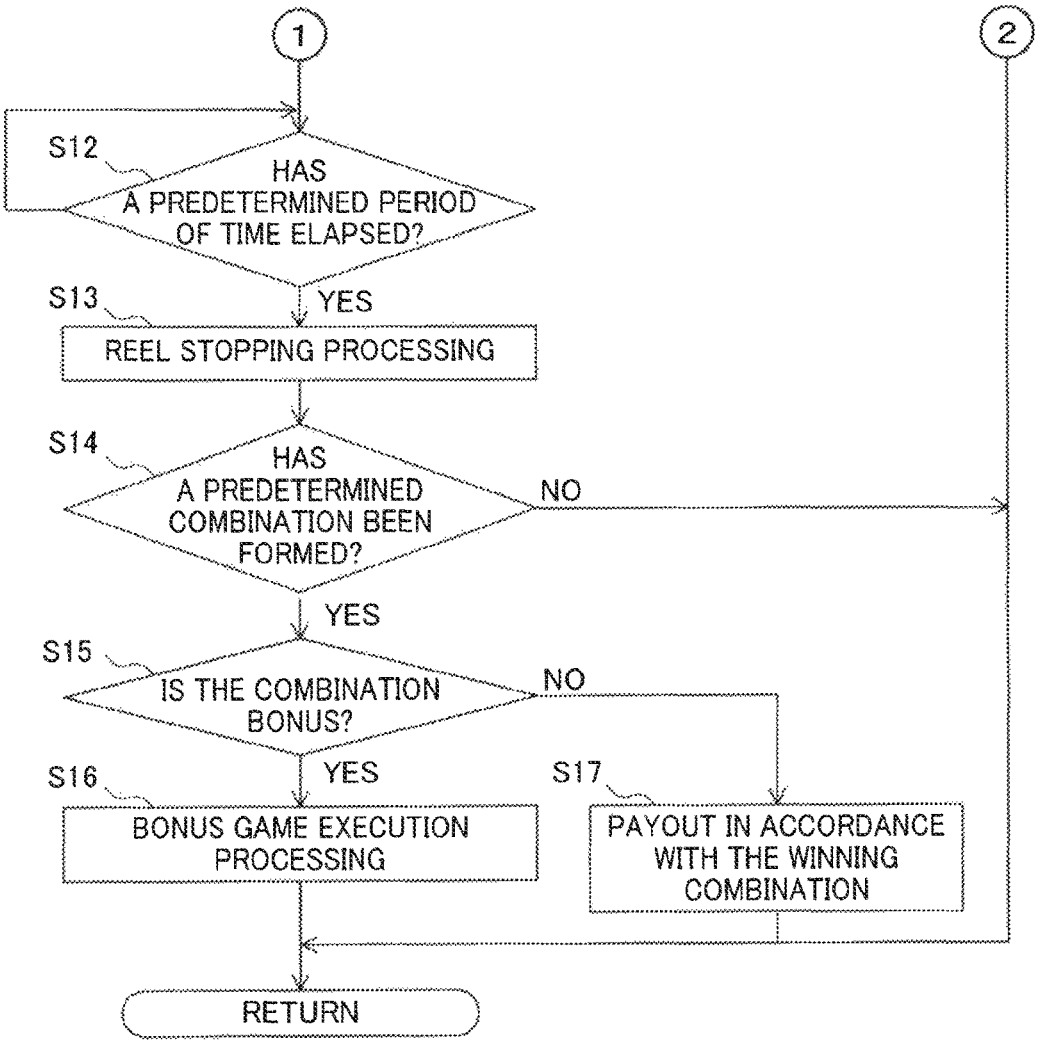

FIGS. 9A and 10A show the flow charts showing the processing of the basic game of the gaming machine 13, executed by the game controller 100 of the gaming machine 13. The one routine shown in FIGS. 9A and 10A corresponds to one execution of a unit game.

It is supposed that the gaming machine 13 is activated in advance and the variables used in the CPU 106 on the game controller 100 are initialized to predetermined values, thereby providing a steady action of the gaming machine 13.

First, the CPU 106 included in the aforementioned game controller 100 determines whether any credits, in other words the coins inserted by the player, remains or not (Step S1). More specifically, the CPU 106 reads the credit amount C stored in the RAM 110, and performs the processing based upon the credit amount C thus read. In a case where the credit amount C is "0" (in the case of a NO determination in Step S1), the CPU 106 is not permitted to start the game. Accordingly, in this case, the CPU 106 ends this routine without performing any processing. On the other hand, in a case where the credit amount C is at least 1 (in the case of a YES determination in Step S1), the CPU 106 determines that there is remaining credit, and accordingly, advances to Step S2.

In Step S2, the CPU 106 determines whether a pushing operation has been performed or not on the spin repeat bet switch 24. In a case where the spin repeat bet switch 24 has been pushed, and accordingly, in a case of reception of an operation signal via the spin repeat switch 24 (in the case of a YES determination in Step S2), the CPU 106 advances to Step S5. On the other hand, in a case of reception of no operation signal via the spin repeat switch 24 during a predetermined period of time (in the case of a NO determination in Step S2), the CPU 106 determines that the spin repeat bet switch 24 has not been pushed, and accordingly, advances to Step S3.

In Step S3, the CPU 106 sets the game condition. More specifically, the CPU 106 determines the number of coins to be bet on the pay lines set in the current game according to the user's operation via the bet switch 23. In this step, the CPU 106 receives an operation signal generated by the user's operation performed via the bet switch 23. The CPU 106 determines the bet amount for each pay line based upon the number of instances of reception of the bet switch operation signal, and stores the bet amount thus determined in a predetermined memory region in the RAM 110. The CPU 106 reads out the credit amount C written in a predetermined memory region in the RAM 110. Then, the CPU 106 subtracts the total bet amount, which is the sum total of the bet amounts, from the credit amount C thus read out, and stores the value thus subtracted in a predetermined memory region in the RAM 110. The CPU 106 then advances to Step S4.

In Step S4, the CPU 106 waits for operation of the start switch 25 by determining whether the start switch 25 is ON or not. In a case where the start switch 25 is operated and an operation signal is received via the start switch 25 (in the case of a YES determination in Step S4), the CPU 106 determines that the start switch 25 has been operated, and advances to Step S6.

On the other hand, in a case where the flow has proceeded from Step S2 to Step S5, the CPU 106 determines whether or not the credit amount C is at least the total bet amount bet on the previous game. In other words, the CPU 106 determines whether or not the player can start the game by pushing the spin repeat bet switch 24. More specifically, in a case where the spin repeat bet switch 24 has been pushed, and accordingly, in a case where the operation signal has been input from the aforementioned switch 24, the CPU 106 reads out the credit amount C and the bet amount bet on each of the pay lines L1 to L5 in the previous game stored in the predetermined memory region in the RAM 110. Then, the CPU 106 determines whether or not the aforementioned credit amount C is at least the total bet amount bet in the previous game based upon the relation between the credit amount C and the bet amounts thus read out. The CPU 106 performs processing based upon the determination results. In a case where the aforementioned credit amount C is determined to be less than the total bet amount bet on the previous game (in the case of a NO determination in Step S5), the CPU 106 cannot start the game, and accordingly, terminates the present routine without performing any processing. On the other hand, in a case where determination has been made that the aforementioned credit amount C is greater than or equal to the total bet amount bet in the previous game (in the case of a YES determination in Step S5), the CPU 106 subtracts the total bet amount bet in the previous game from the aforementioned credit amount C, and stores the subtracted value in a predetermined area of the RAM 110. The CPU 106 then advances to Step S6.

In Step S6, the CPU 106 performs static symbol determination processing. The static symbol determination processing is executed, for example, as follows.

The CPU 106 first acquires three random numbers in the range of 0 to 255, generated by a random number generator 112, which correspond to the three reels 3A to 3C. The CPU 106 reads payout ratio setting data from the ROM 108 and stores the payout ratio setting data in the RAM 110. The CPU 106 then references symbol weighted data corresponding to the payout ratio setting data, and determines code numbers for the reels 3A to 3C (see FIG. 7A) on the basis of the three random numbers selected. The code numbers for the reels 3A to 3C thus determined correspond to code numbers for symbols rearranged along the pay line L1. For example, in a case where the code numbers of the reels 3A to 3C are determined to be "20", "20", and "20", the symbols displayed on the video reels 3A to 3C are all "BONUS".

In Step S7, the CPU 106 starts variable display of the video reels 3A to 3C. In the present embodiment, the variable display presents an image of the video reels 3A to 3C rotating, in other words, is a display showing in which the symbols displayed in the video reels 3A to 3C are changing. More specifically, in the present embodiment, the CPU 106 displays an image of the video reels 3A to 3C starting to rotate in a predetermined order or at the same time, according to the symbol layout table stored in the RAM 110.

In Step S8, based upon the symbols determined to be statically displayed on the video reels 3A to 3C in Step S6, the CPU 106 determines whether a quantity of symbols not constituting a winning combination, included among symbols to be statically displayed along the activated pay line, is no greater than a first value, which is 1, or not. In a case where the quantity of the symbols is no greater than 1 (in the case of a YES determination in Step S8), the CPU 106 advances to Step S9. On the other hand, in a case where the quantity is greater than 1 (in the case of a NO determination in Step S8), the CPU 106 advances to Step S12 of FIG. 10A.

In Step S9, the CPU 106 performs lottery processing for changing the stopping order, and then advances to Step S10. In the lottery processing for changing the stopping order, it is determined, by lottery, whether the stopping order should be changed for the video reels 3A to 3C performing the variable display. Details will be hereinafter described.

In Step S10, the CPU 106 determines whether the stopping order should be changed or not. In this processing, the CPU 106 determines whether the stopping order is determined to be changed and thus a stopping order changing flag (described later) is activated or not in Step S9. In a case where the stopping order changing flag has been activated, the stopping order is to be changed. In a case where the stopping order changing flag has not been activated, the stopping order is not to be changed and the video reels 3A, 3B and 3C are sequentially stopped in this order. In a case where the stopping order changing flag is activated (in the case of a YES determination in Step S10), the CPU 106 advances to Step S11. On the other hand, in a case where the stopping order changing flag is not activated (in the case of a NO determination in Step S10), the CPU 106 advances to Step S12 of FIG. 10A.

In Step S11, the CPU 106 performs stopping order changing processing, and then advances to Step S12 of FIG. 10A. In the stopping order changing processing, a new stopping order is defined besides a standard stopping order. Details will be hereinafter described.

In Step S12, the CPU 106 stands by with respect to the video reels 3A to 3C, until a predetermined period of time elapses. After the predetermined period of time has elapsed (at the moment of a YES determination in Step S12), the CPU 106 advances to Step S13.

In Step S13, the CPU 106 stops the variable display of the video reels 3A to 3C, and starts the static display thereof. In the present embodiment, an image of the video reels 3A to 3C rotating is displayed from Step S7. In the static display, the video reels in the image stops rotating and an award is determined.

The CPU 106 stops rotating the video reels 3A to 3C in the stopping order determined in Step S11. More specifically, the CPU 106 stops rotating the video reels 3A to 3C in the image in the stopping order determined in Step S11, so as to statically display the symbols with the code numbers determined in Step S6 along the pay line 1L. The CPU 106 then advances to Step S14.

In Step S14, the CPU 106 determines whether a winning combination has been formed or not. More specifically, the CPU 106 references a combination table for a basic game (FIG. 8A) stored in the ROM 108, and determines whether the static symbols displayed along the pay line form a winning combination or not. In a case where static symbols displayed along the pay line are determined to form a winning combination (in the case of a YES determination in Step S14), the CPU 106 advances to Step S15. In a case where static symbols displayed along the pay line are determined not to form a winning combination (in the case of a NO determination in Step S14), the CPU 106 terminates the present routine.

In Step S15, the CPU 106 determines whether the winning combination having been formed is "BONUS" or not. More specifically, in a case where the winning combination is "BONUS" (in the case of a YES determination in Step S15), the CPU 106 advances to Step S16. On the other hand, in a case where the winning combination is not "BONUS" (in a case of a NO determination in Step S15), the CPU 106 advances to Step 517.

In Step S16, the CPU 106 performs bonus game processing. More specifically, the CPU 106 executes the bonus game, and then terminates the present routine.

After advancing from Step S15 to Step 517, the CPU 106 pays out coins, the number of which corresponds to the winning combination formed along the pay line. More specifically, the CPU 106 references a combination table for a basic game (FIG. 8A), and calculates a payout number of coins corresponding to the winning combination. The CPU 106 reads the credit number stored in the predetermined memory area of the RAM 110, and adds the calculated payout number to the read credit number, and then stores the resulting value in a predetermined memory area in the RAM 110. The CPU 106 displays the aforementioned value thus stored on the credit amount display unit 49. The CPU 106 then terminates the present routine.

The lottery processing for changing the stopping order in Step S9 of FIG. 9A will be described hereinafter with reference to FIGS. 11A and 12A.

Figures 11A, 12A:
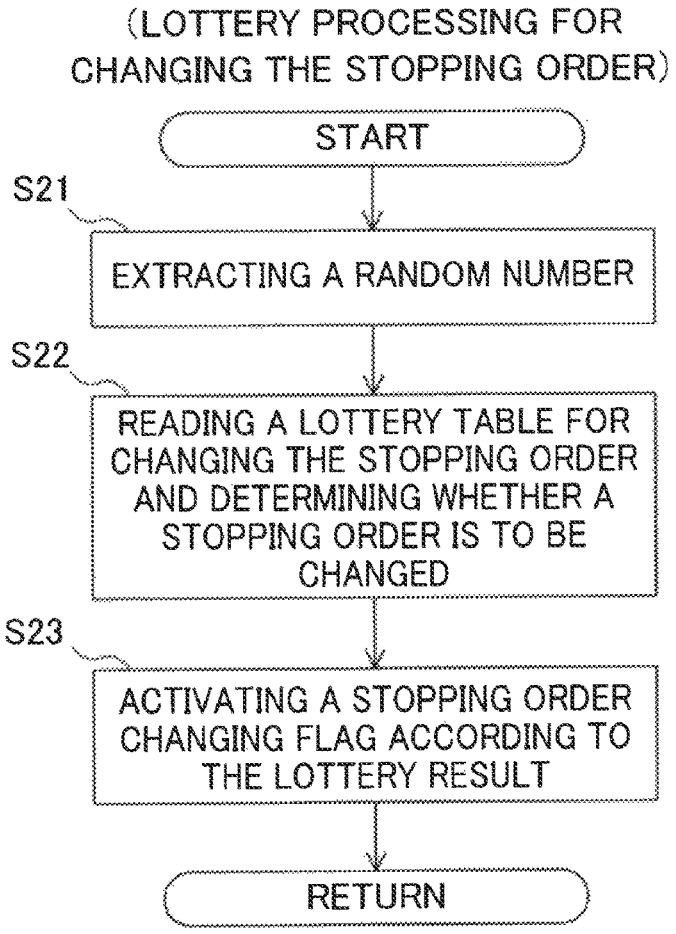
FIG. 11A is a flowchart of lottery processing for changing the stopping order, executed in the gaming machine according to the embodiment.
FIG. 12A is a diagram showing a lottery table for changing the stopping order according to the embodiment.

FIG. 11A is a diagram showing a subroutine of the lottery processing for changing the stopping order, and FIG. 12A is a diagram showing a lottery table for changing the stopping order.

In Step S21, the CPU 106 extracts a random number. More specifically, the CPU 106 uses a random number generated by a random number generator 112 and the value stored in the "values to be subtracted" column. First, the CPU 106 generates a random number by the random number generator 112 and stores the random number in the RAM 110. After this processing, the CPU 106 advances to Step S22.

In Step S22, the CPU 106 reads the lottery table for changing the stopping order (FIG. 12A) and determines whether the stopping order should be changed or not. More specifically, the CPU 106 reads the lottery table for changing the stopping order and the random number extracted in Step S21, and determines whether the stopping order should be changed or not, by lottery.

In the lottery table for changing the stopping order, as shown in FIG. 12A, numerical ranges are associated with any one of the items "change" and "not change". An item associated with a numerical range including the extracted random number becomes a result of Step S22.

For example, a case where the extracted random number is 150 is explained. The CPU 106 first subtracts 0 therefrom, which is the lower limit of a numerical range associated to the item "change". The value of this result is 150, which is a positive number. In other words, the lottery number is greater than the lower limit and may thus be included in the numerical range. Then, the CPU 106 subtracts 127 therefore, which is the upper limit of the numerical range associated to the item "change". The value of this result is 23, which is a positive number. In other words, the lottery number is greater than the upper limit and thus not included in the numerical range associated with the item "change".

Thereafter, the CPU 106 subtracts 128 therefrom, which is the lower limit of a numerical range associated to the item "not change". This result is 22, which is a positive number. In other words, the lottery number is greater than the lower limit and may thus be included in the numerical range. Then, the CPU 106 subtracts 255 therefrom, which is the upper limit of the numerical range associated to the item "not change". The value of this result becomes a negative number. In other words, the lottery number is greater than the lower limit and smaller than the upper limit, and thus included in the numerical range. In this case, the stopping order is determined not to be changed in Step S22.

Again in FIG. 11A, in Step S23, the CPU 106 activates a stopping order changing flag in accordance with the result of a lottery. More specifically, in Step S22, in a case where the stopping order is determined to be changed, the CPU 106 activates the stopping order changing flag and stores the flag in a predetermined storage region in the RAM 110. On the other hand, in a case where the stopping order is determined not to be changed, the CPU 106 inactivates the stopping order changing flag and stores the flag in a predetermined storage region in the RAM 110. After this processing, the CPU 106 terminates the present subroutine, and advances to Step S10 of FIG. 9A.

The stopping order changing processing in Step S11 of FIG. 9A will be described hereinafter with reference to FIGS. 13A and 14A.

Figure 13A:
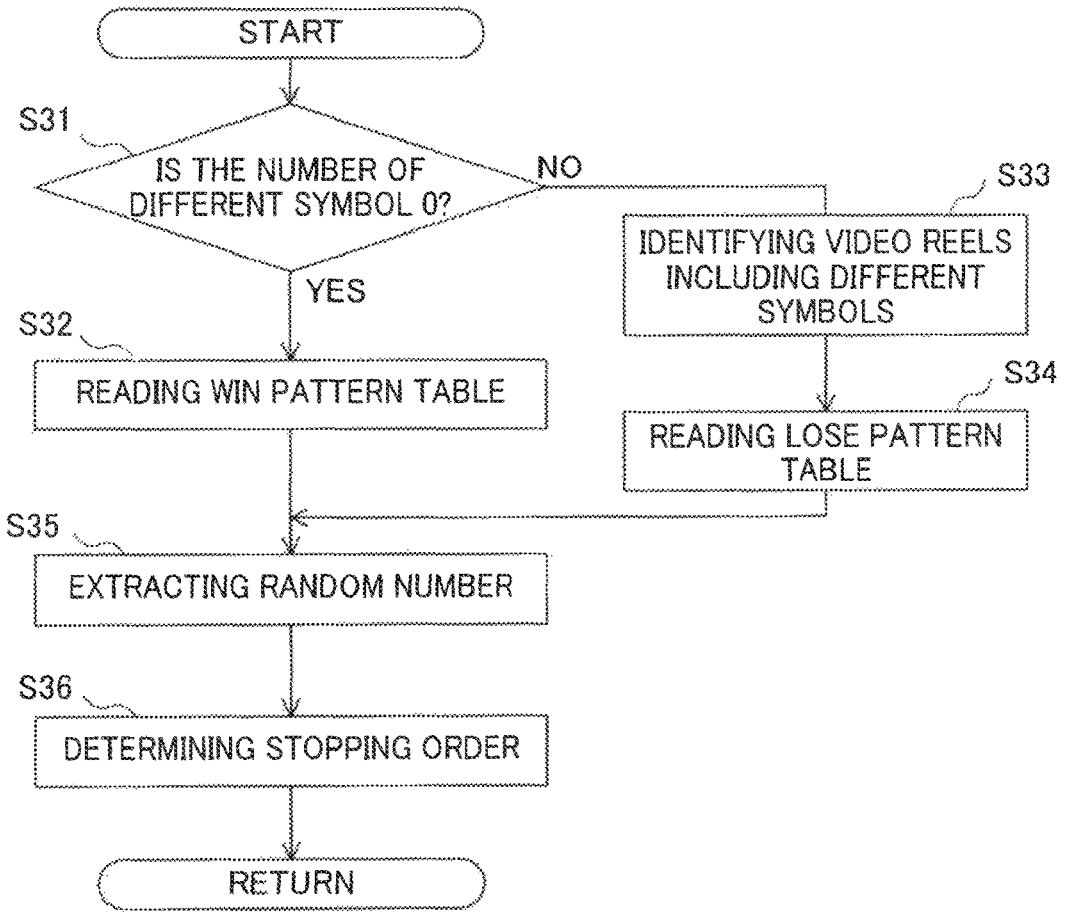
FIG. 13A is a flowchart of stopping order changing processing executed in the gaming machine according to the embodiment.

FIG. 13A is a diagram showing a subroutine of the stopping order changing processing, and FIG. 14A is a diagram showing a pattern table used in the present subroutine.

In Step S31, among the symbols determined to be statically displayed on the video reels 3A to 3C in Step S6, the CPU 106 determines whether a quantity of symbols not constituting a winning combination, included among symbols determined to be statically displayed along the activated pay line, is 0 or not. More specifically, among the symbols determined to be statically displayed on the video reels 3A to 3C after the variable display (determined in Step S6), the CPU 106 compares the symbols to be statically displayed along the activated pay line with the symbols constituting a winning combination. Thereafter, the CPU 106 counts the quantity of symbols not constituting a winning combination (hereinafter referred to as different symbols), included among the symbols to be statically displayed along the pay line. In a case where the quantity is 0 (in the case of a YES determination in Step S31), the CPU 106 advances to Step S32. On the other hand, in a case where the quantity is not 0 (in the case of a NO determination in Step S31), the CPU 106 advances to Step S33.

In Step S32, the CPU 106 reads a win pattern table. The CPU 106 reads the win pattern table stored in the ROM 108 and stores the table in the predetermined storage region in the RAM 110. The pattern table is further explained later.

In Step S33, the CPU 106 identifies the video reels including different symbols, and stores the name thereof in a predetermined storage region in the RAM 110. After this processing, the CPU 106 advances to Step S34.

In Step S34, the CPU 106 reads a lose pattern table, in accordance with the video reel name identified in Step S33. The CPU 106 reads the lose pattern table stored in the ROM 108, and stores the table in the predetermined storage region in the RAM 110. The pattern table is further explained later.

In Step S35, the CPU 106 extracts a random number and determines a stopping order on the basis of the table read in Step S32 or Step S33.

The pattern table is described hereinafter with reference to FIG. 14A. In the present embodiment, there are four pattern tables, which can be divided into lose pattern tables and win pattern tables.

The win pattern table is a table referenced in Step S32. The win pattern table is referenced in a case where the quantity of different symbols is determined to be 0 in Step S31, i.e. where a winning combination has been formed.

In the win pattern table, pattern numbers, values to be subtracted, and video reel names are associated to each pattern data.

The pattern number is a data number, and the value to be subtracted is a value used for selecting the pattern number. The video reel names are names given to each of the video reels 3A to 3C. The number stored in a column for each video reel name represents the stopping order. In other words, a specific pattern number includes the stopping order of each of the video reels 3A to 3C. For example, the pattern data with a pattern number win1 indicates the stopping order 3A-3B-3C. In other words, patterns of stopping order (stopping patterns) are stored in association with the pattern numbers.

The method of selecting a pattern number is explained hereinafter.

The CPU 106 uses a random number generated by a random number generator 112 and the value stored in the "values to be subtracted" column. Thereafter, the CPU 106 sequentially subtracts the values, stored in the column "value to be subtracted" in the win pattern table, from the random number thus generated. In a case where the result thereof is 0 or a negative number, the stopping order (stopping pattern) associated to the value last subtracted is determined in Step S36.

For example, a case is described with a random number of 125 generated by the random number generator 112. The CPU 106 subtracts a value of 42 to be subtracted, which is associated with the first pattern number (for example, win1), from the random number 125. The result is 83, which is a positive number.

Subsequently, the random number 42, which is associated with the subsequent pattern number (win2), is subtracted from 83. The result is 41, which is a positive number. Furthermore, the value to be subtracted, associated with the subsequent pattern number (win3), is subtracted therefore, the result thereof being a negative number. Therefore, the CPU 106 stores the stopping order (stopping pattern) associated with win3 in a predetermined storage region in the RAM 110, as the stopping order determined in Step S36. In this example, the stopping order determined in Step S36 becomes the order of video reels 3B-3C-3A.

The lose pattern table is a table referenced in Step S33. The win pattern table is referenced in a case where the quantity of different symbols is determined not to be 0 in Step S31, i.e. where a winning combination has not been formed.

There are three kinds of lose pattern table. A lose pattern table is provided for each of the video reels 3A to 3C including different symbols, as identified in Step S33. In each lose pattern table, the name of the video reel to be stopped last is defined. For example, in the table "Lose pattern table: First video reel", the stopping order of the first video reel 3A is 3, which is the last. In the table "Lose pattern table: Second video reel", the stopping order of the second video reel 3B is 3, which is the last. In the table "Lose pattern table: Third video reel", the stopping order of the third video reel 3C is 3, which is the last.

The configuration and the stopping order determination method of the lose pattern table is similar to that of the win pattern table, and therefore the description thereof is not repeated.

The stopping behavior of the video reels 3A to 3C is described hereinafter with reference to FIGS. 15A to 18A.

For example, a case is described where the second video reel 3B has a different symbol and where the pattern number 2-1 is selected as a stopping order in the Lose pattern table: Second video reel. Therefore, the stopping order becomes the sequence of video reels 3A-3C-3B. It should be noted that, in the examples shown in FIGS. 15A to 18A, only one pay line L1 is specified, and static symbols determined to be displayed along the pay line are "BONUS" or "J".

Figure 15A:
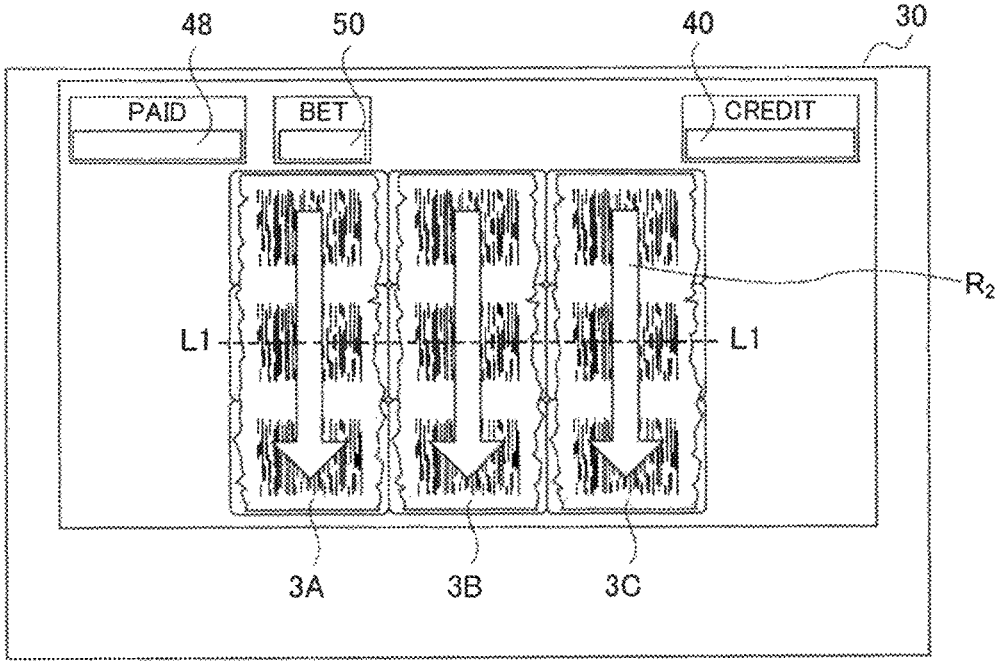
FIG. 15A is a diagram showing a display example of the gaming machine according to the embodiment.

FIG. 15A is a diagram showing variable display, in which video reels 3A to 3C are variably displayed in Step S7. In FIG. 15A, the video reels 3A to 3C are rotating in a direction indicated by an arrow R2.

Figure 16A:
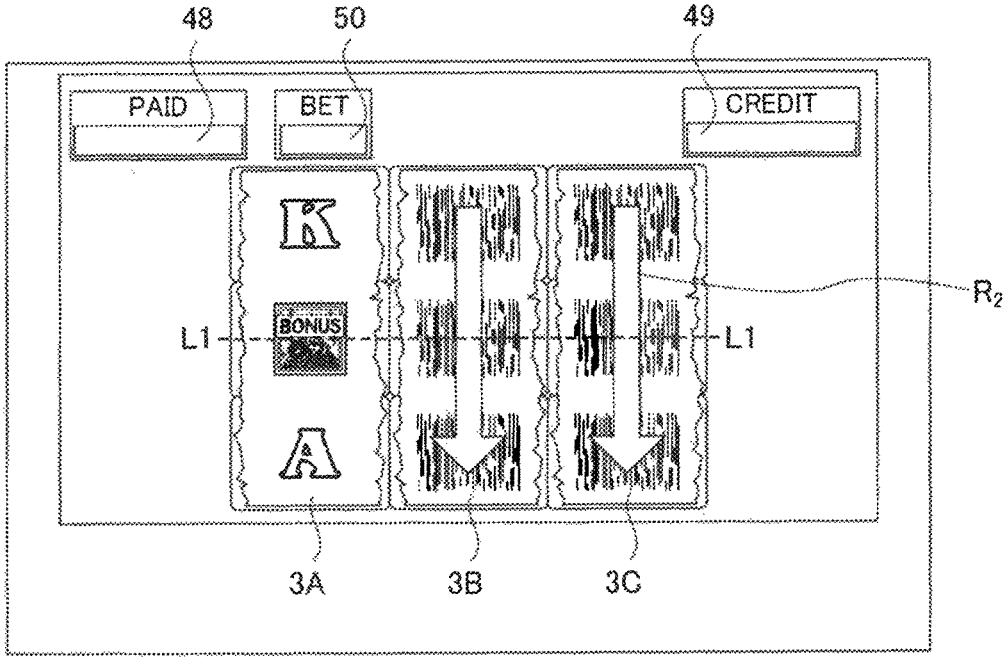
FIG. 16A is a diagram showing a display example of the gaming machine according to the embodiment.

FIG. 16A shows that only the video reel 3A stops rotating and is statically displayed. In other words, in a region showing the video reel 3A, a symbol "BONUS", determined to be statically displayed along the pay line in Step S6, is displayed.

Figure 17A:
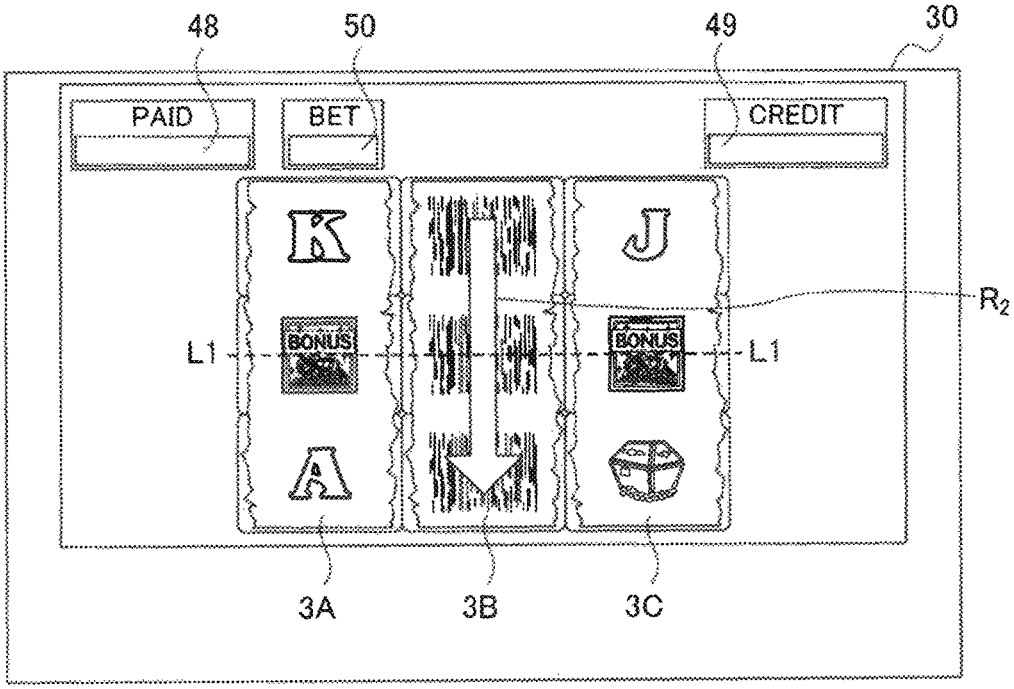
FIG. 17A is a diagram showing a display example of the gaming machine according to the embodiment.

In FIG. 17A, the video reel 3C also stops rotating and is statically displayed. Furthermore, the video reel 3B continues to be variably displayed. In such a state, a player can expect that a winning combination "BONUS" may be formed.

Figure 18A:
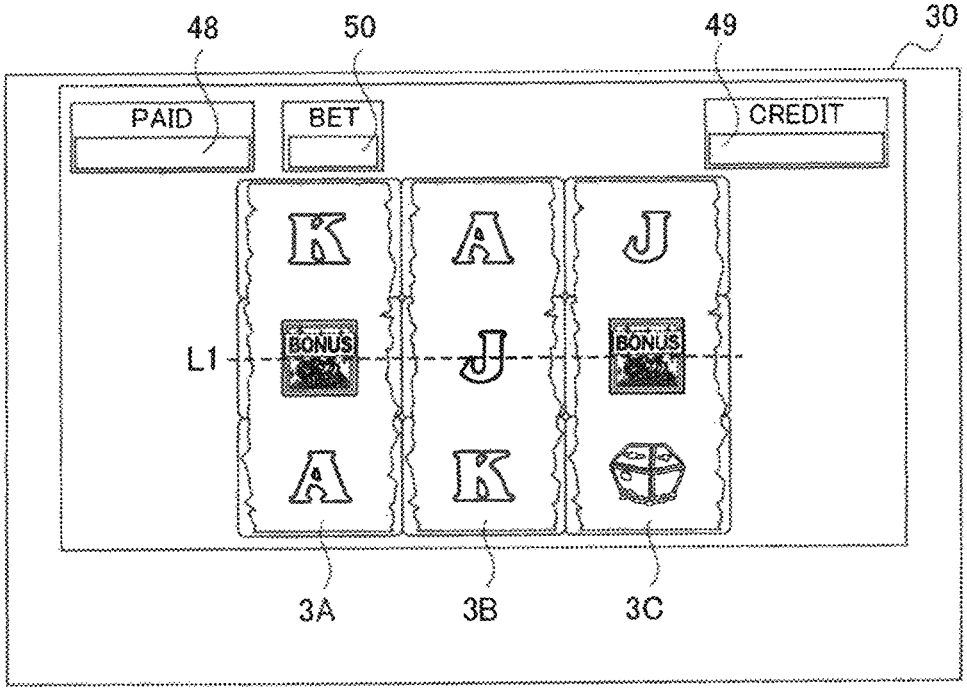
FIG. 18A is a diagram showing a display example of the gaming machine according to the embodiment.

FIG. 18A shows the video reel 3B statically displayed, and thus all the video reels 3A to 3C stop rotating and are statically displayed. In addition, the only static symbol displayed on the video reel 3B is a symbol J, which does not constitute a winning combination. The stopping order is thus changed so that the video reel 3B, displaying the symbol "J" not constituting the winning combination "BONUS" along the pay line, stops rotating delayed from other video reels, 3A and 3C.

This processing is beneficial in such a case where a winning combination is nearly achieved by symbols displayed along a pay line. In other words, the present invention can raise anticipation of a player, by stopping rotating video reels to statically display symbols not constituting a winning combination delayed from other video reels.

While the embodiment of the gaming machine according to the present invention has been described, it is to be understood that the above description is intended to be illustrative, and not restrictive, and any changes in design may be made to specific configurations such as various means. Additions, omissions, substitutions, and other modifications can be made thereto without departing from the spirit or scope of the present invention.

Furthermore, in the present embodiment, the gaming machine 13 includes three video reels 3A to 3C; however, the number of reels is not limited thereto. For example, the gaming machine 13 can include five video reels. In addition, although the video reels are described in the present embodiment, mechanical reels, for example, can also be used.

In the present embodiment, the first value is 1; however, the present invention is not limited thereto and any value smaller than the number of reels can be arbitrarily defined. For example, in a case where there are three reels, 1 or 2 can be defined as the first value.

In the present embodiment, in order to determine whether to change the stopping order or not (Step S9 of FIG. 9A), the lottery table for changing the stopping order is referenced to determine whether a random number is in a specific numerical range. In addition, in the stopping order changing processing (Step S11 of FIG. 9A), the pattern table is referenced, the value to be subtracted is subtracted from the random number and, in a case where the result thereof is 0 or a negative number, an item associated with the value to be subtracted is selected. However, the present invention is not limited thereto and all determination can be made solely by determining whether a random number is in a specific numerical range or not, or solely by subtracting the value to be subtracted from a random number. These lottery methods can be arbitrarily selected. In addition, other lottery methods and a method randomly making a determination can also be employed.

In the present embodiment, the value to be subtracted is the same for all of the rows in the pattern data table; however, the present invention is not limited thereto and the value to be stored in each row can be arbitrarily selected. In such a case, some of the numbers can be the same value, and alternatively, all the numbers can be different. Different numbers can make the probability of selection different for each pattern number.

What is claimed is:

[1. A gaming machine comprising:

a display including a plurality of display regions for displaying a plurality of kinds of symbols;

memory for storing a stopping order control program for controlling a stopping order for each of the plurality of display regions, in which the plurality of kinds of symbols stop varying and are statically displayed;

an input device for accepting external input; and a controller for executing processing of:

(a) in response to an input signal from the input device, randomly determining a symbol to be statically displayed in each of the plurality of symbol display regions after the variable display of the symbols;

(b) determining, in a winning combination processing step, whether, after (a), a combination of symbols to be rearranged in the plurality of display regions along a pay line after the variable display of the symbols corresponds to a winning combination;

(c) after (b), where it is determined that the combination of symbols to be displayed after the variable display will not constitute a winning combination, automatically statically displaying those symbols corresponding to a winning combination and then subsequently automatically statically displaying those symbols that do not correspond to the winning combination by means of the stopping order control program; and, (d) after (b), wherein is determined that the combination of symbols to be displayed after the variable display will constitute a winning combination, randomly statically displaying the symbols corresponding to the winning combination.]

[2. A gaming machine including:

a display including a plurality of display regions for displaying a plurality of kinds of symbols;

memory for storing a stopping order control program for controlling a stopping order for each of the plurality of display regions, in which the plurality of kinds of symbols stop varying and are statically displayed;

an input device for accepting external input; and a controller for executing processing of:

(a) starting a game in response to an input signal from the input device;

(b) randomly determining a symbol to be rearranged in each of the plurality of display regions on the display, from the plurality of kinds of symbols;

(c) performing variable display for changing symbols displayed in the plurality of display regions on the display to other kinds of symbols;

(d) determining, in a winning combination processing step, whether, after (b), a combination of symbols to be rearranged in the plurality of display regions along a pay line after the variable display corresponds to a winning combination;

(e) in a case where, in (d), the combination of symbols to be rearranged in the plurality of display regions along a pay line is determined not to correspond to a winning combination, automatically statically displaying symbols not corresponding to the winning combination in the plurality of display regions after automatically statically displaying symbols corresponding to a potential winning combination in other display regions by means of the stopping order control program;

(f) in a case where, in (d), the combination of symbols to be rearranged in the plurality of display regions along the pay line is determined to correspond to a winning combination, randomly displaying the symbols determined to be rearranged in the processing (b) by randomly stopping the variable display and statically displaying the symbols; and (g) after (f), providing an award corresponding to the winning combination displayed.]

[3. A gaming machine according to claim 2, wherein to execute (f), the controller statically displays symbols in display regions randomly selected from among the plurality of display regions and delays the static display of symbols in other display regions by means of the stopping order control program.]

[4. A gaming machine comprising:

a display having a plurality of symbol display regions for displaying symbols capable of switching between variable display and static display;

an input device for accepting external input; and a controller for executing processing of:

(a) in response to an input signal from the input device, determining by a lottery a symbol to be statically displayed in each of the plurality of symbol display regions after the variable display of symbols;

(b) after (a), in a winning combination processing step, comparing a combination of symbols to be automatically statically displayed after the variable display of symbols, along an activated pay line among pay lines defined across the plurality of symbol display regions, with a known winning combination of symbols qualified for an award, and determining whether a quantity of a non-winning symbol is less than or equal to a first value;

(c) after (b), in a case where the quantity of the non-winning symbols is less than or equal to the first value, determining whether or not to change a stopping order for automatically statically displaying each of the plurality of symbol display regions after the variable display;

(d) after (c), in a case where the stopping order is determined to be changed and where the combination of symbols to be automatically statically displayed along the activated pay line includes the non-winning symbol, changing the stopping order so that the symbol display region displaying the non-winning symbol is automatically statically displayed after the symbol display region displaying the symbol constituting the combination qualified for an award is automatically statically displayed;

(e) after (a), in the winning combination processing step, comparing a combination of symbols to be automatically statically displayed after the variable display of symbols, along an activated pay line among pay lines defined across the plurality of symbol display regions, with a known winning combination of symbols qualified for an award, and where the combination of symbols to be automatically statically displayed along the activated pay line includes the symbols corresponding to the known winning combination of symbols, randomly automatically statically displaying the combination of symbols corresponding to the winning combination in each of the plurality of symbol display regions; and, (f) regarding each of the plurality of symbol display regions, switching from the variable display to the static display according to the stopping order changed in (d).]

*5. A gaming machine comprising:*

*a display including a plurality of symbols and a plurality of display regions each configured to statically display a symbol therein after a variable arrangement of the plurality of symbols;*

*a memory storing a plurality of pattern data tables that each determine a stopping order of the plurality of symbols after the variable arrangement of the symbols;*

*an input device that accepts an external input; and*

*a CPU programmed to execute the processes of:*

*(a) in response to an input signal from the input device, randomly determining a symbol to be statically displayed to each of the symbol display regions after the variable display of the symbols;*

*(b) determining, in a winning combination processing step, whether a combination of symbols to be statically displayed to the plurality of display regions after the variable display of the symbols corresponds to a winning combination;*

*(c) after (b), where it is determined that the combination of symbols to be statically displayed to the plurality of display regions after the variable display will not constitute the winning combination, extracting one of the plurality of pattern data tables from the memory via a lottery to randomly determine a stopping order of the symbols to each of the plurality of display regions when the symbols are statically displayed, and automatically statically displaying the symbols to each of the plurality of display regions according to the extracted pattern data table such that those symbols corresponding to the winning combination are statically displayed before those symbols that do not correspond to the winning combination; and,*

*(d) after (b), where it is determined that the combination of symbols to be statically displayed to the plurality of display regions after the variable display will constitute the winning combination, extracting one of the pattern data tables from the memory via a lottery to randomly determine a stopping order of the symbols to each of the plurality of display regions when the symbols are statically displayed, and statically displaying the symbols corresponding to the winning combination according to the extracted pattern data table.*

*6. The gaming machine according to claim 5, wherein in the winning combination processing step, the CPU compares a combination of symbols to be statically displayed after the variable display of symbols with a known winning combination of symbols qualified for an award, determines a quantity of a non-winning symbols to be statically displayed, randomly selects a pattern data table from the memory from among the plurality of pattern data tables based on the quantity of non-winning symbols to be automatically stop-displayed, and stop displays the symbols according to the stopping order set forth by the extracted pattern data table.*

*7. A gaming machine comprising:*

*a display including a plurality of symbols and a plurality of reels each configured to statically display a symbol after a variable display of the symbols;*

*an input device that accepts an external input;*

*a memory storing a plurality of analogous winning combinations of symbols; and,*

*a CPU programmed to execute the processes of:*

*(a) in response to an input signal from the external input, determining a symbol to be statically displayed to each of the reels after the variable display of the symbols;*

*(b) determining, in a winning combination processing step, whether symbols to be statically displayed to each of the plurality reels after the variable display of the symbols correspond to a winning combination;*

*(c) after (b), where it is determined that the combination of symbols to be statically displayed to the plurality of reels after the variable display will not constitute the winning combination, extracting an analogous winning combination of symbols from the memory that corresponds to a winning combination of symbols having the greatest number of symbols in common with the com-*

*bination of symbols to be statically displayed, determining whether the symbols to be statically displayed to each of the plurality of reels correspond to the analogous winning combination, and automatically statically displaying each of the plurality of reels based on the analogous winning combination such that those symbols corresponding to the analogous winning combination are statically displayed before those symbols that do not correspond to the analogous winning combination; and,*

*(d) after (b), where it is determined that the combination of symbols to be statically displayed to the reels after the variable display will constitute the winning combination, randomly statically displaying the symbols corresponding to the winning combination.*

*8. The gaming machine of claim 7, wherein the CPU stores to the memory, a delay flag that delays the static display of each of the plurality of reels that do not include a symbol corresponding to the analogous winning combination.*

*9. The gaming machine of claim 7, wherein the analogous winning combination is selected based on a number of symbols not constituting the winning combination.*

*10. The gaming machine of claim 9, wherein the number of symbols not constituting the analogous winning combination is used to randomly select a stopping pattern from among a plurality of stopping patterns stored in the memory.*

*11. The gaming machine of claim 10, wherein a stopping pattern that is randomly selected determines a stopping order of the plurality of reels such that those symbols corresponding to the analogous winning combination are displayed before those symbols that do not correspond to the analogous winning combination.*

*12. A gaming machine comprising:*

*a display including a plurality of display regions that display a plurality of kinds of symbols;*

*a memory storing a plurality of stopping order control programs that control a stopping order of each of the plurality of display regions, in which the plurality of kinds of symbols stop varying and are statically displayed;*

*an input device that accepts an external input; and*

*a CPU programmed to execute processing of:*

*(a) in response to an input signal from the input device, randomly determining a symbol to be statically displayed in each of the plurality of symbol display regions after the variable display of the symbols;*

*(b) determining, in a winning combination processing step, whether, after (a), a combination of symbols to be rearranged in the plurality of display regions after the variable display of the symbols corresponds to a winning combination based on a number of a specific symbol rearranged to the plurality of display regions being larger than a predetermined number;*

*(c) after (b), where it is determined that the combination of symbols to be displayed after the variable display will not constitute the winning combination, automatically statically displaying those symbols corresponding to the winning combination and then subsequently automatically statically displaying those symbols that do not correspond to the winning combination according to one of the stopping order control programs selected from among the plurality of the stopping order control programs; and,*

*(d) after (b), where it is determined that the combination of symbols to be displayed after the variable display will constitute the winning combination, randomly statically displaying the symbols corresponding to the winning combination according to a randomly generated stopping order program selected from among the plurality of stopping order programs.*

*13. A slot machine that determines an arrangement pattern for statically displaying a plurality of symbols after a variable display of symbols, the slot machine comprising:*

*a CPU; and,*

*a memory storing a plurality of pattern data tables therein,*

*wherein the CPU extracts a pattern data table from the memory to determine a stopping order of the plurality of symbols based on the symbols to appear in a predetermined arrangement pattern, the pattern data table used by the CPU until the plurality of symbols are variably displayed and then statically displayed in the predetermined arrangement pattern;*

*wherein the CPU controls the stopping order of the plurality of symbols based on the extracted data pattern table; and, wherein,*

*when it is determined that the plurality of symbols to be statically displayed according to the predetermined arrangement pattern do not qualify for an award, the CPU automatically statically displays those symbols corresponding to an award before automatically statically displaying those symbols that do not correspond to an award based on the extracted data pattern; and wherein,*

*when it is determined that the plurality of symbols to be statically displayed according to the predetermined arrangement pattern qualify for an award, the CPU automatically randomly statically displays those symbols corresponding to the winning combination based on the extracted data pattern; and wherein,*

*the extracted pattern data table is randomly extracted from among the plurality of pattern data tables by means of a lottery based on a number of the plurality of symbols included in the predetermined arrangement pattern that do not correspond to an award.*

*14. A slot machine comprising a CPU and a display which performs a payout when a result of statically displaying a plurality of reels on the display after a variable display of the reels includes a winning combination, wherein, when the result to be displayed on the display does not include a winning combination, the CPU:*

*determines for each reel, prior to displaying the result, whether each reel includes a symbol constituting an analogous winning combination, and*

*delays automatically statically displaying each reel that does not have a symbol constituting an analogous winning combination until after those symbols constituting the analogous winning combination are automatically displayed; and wherein,*

*when the result to be displayed on the display after the variable display of the reels does include a winning combination, automatically randomly statically displaying the symbols corresponding to the winning combination.*

*15. The slot machine according to claim 14, further including a memory, wherein based on the determination of whether each reel includes a symbol constituting an analogous winning combination, the CPU stores to the memory a delaying flag for each reel that does not have a symbol constituting the analogous winning combination.*

*16. The gaming machine of claim 5, wherein the winning combination comprises at least one of one type of symbol among a plurality of kinds of symbols.*

*17. The gaming machine of claim 5, wherein the winning combination comprises at least a predetermined number or more of at least one type of symbol.*

*18. The gaming machine of claim 5, wherein the winning combination comprises at least one of one type of symbol configured to be arranged along a payline.*

*19. The gaming machine of claim 5, wherein the winning combination comprises at least a predetermined number of at least one type of symbol configured to be arranged to the display.*

*20. The slot machine of claim 13, wherein when it is determined that the plurality of symbols to be statically displayed according to the predetermined arrangement pattern qualify for an award, the CPU automatically randomly statically displays those symbols corresponding to the winning combination based on the extracted data pattern.*

* * * * *